(12) United States Patent
Kok et al.

(10) Patent No.: US 12,240,562 B2
(45) Date of Patent: Mar. 4, 2025

(54) DERAILLEUR FOR HUMAN-POWERED VEHICLE

(71) Applicants: SHIMANO (SINGAPORE) PTE. LTD., Jurong Town (SG); SHIMANO INC., Sakai (JP)

(72) Inventors: Shiun Kheong Kok, Jurong Town (SG); Donavan Jun Han Chan, Jurong Town (SG); Yu Goto, Sakai (JP); Takeshi Ueda, Sakai (JP)

(73) Assignees: SHIMANO (SINGAPORE) PTE. LTD., Jurong Town (SG); SHIMANO INC., Sakai (JP)

( * ) Notice: Subject to any disclaimer, the term of this patent is extended or adjusted under 35 U.S.C. 154(b) by 741 days.

(21) Appl. No.: 17/363,006

(22) Filed: Jun. 30, 2021

(65) Prior Publication Data

US 2023/0002006 A1    Jan. 5, 2023

(51) Int. Cl.
*B62M 9/122* (2010.01)
*B62M 9/123* (2010.01)
*B62M 25/08* (2006.01)

(52) U.S. Cl.
CPC ............ *B62M 9/122* (2013.01); *B62M 9/123* (2013.01); *B62M 25/08* (2013.01)

(58) Field of Classification Search
CPC .... B62M 9/122; B62M 9/1242; B62M 25/08; B62M 9/1248; B62M 9/132; B62M 9/1244; B62M 9/121; B62M 9/1348; B62M 9/124
USPC ..................................................... 474/80, 82
See application file for complete search history.

(56) References Cited

U.S. PATENT DOCUMENTS

| | | | | | |
|---|---|---|---|---|---|
| 3,535,950 | A | * | 10/1970 | Shimano | B62M 9/1242 474/82 |
| 4,259,873 | A | * | 4/1981 | Nagano | B62M 9/1248 474/82 |
| 4,437,848 | A | * | 3/1984 | Shimano | B62M 9/1242 474/82 |
| 4,610,644 | A | * | 9/1986 | Nagano | B62M 9/125 474/82 |

(Continued)

FOREIGN PATENT DOCUMENTS

| | | |
|---|---|---|
| CN | 204432912 U | 7/2015 |
| EP | 2090505 | 8/2009 |

(Continued)

*Primary Examiner* — Henry Y Liu
(74) *Attorney, Agent, or Firm* — MORI & WARD, LLP

(57) ABSTRACT

A derailleur for a human-powered vehicle comprises a base member, a movable member, a linkage, an electrical actuator, a first biasing member, and a second biasing member. The base member is configured to be attached to a vehicle body of the human-powered vehicle. The movable member is configured to be movable relative to the base member in a first direction and a second direction different from the first direction. The linkage is configured to movably connect the movable member to the base member. The electrical actuator is configured to operatively move the movable member relative to the base member. The first biasing member is configured to deform if first external force is applied to move the movable member in the first direction. The second biasing member is configured to deform if second external force is applied to move the movable member in the second direction.

36 Claims, 31 Drawing Sheets

(56) References Cited

U.S. PATENT DOCUMENTS

| | | | | |
|---|---|---|---|---|
| 4,619,633 A * | 10/1986 | Nagano | B62M 9/1242 | 474/82 |
| 4,832,662 A * | 5/1989 | Nagano | B62M 9/127 | 474/82 |
| 5,328,414 A | 7/1994 | Ancarani Restelli | | |
| 5,380,253 A * | 1/1995 | Iwasaki | B62M 9/126 | 474/80 |
| 5,518,456 A * | 5/1996 | Kojima | B62M 9/1248 | 474/82 |
| 5,624,335 A * | 4/1997 | Ando | B62M 9/1244 | 474/80 |
| 5,695,421 A * | 12/1997 | Fukuda | B62M 9/1248 | 474/82 |
| 5,860,880 A * | 1/1999 | Oka | B62M 9/1244 | 474/82 |
| 6,093,122 A * | 7/2000 | McLaughlin | B62M 9/1248 | 474/82 |
| 6,162,140 A * | 12/2000 | Fukuda | B62M 25/08 | 474/81 |
| 6,315,688 B1 * | 11/2001 | McLaughlin | B62M 9/1242 | 474/82 |
| 6,979,009 B2 * | 12/2005 | Ichida | B62M 9/132 | 280/238 |
| 6,997,835 B2 * | 2/2006 | Fukuda | B62M 9/1242 | 474/82 |
| 7,291,079 B2 * | 11/2007 | Ichida | B62M 25/08 | 474/80 |
| 7,306,531 B2 * | 12/2007 | Ichida | B62M 9/122 | 474/70 |
| 7,331,890 B2 * | 2/2008 | Ichida | B62M 9/132 | 474/80 |
| 7,341,532 B2 * | 3/2008 | Ichida | B62M 9/132 | 474/70 |
| 7,503,863 B2 * | 3/2009 | Ichida | B62M 9/132 | 474/70 |
| 7,704,173 B2 * | 4/2010 | Ichida | B62M 9/132 | 474/82 |
| RE41,782 E * | 9/2010 | Fukuda | B62M 9/122 | 474/82 |
| 7,892,122 B2 * | 2/2011 | Fukuda | B62M 9/122 | 474/82 |
| 7,942,768 B2 * | 5/2011 | Takamoto | B62M 9/122 | 474/82 |
| 8,066,597 B2 * | 11/2011 | Sakaue | B62M 9/122 | 474/82 |
| 8,678,963 B2 * | 3/2014 | Kuwayama | B62M 9/1348 | 474/82 |
| 8,900,078 B2 * | 12/2014 | Yamaguchi | B62M 9/122 | 474/82 |
| 8,974,331 B2 * | 3/2015 | Yamaguchi | F16H 9/06 | 474/82 |
| 9,005,059 B2 * | 4/2015 | Suyama | B62M 9/122 | 474/82 |
| 9,303,763 B2 * | 4/2016 | Yamaguchi | B62M 9/122 | |
| 11,440,622 B2 * | 9/2022 | De Poli | B62M 25/08 | |
| 11,661,141 B2 * | 5/2023 | Fujimoto | B62M 9/126 | 474/80 |
| 11,667,350 B2 * | 6/2023 | Chang | B62M 9/1248 | 474/82 |
| 2004/0102270 A1 * | 5/2004 | Fukuda | B62M 9/122 | 474/70 |
| 2006/0135301 A1 * | 6/2006 | Shahana | B62M 9/1248 | 474/82 |
| 2007/0191159 A1 * | 8/2007 | Fukuda | B62M 9/1242 | 474/70 |
| 2008/0227572 A1 * | 9/2008 | Sakaue | B62M 9/122 | 474/82 |
| 2009/0215561 A1 * | 8/2009 | Fukuda | B62M 9/122 | 474/82 |
| 2013/0090196 A1 * | 4/2013 | Yamaguchi | B62M 9/1244 | 474/80 |
| 2014/0162817 A1 * | 6/2014 | Yamaguchi | B62M 9/122 | 474/80 |
| 2014/0162818 A1 * | 6/2014 | Yamaguchi | B62M 9/1242 | 474/80 |
| 2014/0213397 A1 * | 7/2014 | Yamaguchi | B62K 23/04 | 474/80 |
| 2014/0296009 A1 * | 10/2014 | Suyama | B62M 9/122 | 474/80 |
| 2016/0176478 A1 * | 6/2016 | Chang | B62M 9/126 | 474/69 |

FOREIGN PATENT DOCUMENTS

| | | |
|---|---|---|
| EP | 1810919 | 7/2016 |
| JP | 07-257472 | 10/1995 |
| JP | 2008-222211 | 9/2008 |

\* cited by examiner

|  |  |  | FS ||
| --- | --- | --- | --- | --- |
|  |  |  | 28 | 38 |
|  |  |  | FS1 | FS2 |
| RS | 45 | RS1 | 0.62 | 0.84 |
|  | 40 | RS2 | 0.70 | 0.95 |
|  | 36 | RS3 | 0.78 | 1.06 |
|  | 32 | RS4 | 0.88 | 1.19 |
|  | 28 | RS5 | 1.00 | 1.36 |
|  | 24 | RS6 | 1.17 | 1.58 |
|  | 21 | RS7 | 1.33 | 1.81 |
|  | 18 | RS8 | 1.56 | 2.11 |
|  | 16 | RS9 | 1.75 | 2.38 |
|  | 14 | RS10 | 2.00 | 2.71 |
|  | 12 | RS11 | 2.33 | 3.17 |
|  | 10 | RS12 | 2.80 | 3.80 |

DERAILLEUR FOR HUMAN-POWERED VEHICLE

BACKGROUND OF THE INVENTION

Field of the Invention

The present invention relates to a derailleur for a human-powered vehicle.

Discussion of the Background

A human-powered vehicle includes a derailleur. The derailleur includes a base, a chain guide, and an actuator. The chain guide is movably coupled to the base. The actuator moves the chain guide relative to the base. For example, the derailleur may receive external force caused by interference between the derailleur and an object provided on a road. It is preferable that the actuator is protected from such external force.

SUMMARY OF THE INVENTION

In accordance with a first aspect of the present invention, a derailleur for a human-powered vehicle comprises a base member, a movable member, a linkage, an electrical actuator, a first biasing member, and a second biasing member. The base member is configured to be attached to a vehicle body of the human-powered vehicle. The movable member is configured to be movable relative to the base member in a first direction and a second direction different from the first direction. The linkage is configured to movably connect the movable member to the base member. The electrical actuator is configured to operatively move the movable member relative to the base member. The first biasing member is configured to deform if first external force is applied to move the movable member in the first direction. The second biasing member is configured to deform if second external force is applied to move the movable member in the second direction.

With the derailleur according to the first aspect, the first biasing member can at least partially absorb the first external force, and the second biasing member can at least partially absorb the second external force. Thus, the first biasing member and the second biasing member can protect the electrical actuator from the first external force and the second external force.

In accordance with a second aspect of the present invention, the derailleur according to the first aspect is configured so that the electrical actuator includes an output part configured to be operatively coupled to the movable member to move the movable member relative to the base member. The first biasing member is configured to reduce the first external force transmitted to the output part. The second biasing member is configured to reduce the second external force transmitted to the output part.

With the derailleur according to the second aspect, the first biasing member and the second biasing member can effectively protect the electrical actuator from the first external force and the second external force.

In accordance with a third aspect of the present invention, the derailleur according to the second aspect is configured so that the first biasing member is configured to allow the movable member to move relative to the base member in the first direction in response to the first external force. The second biasing member is configured to allow the movable member to move relative to the base member in the second direction in response to the second external force.

With the derailleur according to the third aspect, the first biasing member can at least partially absorb the first external force by allowing the movable member to move in response to the first external force, and the second biasing member can at least partially absorb the second external force by allowing the movable member to move in response to the second external force. Thus, the first biasing member and the second biasing member can reliably protect the electrical actuator from the first external force and the second external force.

In accordance with a fourth aspect of the present invention, the derailleur according to the second or third aspect is configured so that the first biasing member includes a first end and a first opposite end. The first end of the first biasing member is operatively coupled to the output part of the electrical actuator.

With the derailleur according to the fourth aspect, the first biasing member can reliably absorb at least partially the first external force. Thus, the first biasing member can reliably protect the electrical actuator from the first external force.

In accordance with a fifth aspect of the present invention, the derailleur according to the fourth aspect further comprises an output member coupled to the output part of the electrical actuator to rotate along with the output part. The first end of the first biasing member is coupled to the output member.

With the derailleur according to the fifth aspect, the output member enables the first end of the first biasing member to be coupled to the output part of the electrical actuator. Thus, the first biasing member can reliably protect the electrical actuator from the first external force with a simple structure.

In accordance with a sixth aspect of the present invention, the derailleur according to the fifth aspect is configured so that the output member is secured to the output part of the electrical actuator.

With the derailleur according to the sixth aspect, the output member can transmit actuating force from the output part of the electrical actuator to another member while the first biasing member can reliably protect the electrical actuator from the first external force.

In accordance with a seventh aspect of the present invention, the derailleur according to any one of the fourth to sixth aspects further comprises a saver member pivotally coupled to at least one of the base member, the movable member, the linkage, and the electrical actuator. The first opposite end of the first biasing member is coupled to the saver member.

With the derailleur according to the seventh aspect, the saver member enables the first opposite end of the first biasing member to be coupled to the at least one of the base member, the movable member, the linkage, and the electrical actuator. Thus, the first biasing member can reliably protect the electrical actuator from the first external force with a simple structure.

In accordance with an eighth aspect of the present invention, the derailleur according to any one of the first to sixth aspects is configured so that the first biasing member is configured to deform in response to first force which is caused by the first external force and which is applied to the first biasing member against first biasing force of the first biasing member. The second biasing member is configured to deform in response to second force which is caused by the second external force and which is applied to the second biasing member against second biasing force of the second biasing member.

With the derailleur according to the eighth aspect, the first biasing member and the second biasing member can effectively protect the electrical actuator from the first external force and the second external force.

In accordance with a ninth aspect of the present invention, the derailleur according to any one of the first to eighth aspects is configured so that the movable member is movable relative to the base member in an inward direction toward a transverse center plane of the vehicle body. The movable member is movable relative to the base member in an outward direction away from the transverse center plane of the vehicle body, the outward direction being an opposite direction of the inward direction. The first direction includes the inward direction. The second direction includes the outward direction.

With the derailleur according to the ninth aspect, the first biasing member can at least partially absorb the first external force when the first external force moves the movable member in the inward direction, and the second biasing member can at least partially absorb the second external force when the second external force moves the movable member in the outward direction. Thus, the first biasing member and the second biasing member can protect the electrical actuator from the first external force and the second external force.

In accordance with a tenth aspect of the present invention, the derailleur according to any one of the first to ninth aspects is configured so that at least one of the first biasing member and the second biasing member includes an extension spring.

With the derailleur according to the tenth aspect, it is possible to protect the electrical actuator from the first external force and the second external force with a simple structure.

In accordance with an eleventh aspect of the present invention, the derailleur according to any one of the first to tenth aspects is configured so that at least one of the first biasing member and the second biasing member includes a compression spring.

With the derailleur according to the eleventh aspect, it is possible to protect the electrical actuator from the first external force and the second external force with a simple structure.

In accordance with a twelfth aspect of the present invention, the derailleur according to any one of the first to eleventh aspects is configured so that the linkage includes a first link. The first link is pivotally coupled to the base member about a first pivot axis and is pivotally coupled to the movable member about a first additional pivot axis. The second biasing member includes a second end and a second opposite end. The second end of the second biasing member is coupled to the first link.

With the derailleur according to the twelfth aspect, the second biasing member can at least partially absorb the second external force via the first link.

In accordance with a thirteenth aspect of the present invention, the derailleur according to the twelfth aspect further comprises a saver member pivotally coupled to at least one of the base member, the movable member, the linkage, and the electrical actuator. The second opposite end of the second biasing member is coupled to the saver member.

With the derailleur according to the thirteenth aspect, the saver member enables the second opposite end of the second biasing member to be coupled to the at least one of the base member, the movable member, the linkage, and the electrical actuator. Thus, the second biasing member can reliably protect the electrical actuator from the second external force with a simple structure.

In accordance with a fourteenth aspect of the present invention, a derailleur for a human-powered vehicle comprises a base member, a movable member, a linkage, an electrical actuator, a first biasing member, and a second biasing member. The base member is configured to be attached to a vehicle body of the human-powered vehicle. The movable member is configured to be movable relative to the base member in a first direction and a second direction different from the first direction. The linkage is configured to movably connect the movable member to the base member. The electrical actuator is configured to operatively move the moveable member relative to the base member, the electrical actuator including an output part. The electrical actuator is configured to move the movable member in the first direction via the second biasing member if the output part of the electrical actuator rotates in a first rotational direction, the electrical actuator being configured to move the movable member in the second direction via the first biasing member if the output part of the electrical actuator rotates in a second rotational direction which is an opposite direction of the first rotational direction.

With the derailleur according to the fourteenth aspect, the second biasing member enables the electrical actuator to move the movable member in the first direction. The first biasing member enables the electrical actuator to move the movable member in the second direction. Furthermore, at least one of the first biasing member and the second biasing member can at least partially absorb external force. Thus, it is possible to move the movable member in the first direction and the second direction while the at least one of the first biasing member and the second biasing member can protect the electrical actuator from the external force.

In accordance with a fifteenth aspect of the present invention, the derailleur according to the fourteenth aspect is configured so that the movable member is movable relative to the base member in an inward direction toward a transverse center plane of the vehicle body. The movable member is movable relative to the base member in an outward direction away from the transverse center plane of the vehicle body, the outward direction being an opposite direction of the inward direction. The first direction includes the inward direction. The second direction includes the outward direction.

With the derailleur according to the fifteenth aspect, it is possible to move the movable member in the inward direction and the outward direction.

In accordance with a sixteenth aspect of the present invention, the derailleur according to the fourteenth or fifteenth aspect is configured so that at least one of the first biasing member and the second biasing member includes an extension spring.

With the derailleur according to the sixteenth aspect, it is possible to move the movable member in the first direction and the second direction with a simple structure.

In accordance with a seventeenth aspect of the present invention, the derailleur according to any one of the fourteenth to sixteenth aspects is configured so that at least one of the first biasing member and the second biasing member includes a compression spring.

With the derailleur according to the seventeenth aspect, it is possible to move the movable member in the first direction and the second direction with a simple structure.

In accordance with an eighteenth aspect of the present invention, the derailleur according to any one of the fourteenth to seventeenth aspects is configured so that the linkage includes a first link. The first link is pivotally coupled to the base member about a first pivot axis and is pivotally coupled to the movable member about a first additional pivot axis. The second biasing member includes a second end and a second opposite end. The second end of the second biasing member is coupled to the first link.

With the derailleur according to the eighteenth aspect, it is possible to move the movable member via the first link.

In accordance with a nineteenth aspect of the present invention, the derailleur according to the eighteenth aspect further comprises a saver member pivotally coupled to at least one of the base member, the movable member, the linkage, and the electrical actuator. The second opposite end of the second biasing member is coupled to the saver member.

With the derailleur according to the nineteenth aspect, the saver member enables the second opposite end of the second biasing member to be coupled to the at least one of the base member, the movable member, the linkage, and the electrical actuator. Thus, the second biasing member can reliably protect the electrical actuator from the external force with a simple structure.

In accordance with a twentieth aspect of the present invention, the derailleur according to any one of the fourteenth to nineteenth aspects is configured so that the first biasing member includes a first end and a first opposite end. The first end of the first biasing member is operatively coupled to the output part of the electrical actuator.

With the derailleur according to the twentieth aspect, it is possible to transmit actuating force from the output part of the electrical actuator to another member via the first biasing member.

In accordance with a twenty-first aspect of the present invention, the derailleur according to the twentieth aspect further comprises an output member coupled to the output part of the electrical actuator to rotate along with the output part.

With the derailleur according to the twenty-first aspect, it is possible to transmit actuating force from the output part of the electrical actuator to another member via the output member.

In accordance with a twenty-second aspect of the present invention, the derailleur according to the twenty-first aspect is configured so that the first end of the first biasing member is coupled to the output member.

With the derailleur according to the twenty-second aspect, it is possible to transmit actuating force from the output part of the electrical actuator to another member via the output member and the first biasing member.

In accordance with a twenty-third aspect of the present invention, the derailleur according to the twenty-first or twenty-second aspect is configured so that the output member is secured to the output part of the electrical actuator.

With the derailleur according to the twenty-third aspect, the output member can reliably transmit actuating force from the output part of the electrical actuator to another member.

In accordance with a twenty-fourth aspect of the present invention, the derailleur according to any one of the twentieth to twenty-third aspects further comprises a saver member pivotally coupled to at least one of the base member, the movable member, the linkage, and the electrical actuator. The first opposite end of the first biasing member is coupled to the saver member.

With the derailleur according to the twenty-fourth aspect, the saver member enables the first opposite end of the first biasing member to be coupled to the at least one of the base member, the movable member, the linkage, and the electrical actuator. Thus, the first biasing member can reliably protect the electrical actuator from the external force with a simple structure.

In accordance with a twenty-fifth aspect of the present invention, the derailleur according to any one of the fourteenth to twenty-fourth aspects is configured so that the linkage includes a first link and a second link. The first link is pivotally coupled to the base member about a first pivot axis and is pivotally coupled to the movable member about a first additional pivot axis. The second link is pivotally coupled to the base member about a second pivot axis and is pivotally coupled to the movable member about a second additional pivot axis.

With the derailleur according to the twenty-fifth aspect, the linkage can movably couple the movable member to the base member.

In accordance with a twenty-sixth aspect of the present invention, the derailleur according to any one of the fourteenth to twenty-fifth aspects further comprises a saver member and an output member. The saver member is pivotally coupled to at least one of the base member, the movable member, the linkage, and the electrical actuator. The output member is coupled to the output part of the electrical actuator to rotate along with the output part. The output member includes a first contact part contactable with the saver member.

With the derailleur according to the twenty-sixth aspect, it is possible to transmit actuating force from the output part of the electrical actuator to the saver member via the output member in a state where the first contact part is in contact with the saver member.

In accordance with a twenty-seventh aspect of the present invention, the derailleur according to the twenty-sixth aspect is configured so that the saver member includes a second contact part contactable with the second link.

With the derailleur according to the twenty-seventh aspect, it is possible to transmit actuating force between the second link and the saver member in a state where the second contact part is in contact with the second link member.

In accordance with a twenty-eighth aspect of the present invention, the derailleur according to any one of the twenty-fifth to twenty-seventh aspects is configured so that the second biasing member is configured to transmit actuating force to the first link in response to a first rotation of the output part of the electrical actuator in the first rotational direction.

With the derailleur according to the twenty-eighth aspect, it is possible to transmit the actuating force from the output part of the electrical actuator to the first link via the second biasing member.

In accordance with a twenty-ninth aspect of the present invention, the derailleur according to the twenty-eighth aspect is configured so that the movable member is configured to move relative to the base member in the first direction in response to the actuating force transmitted from the output part of the electrical actuator via the second biasing member.

With the derailleur according to the twenty-ninth aspect, the electrical actuator can move the movable member in the first direction using the second biasing member.

In accordance with a thirtieth aspect of the present invention, the derailleur according to the twenty-eighth or twenty-ninth aspect is configured so that the second biasing member, the output member, and the saver member are configured to transmit the actuating force to the first link in response to the first rotation of the output part of the electrical actuator.

With the derailleur according to the thirtieth aspect, the electrical actuator can move the movable member via the second biasing member, the output member, the saver member, and the first link.

In accordance with a thirty-first aspect of the present invention, the derailleur according to any one of the twenty-fifth to thirtieth aspects is configured so that the first biasing member is configured to transmit the actuating force to the second link in response to a second rotation of the output part of the electrical actuator in a second rotational direction.

With the derailleur according to the thirty-first aspect, it is possible to transmit the actuating force from the output part of the electrical actuator to the second link via the first biasing member.

In accordance with a thirty-second aspect of the present invention, the derailleur according to the thirty-first aspect is configured so that the first biasing member, the output member, and the saver member are configured to transmit the actuating force to the second link in response to the second rotation of the output part of the electrical actuator.

With the derailleur according to the thirty-second aspect, the electrical actuator can move the movable member via the first biasing member, the output member, the saver member, and the second link.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 24 is a shift schedule of the human-powered vehicle illustrated in FIG. 1.

DESCRIPTION OF THE EMBODIMENTS

Figure 1:
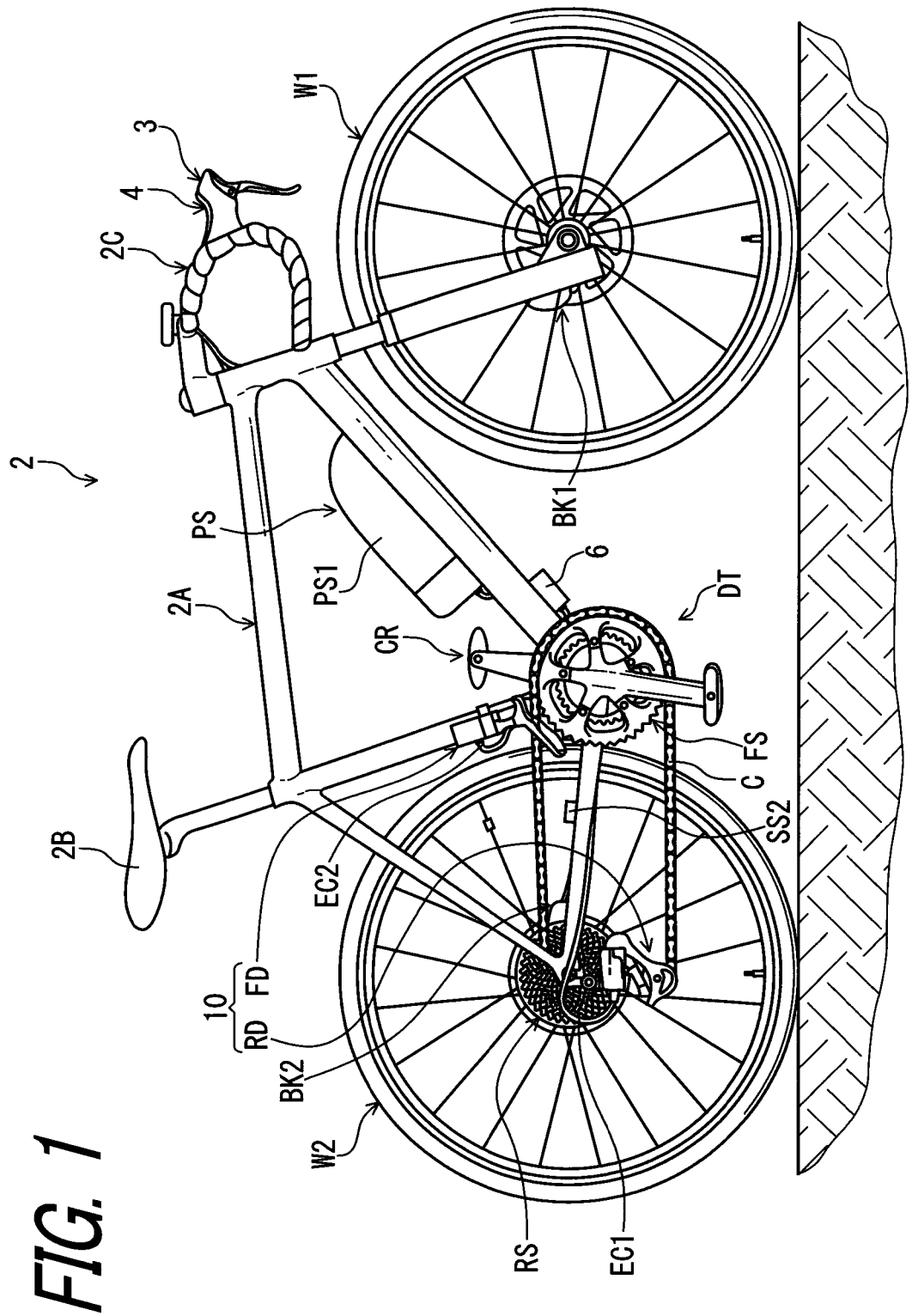
FIG. 1 is a side elevational view of a human-powered vehicle including a derailleur in accordance with a first embodiment.

The embodiment(s) will now be described with reference to the accompanying drawings, wherein like reference numerals designate corresponding or identical elements throughout the various drawings.

First Embodiment

As seen in FIG. 1, a human-powered vehicle 2 includes a derailleur 10 in accordance with a first embodiment. In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The human-powered vehicle 2 further includes a vehicle body 2A, a saddle 2B, a handlebar 2C, an operating device 3, an operating device 4, a drive train DT, a wheel W1, a wheel W2, a brake device BK1, a brake device BK2, and an electric power source PS. The operating devices 3 and 4 are configured to be mounted to the handlebar 2C. The operating device 3 is configured to be connected to the brake device BK1 via a mechanical cable or a hydraulic hose. The operating device 4 is configured to be connected to the brake device BK2 via a mechanical cable or a hydraulic hose. The drive train DT includes the derailleur 10, a crank CR, a front sprocket assembly FS, a rear sprocket assembly RS, and a chain C.

The derailleur 10 includes a derailleur FD and a derailleur RD. The front sprocket assembly FS is secured to the crank CR. The rear sprocket assembly RS is rotatably mounted to the vehicle body 2A. The chain C is engaged with the front sprocket assembly FS and the rear sprocket assembly RS. The derailleur RD is configured to be mounted to the vehicle body 2A. The derailleur RD is configured to shift the chain C relative to a plurality of sprockets of the rear sprocket assembly RS to change a gear position of the human-powered vehicle 2. The derailleur FD is configured to be mounted to the vehicle body 2A. The derailleur FD is configured to shift the chain C relative to a plurality of sprockets of the front sprocket assembly FS to change the gear position of the human-powered vehicle 2. The derailleur FD can be omitted from the derailleur 10 if needed and/or desired. In such an embodiment, the front sprocket assembly FS includes only a single front sprocket.

The electric power source PS is configured to be mounted to the vehicle body 2A. Examples of the electric power source PS include a battery, a capacitor, and a generator. In the first embodiment, the electric power source PS includes a battery PS1. The electric power source PS is configured to be mounted on a down tube of the vehicle body 2A. However, the electric power source PS can be configured to be mounted to other parts of the vehicle body 2A such as a seat tube. The electric power source PS can be configured to be directly mounted to devices such as the derailleur FD or RD. The electric power source PS can include a generator mounted to a hub assembly to generate electricity using a rotation of the wheel W1 and/or W2.

The derailleur RD is configured to be operated using the operating device 3. The derailleur FD is configured to be operated using the operating device 4. In the first embodiment, the derailleur RD is configured to be electrically connected to the operating devices 3 and 4 through a wireless communication channel. As discussed later, however, at least one of the derailleurs RD and FD can be automatically operated in an automatic shifting mode. Thus, in a case where the human-powered vehicle 2 has only the automatic shifting mode, a shifter unit can be omitted from the operating device 3, and a shifter unit can be omitted from the operating device 4. Furthermore, in a case where the derailleur FD is omitted from the derailleur 10, the shifter unit of the operating deice 4 can be omitted from the operating device 4.

The derailleur RD is electrically connected to the electric power source PS through an electric cable EC1. The derailleur FD is electrically connected to the electric power source PS through an electric cable EC2. The electric power source PS is configured to supply electric power to the derailleurs FD and RD through the electric cables EC1 and EC2. For example, the derailleurs FD and RD and the electric power source PS are configured to communicate with each other using a power line communication (PLC). However, the derailleurs FD and RD and the electric power source PS can be configured to communicate with each other using other communication method such as a wireless communication.

In the present application, the derailleur RD is configured to wirelessly communicate with the operating devices 3 and 4. The derailleur RD is configured to receive control signals wirelessly transmitted from each of the operating devices 3 and 4. The derailleur FD is configured to communicate with the derailleur RD through the electric power source PS and the electric cables EC1 and EC2. The derailleur RD is configured to transmit, through the electric power source PS and the electric cables EC1 and EC2 to the derailleur FD, control signals wirelessly transmitted from the operating device 4 to the derailleur RD. For example, the derailleur RD is configured to transmit, through a controller of the electric power source PS and the electric cables EC1 and EC2 to the derailleur FD, control signals wirelessly transmitted from the operating device 4 to the derailleur RD. However, the derailleur RD can be configured to receive control signals wirelessly transmitted from only one of the operating devices 3 and 4. In such embodiments, the derailleur FD can be configured to receive control signals wirelessly transmitted from the other of the operating devices 3 and 4.

However, the structure of the human-powered vehicle 2 is not limited to the above structure. For example, each of the derailleurs FD and RD can be configured to be electrically connected to the electric power source PS through the electric cables EC1 and EC2 and an additional device such as a junction box 6. Each of the derailleur RD and the electric power source PS can be configured to be electrically connected to the derailleur FD through the electric cables EC1 and EC2 if the derailleur FD includes a plurality of cable connectors. Each of the derailleur FD and the electric power source PS can be configured to be electrically connected to the derailleur RD through the electric cables EC1 and EC2 if the derailleur RD includes a plurality of cable connectors. The derailleur FD can be configured to be electrically connected to the derailleur RD through the electric cable EC1 or EC2 if the electric power source PS is directly mounted to one of the derailleurs FD and RD. Furthermore, the derailleur RD can be connected to at least one of the operating devices 3 and 4 through an electric cable without wireless communication. In addition, the derailleur FD can be configured to be electrically connected to at least one of the operating devices 3 and 4 through a wireless communication channel.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the human-powered vehicle 2 with facing the handlebar 2C. Accordingly, these terms, as utilized to describe the derailleur 10 (e.g., the derailleur FD and/or RD) or other components, should be interpreted relative to the human-powered vehicle 2 equipped with the derailleur 10 (e.g., the derailleur FD and/or RD) as used in an upright riding position on a horizontal surface.

Figure 2:
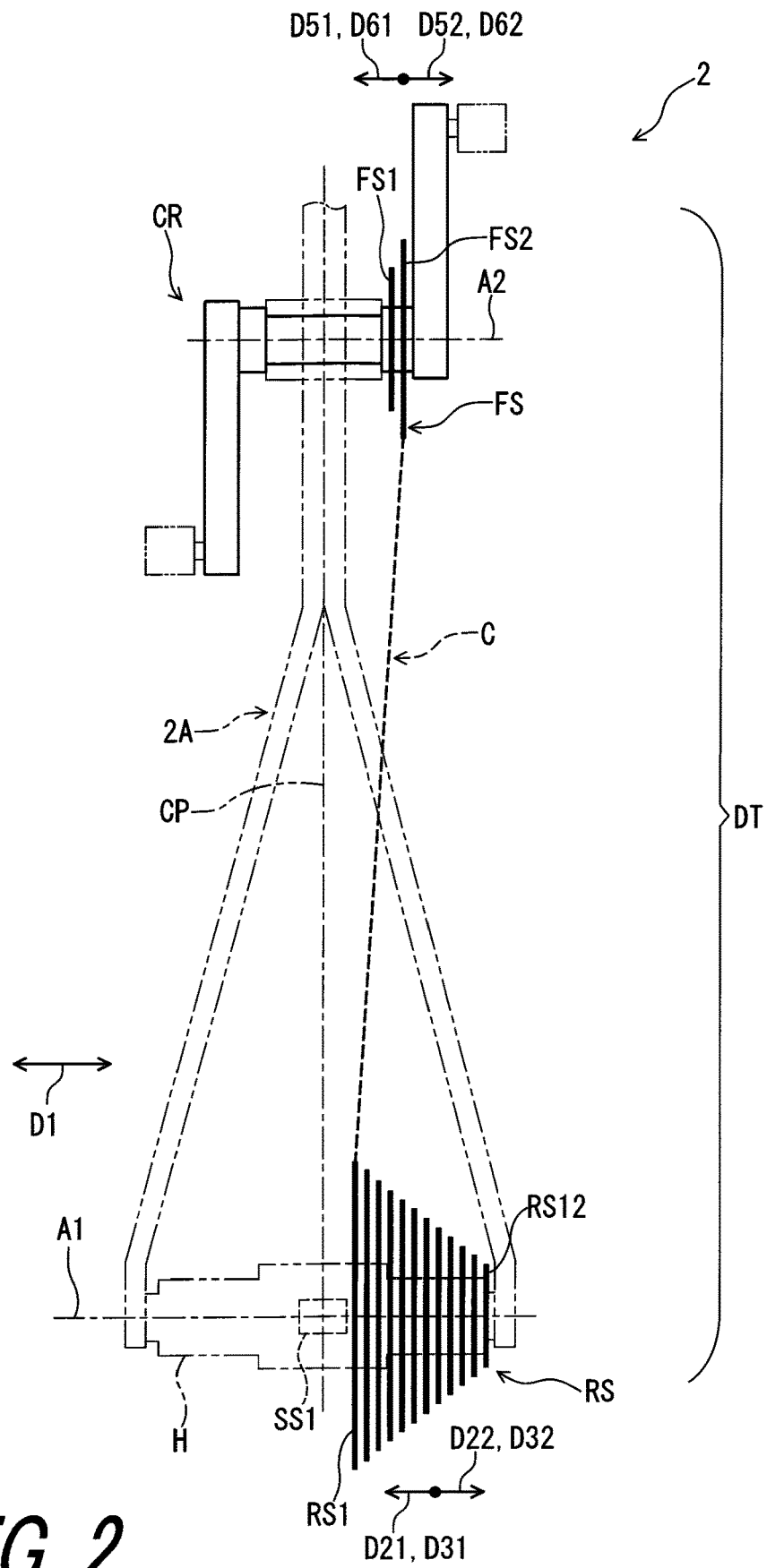
FIG. 2 is a schematic diagram of the human-powered vehicle illustrated in FIG. 1.

As seen in FIG. 2, the front sprocket assembly FS includes a plurality of front sprockets FS1 and FS2. The front sprocket FS1 corresponds to a low gear of the front sprocket assembly FS. The front sprocket FS2 corresponds to a top gear of the front sprocket assembly FS. The rear sprocket assembly RS includes a plurality of rear sprockets RS1 to RS12. The rear sprocket RS1 corresponds to a low gear of the rear sprocket assembly RS. The rear sprocket RS12 corresponds to a top gear of the rear sprocket assembly RS.

Downshifting occurs the chain C is shifted from a sprocket to a neighboring larger sprocket in an inward direction D31 in the rear sprocket assembly RS. Upshifting occurs the chain C is shifted from a sprocket to a neighboring smaller sprocket in an outward direction D32 in the rear sprocket assembly RS. The outward direction D32 is an opposite direction of the inward direction D31.

Downshifting occurs the chain C is shifted from a sprocket to a neighboring smaller sprocket in an inward direction D61 in the front sprocket assembly FS. Upshifting occurs the chain C is shifted from a sprocket to a neighboring larger sprocket in an outward direction D62 in the front sprocket assembly FS. The outward direction D62 is an opposite direction of the inward direction D61.

The vehicle body has a transverse center plane CP. The transverse center plane CP is perpendicular to a rotational center axis A1 and/or A2 of the rear sprocket assembly RS and/or the front sprocket assembly FS. The transverse center plane CP is defined to bisect a transverse width of the vehicle body 2A in a transverse direction D1 parallel to the rotational center axis A1 and/or A2 of the rear sprocket assembly RS and/or the front sprocket assembly FS. The transverse direction D1 is perpendicular to the transverse center plane CP of the vehicle body 2A. The inward direction D31 and the outward direction D32 are parallel to the transverse direction D1. The inward direction D61 and the outward direction D62 are parallel to the transverse direction D1.

Figure 3:
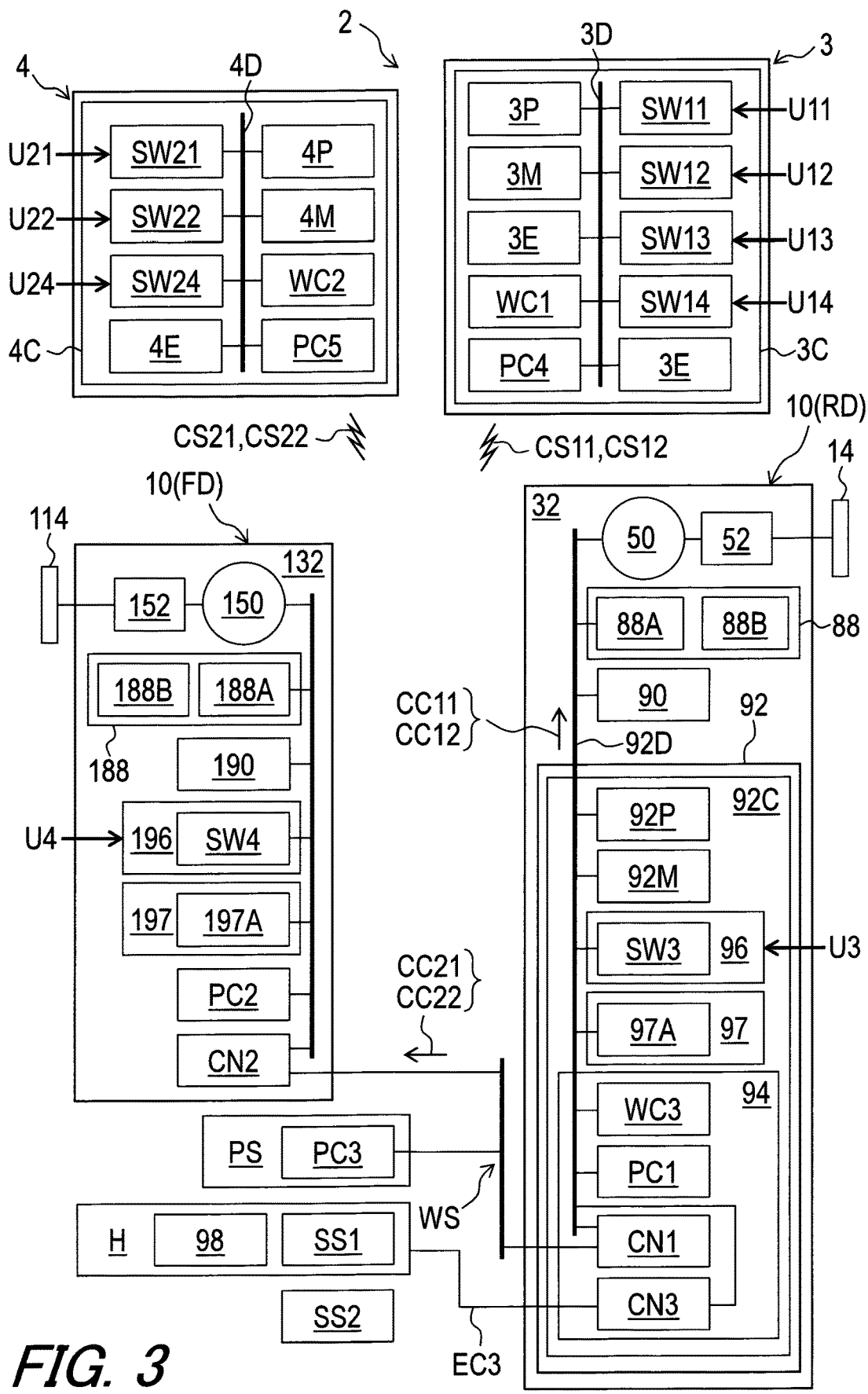
FIG. 3 is a schematic block diagram of the human-powered vehicle illustrated in FIG. 1 (wireless communication).

As seen in FIG. 3, the human-powered vehicle 2 includes a wired communication structure WS. The electric power source PS is electrically connected to the derailleur 10 (e.g., the derailleur RD and/or FD) with the wired communication structure WS to supply electricity to the derailleur 10 (e.g., the derailleur RD and/or FD). For example, the wired communication structure WS includes at least one electric cable. However, the derailleur 10 (e.g., the derailleur RD and/or FD) can be electrically connected to another electric power source which is separately provided from the electric power source PS. For example, the derailleur 10 (e.g., the derailleur RD and/or FD) can be electrically connected to an electric power source provided inside the vehicle body 2A or directly attached to the derailleur 10 (e.g., the derailleur RD and/or FD).

The operating device 4 is a separate device from the operating device 3. The operating device 3 is mounted to a right part of the handlebar 2C. The operating device 4 is mounted to a left part of the handlebar 2C. However, the positions of the operating device 3 and the operating device 4 are not limited to the first embodiment. The operating device 4 can be integrally provided with the operating device 3 as a single device if needed and/or desired.

The operating device 3 is configured to receive a first user input U11 and a first additional user input U12. The operating device 3 is configured to output a first control signal CS11 in response to the first user input U11. The operating device 3 is configured to output a first additional control signal CS12 in response to the first additional user input U12.

The operating device 3 includes a first electrical switch SW11 and a first additional electrical switch SW12. The first electrical switch SW11 is configured to receive the first user input U11. The first additional electrical switch SW12 is configured to receive the first additional user input U12.

The operating device 4 is configured to receive a second user input U21 and a second additional user input U22. The operating device 4 is configured to output a second control signal CS21 in response to the second user input U21. The operating device 4 is configured to output a second additional control signal CS22 in response to the second additional user input U22.

The operating device 4 includes a second electrical switch SW21 and a second additional electrical switch SW22. The second electrical switch SW21 is configured to receive the second user input U21. The second additional electrical switch SW22 is configured to receive the second additional user input U22.

In the first embodiment, the first user input UI 1 and the first control signal CS11 indicate downshifting of the derailleur RD. The first additional user input U12 and the first additional control signal CS12 indicate upshifting of the derailleur RD. The second user input U21 and the second control signal CS21 indicate downshifting of the derailleur FD. The second additional user input U22 and the second additional control signal CS22 indicate upshifting of the derailleur FD.

Figure 4:
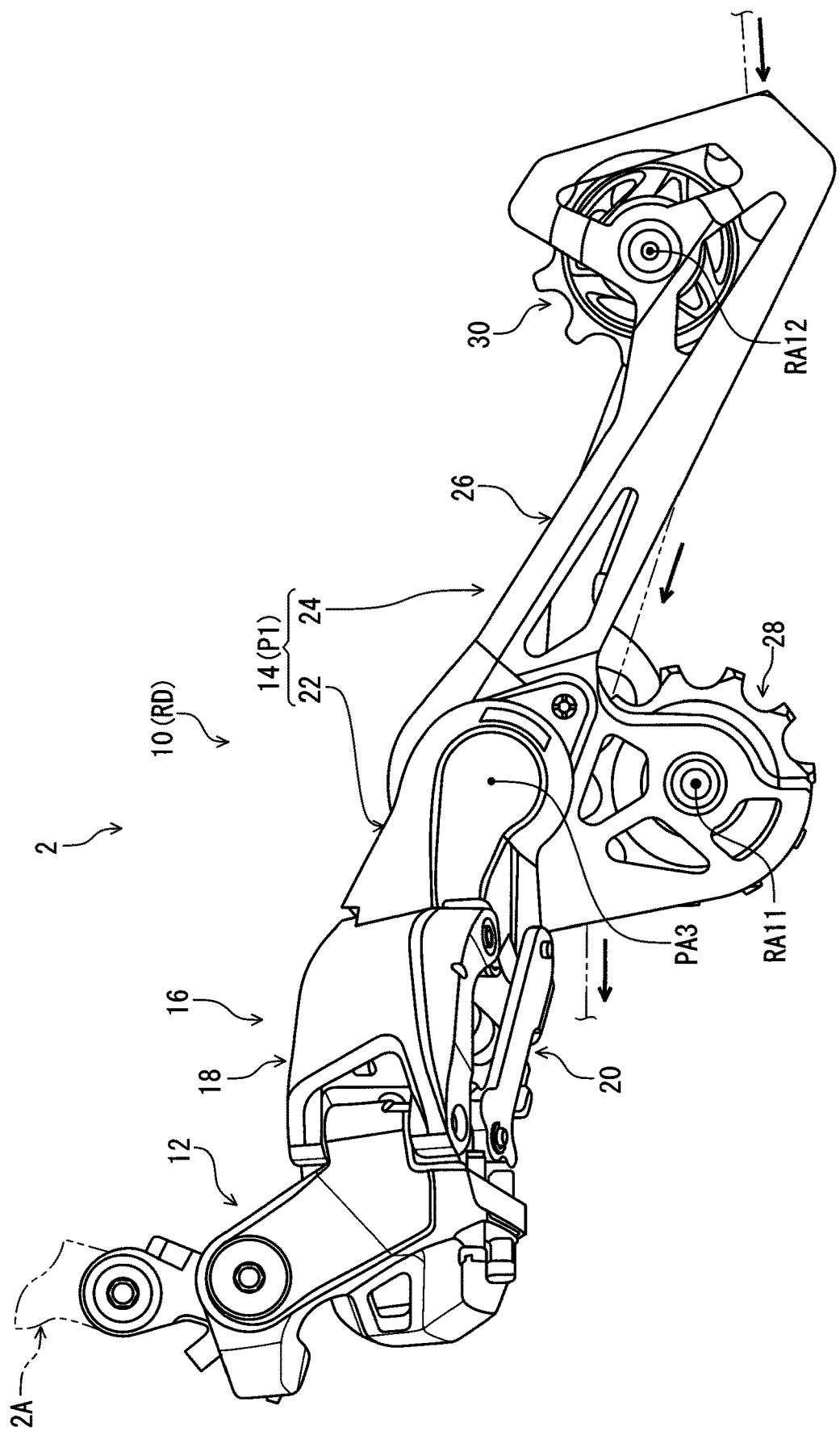
FIG. 4 is a side elevational view of a derailleur of the human-powered vehicle illustrated in FIG. 1 (first position).
Figure 5:
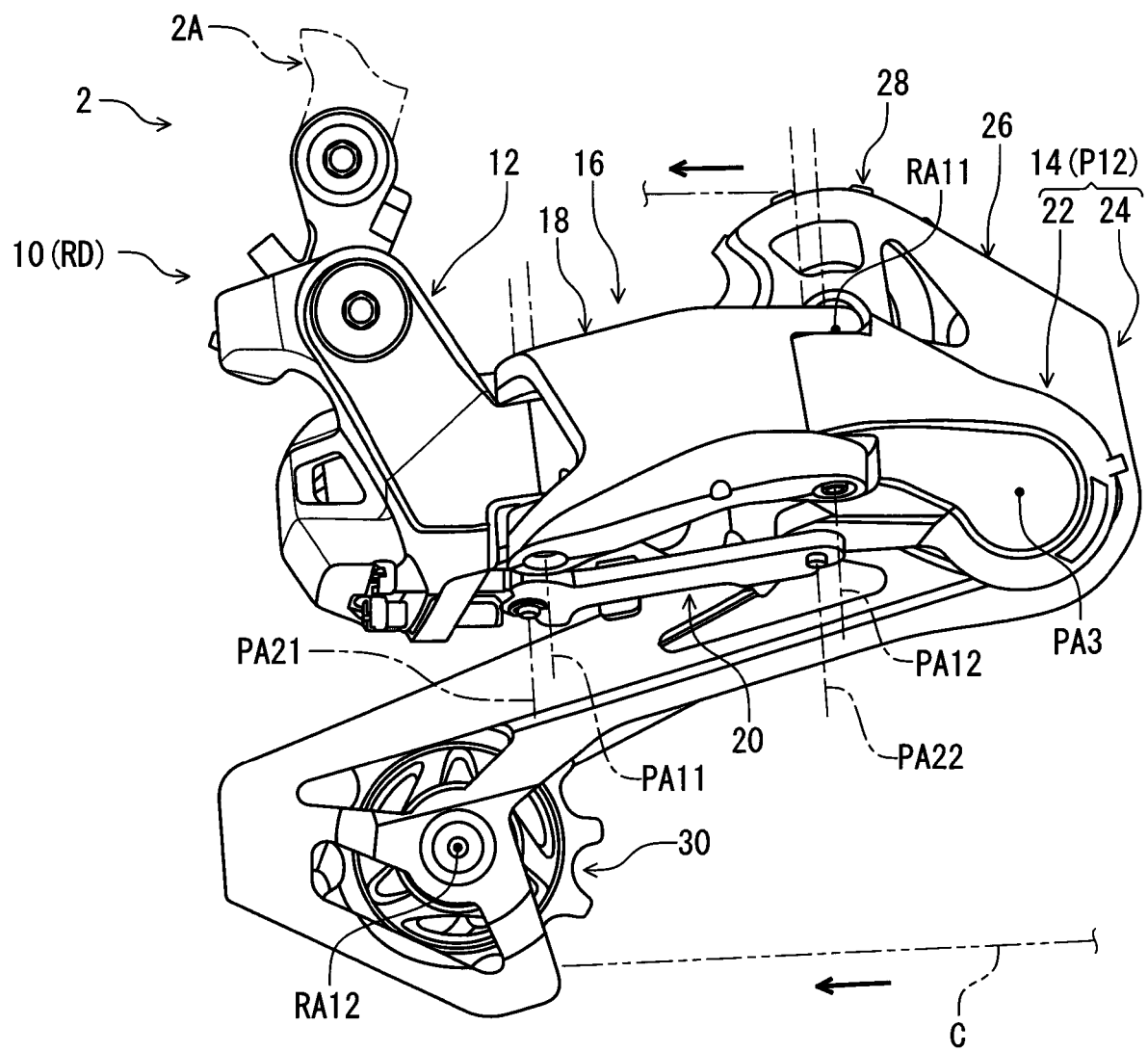
FIG. 5 is a side elevational view of the derailleur of the human-powered vehicle illustrated in FIG. 1 (second position).

As seen in FIGS. 4 and 5, the derailleur RD for the human-powered vehicle 2 comprises a base member 12, a movable member 14, and a linkage 16. The base member 12 is configured to be attached to the vehicle body 2A of the human-powered vehicle 2. The movable member 14 is configured to be movable relative to the base member 12. The linkage 16 is configured to movably connect the movable member 14 to the base member 12.

The linkage 16 includes a first link 18. The first link 18 is pivotally coupled to the base member 12 about a first pivot axis PA11 and is pivotally coupled to the movable member 14 about a first additional pivot axis PA12. The first additional pivot axis PA12 is offset from the first pivot axis PA11. The first additional pivot axis PA12 is parallel to the first pivot axis PA11. However, the first additional pivot axis PA12 can be non-parallel to the first pivot axis PA11 if needed and/or desired.

The linkage 16 includes a second link 20. The second link 20 is pivotally coupled to the base member 12 about a second pivot axis PA21 and is pivotally coupled to the movable member 14 about a second additional pivot axis PA22. The second additional pivot axis PA22 is offset from the second pivot axis PA21. The second additional pivot axis PA22 is parallel to the second pivot axis PA21. However, the second additional pivot axis PA22 can be non-parallel to the second pivot axis PA21 if needed and/or desired.

The movable member 14 includes a movable body 22 and a chain guide 24. The movable body 22 is movably coupled to the base member 12. The linkage 16 is configured to movably connect the movable body 22 to the base member 12. The first link 18 is pivotally coupled to the movable body 22 about the first additional pivot axis PA12. The second link 20 is pivotally coupled to the movable body 22 about the second additional pivot axis PA22.

The chain guide 24 is movably coupled to the movable body 22. The chain guide 24 is pivotally coupled to the movable body 22 about a pivot axis PA3. The chain guide 24 is configured to be engaged with the chain C. The chain guide 24 is configured to shift the chain C relative to the base member 12.

The chain guide 24 includes a guide body 26, a guide pulley 28, and a tension pulley 30. The guide body 26 is pivotally coupled to the movable body 22 about the pivot axis PA3. The guide pulley 28 is rotatably coupled to the guide body 26 about a guide rotational axis RA11. The guide pulley 28 is configured to be engaged with the chain C. The tension pulley 30 is rotatably coupled to the guide body 26 about a tension rotational axis RA12. The tension pulley 30 is configured to be engaged with the chain C. In the first embodiment, the guide rotational axis RA11 and the tension rotational axis RA12 are offset from the pivot axis PA3. However, one of the guide rotational axis RA11 and the tension rotational axis RA12 can be coincident with the pivot axis PA3 if needed and/or desired.

Figure 6:
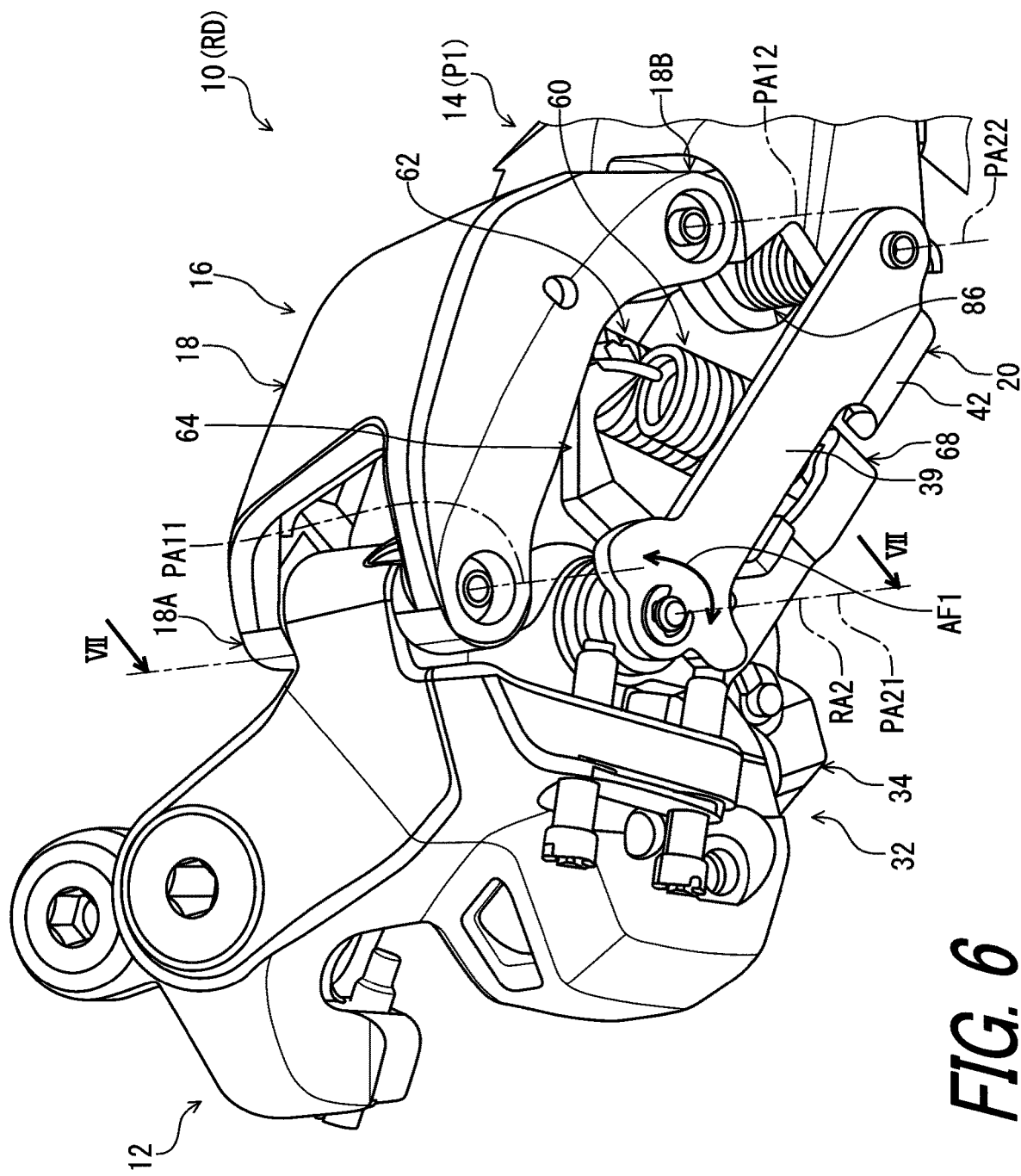
FIG. 6 is a perspective view of the derailleur of the human-powered vehicle illustrated in FIG. 1.

As seen in FIG. 6, the derailleur RD for the human-powered vehicle 2 comprises an electrical actuator 32. The electrical actuator 32 is configured to operatively move the movable member 14 relative to the base member 12. The electrical actuator 32 is configured to generate actuating force AF1 to move the movable member 14 relative to the base member 12. The electrical actuator 32 is attached to the base member 12. The electrical actuator 32 includes an actuator casing 34. The actuator casing 34 is secured to the base member 12. However, the electrical actuator 32 can be attached to members (e.g., the movable member 14 or the linkage 16) other than the base member 12 if needed and/or desired.

Figure 7:
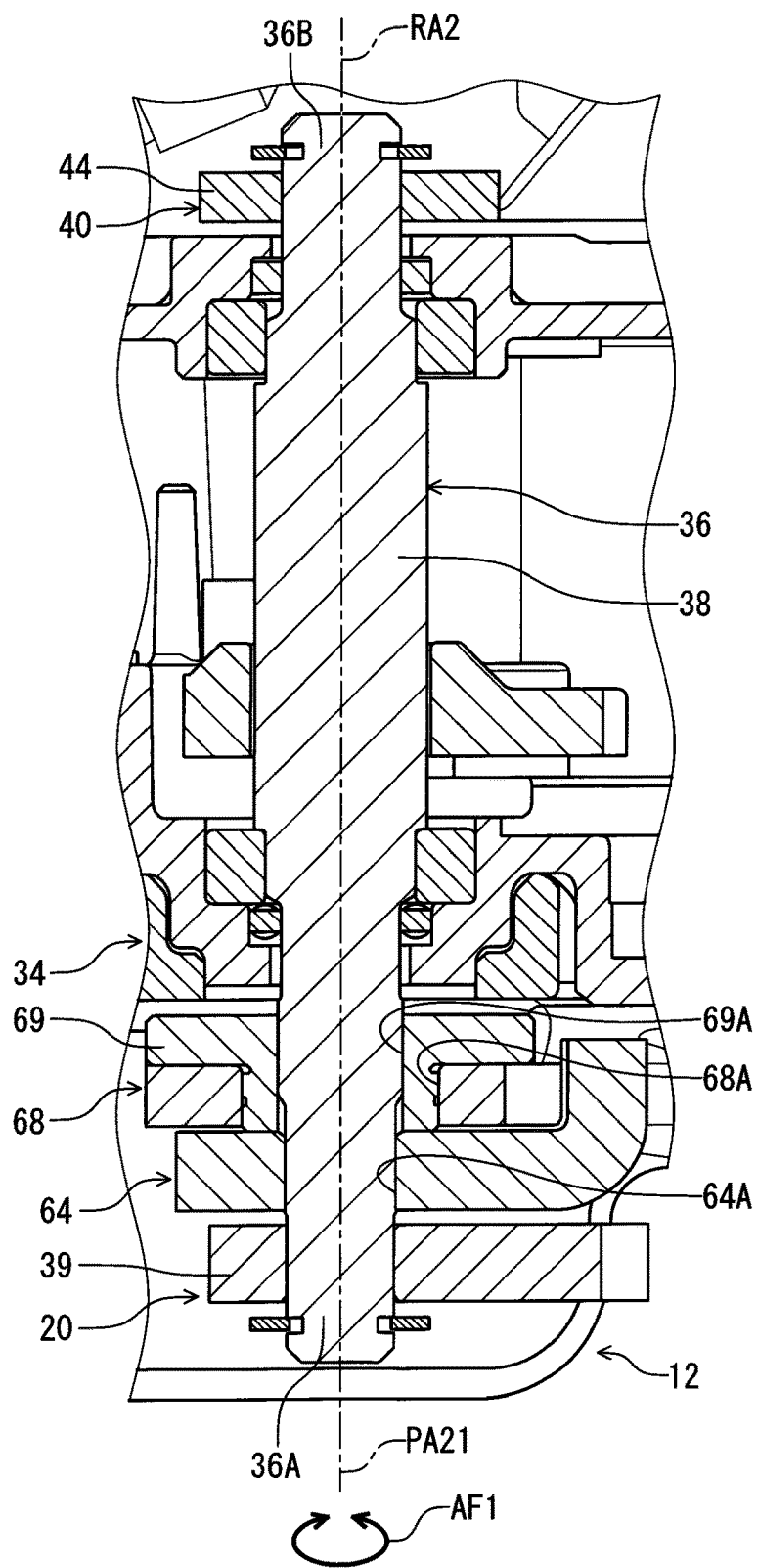
FIG. 7 is a cross-sectional view of the derailleur taken along line VII-VII of FIG. 6.

As seen in FIG. 7, the electrical actuator 32 includes an output part 36. The output part 36 is rotatable relative to the actuator casing 34 about a rotational axis RA2. The output part 36 is configured to rotate relative to the actuator casing 34 about the rotational axis RA2 to output the actuating force AF1. The output part 36 includes a first end 36A and a second end 36B. The output part 36 extends between the first end 36A and the second end 36B along the rotational axis RA2.

In the first embodiment, the output part 36 includes an output shaft 38. The output shaft 38 extends along the rotational axis RA2. The output shaft 38 is rotatable relative to the actuator casing 34 about the rotational axis RA2. However, the structure of the output part 36 is not limited to the output shaft 38.

The second link 20 is pivotally coupled to the first end 36A and the second end 36B about the rotational axis RA2. The second link 20 is pivotally coupled to the base member 12 via the output part 36 about the rotational axis RA2. Namely, the second pivot axis PA21 is coincident with the rotational axis RA2. However, the second pivot axis PA21 can be offset from the rotational axis RA2 if needed and/or desired. The rotational axis RA2 can be coincident with one of the first pivot axis PA11, the first additional pivot axis PA12, and the second additional pivot axis PA22 if needed and/or desired.

Figure 8:
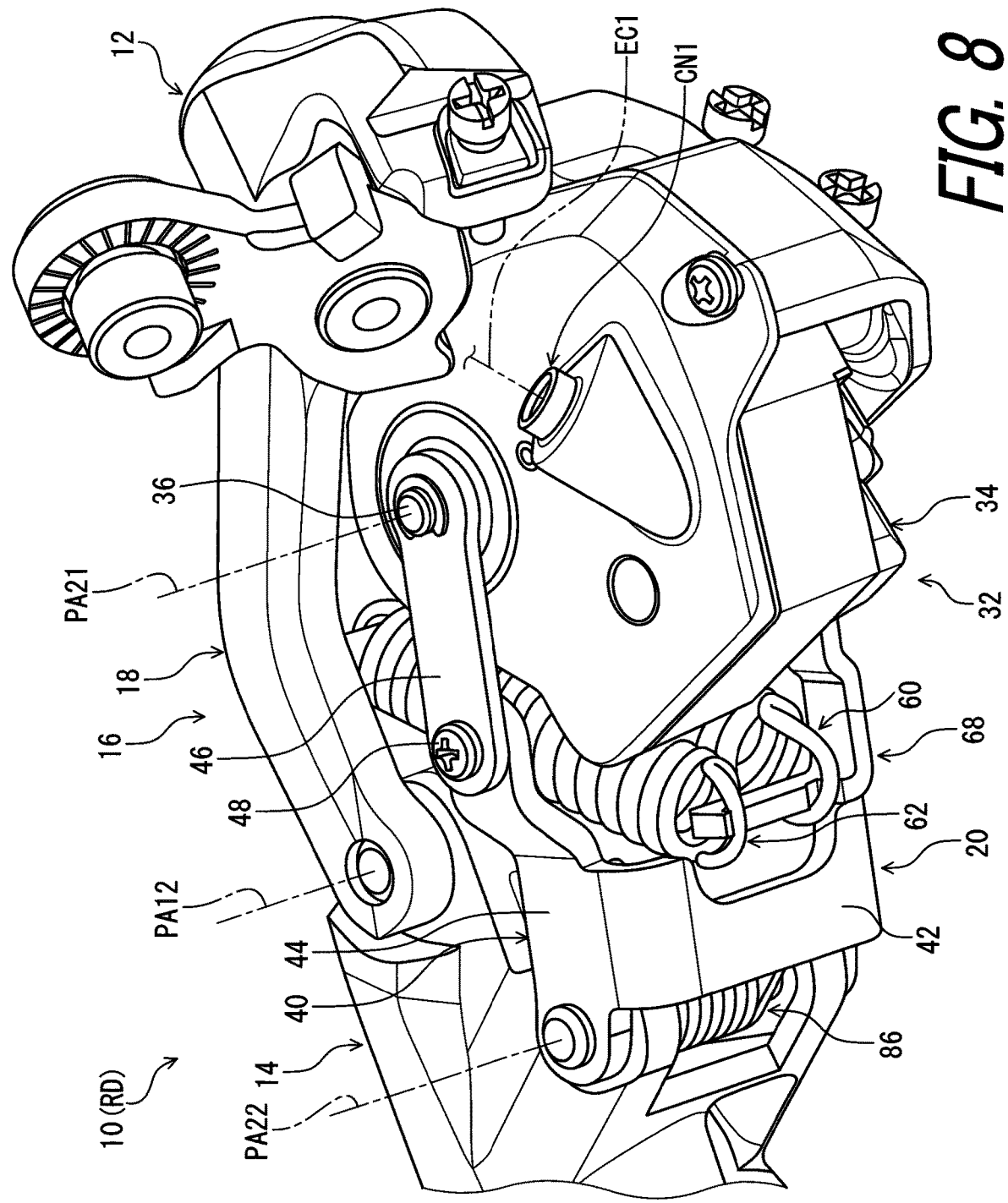
FIG. 8 is a perspective view of the derailleur of the human-powered vehicle illustrated in FIG. 1.

As seen in FIGS. 6 and 8, the second link 20 includes a first lever 39 (see e.g., FIG. 6), a second lever 40 (see e.g., FIG. 8), and an intermediate part 42 (see e.g., FIG. 8). As seen in FIG. 6, the first lever 39 is pivotally coupled to the base member 12 about the second pivot axis PA21 and is pivotally coupled to the movable member 14 about the second additional pivot axis PA22. As seen in FIG. 8, the second lever 40 is pivotally coupled to the base member 12 about the second pivot axis PA21 and is pivotally coupled to the movable member 14 about the second additional pivot axis PA22. The intermediate part 42 couples the first lever 39 to the second lever 40.

As seen in FIG. 8, the second lever 40 includes a lever body 44, an additional lever body 46, and a fastener 48. The additional lever body 46 is a separate member from the lever body 44 and is secured to the lever body 44 with the fastener 48. In the first embodiment, the lever body 44, the first lever 39, and the intermediate part 42 are integrally provided with each other as a one-piece unitary member. However, at least one of the lever body 44 and the second lever 40 can be a separate member from the intermediate part 42 if needed and/or desired. The additional lever body 46 can be integrally provided with the lever body 44 as a one-piece unitary member if needed and/or desired.

As seen in FIG. 6, the first link 18 includes a first link end 18A and a first link opposite end 18B. The first link 18 extends between the first link end 18A and the first link opposite end 18B. The first link end 18A is pivotally coupled to the base member 12 about the first pivot axis PA11. The first link opposite end 18B is pivotally coupled to the movable member 14 about the first additional pivot axis PA12.

Figure 9:
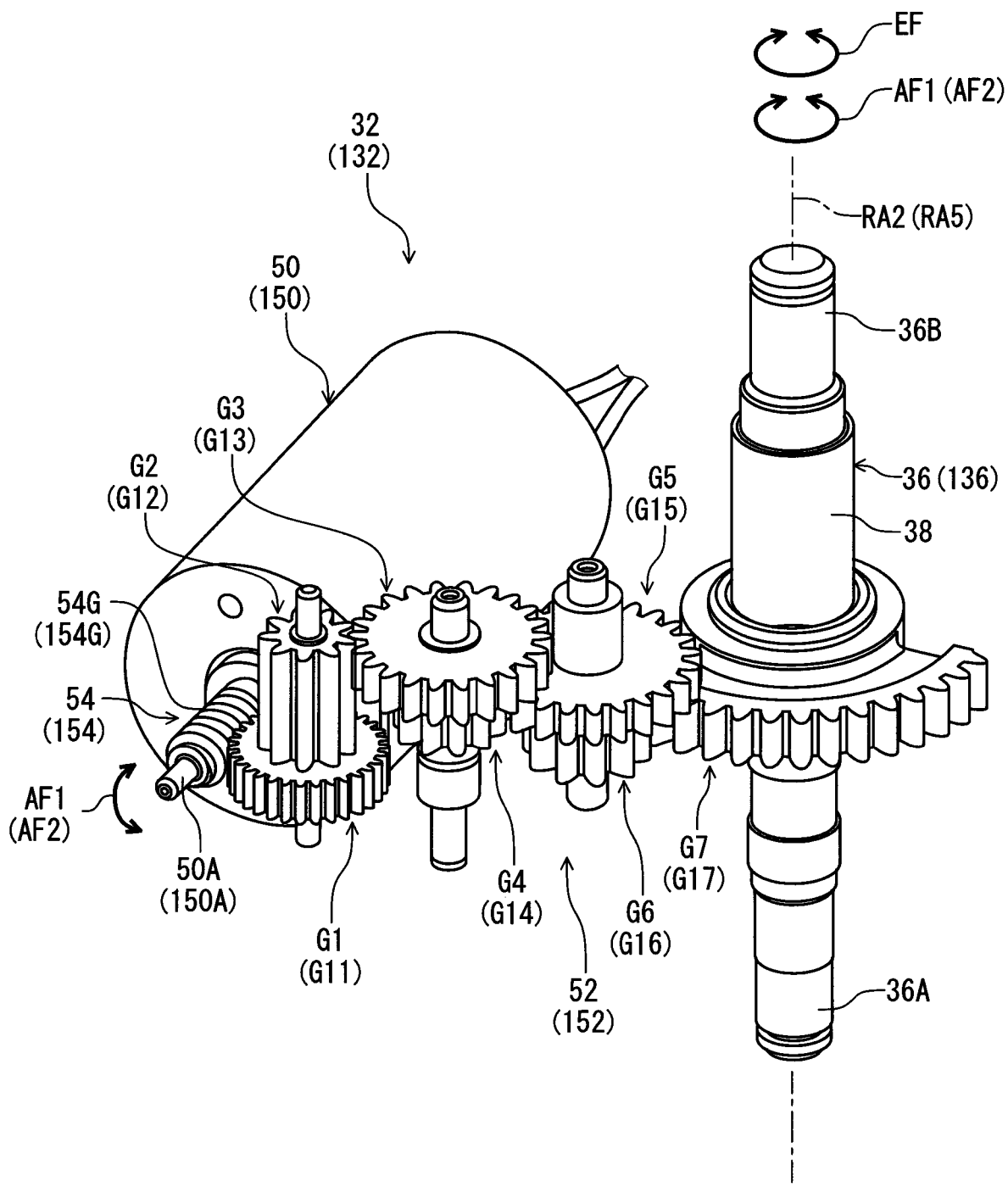
FIG. 9 is a perspective view of an internal structure of an electrical actuator of the derailleur.

As seen in FIG. 9, the electrical actuator 32 includes a motor 50 and a gear structure 52. The motor 50 is configured to generate the actuating force AF1. The gear structure 52 couples the motor 50 to the output part 36 to transmit the actuating force AF1 to from the motor 50 to the output part 36. The motor 50 and the gear structure 52 are provided in the actuator casing 34 (see e.g., FIG. 8).

The motor 50 includes a rotor shaft 50A. The rotor shaft 50A is configured to output the actuating force AF1 to the gear structure 52. The gear structure 52 includes at least one gear. In the first embodiment, the gear structure 52 includes first to seventh gears G1 to G7. The first gear G1 is secured to the second gear G2 to transmit the actuating force AF1 from the first gear G1 to the second gear G2. The second gear G2 meshes with the third gear G3. The third gear G3 is secured to the fourth gear G4 to transmit the actuating force AF1 from the third gear G3 to the fourth gear G4. The fourth gear G4 meshes with the fifth gear G5. The fifth gear G5 is secured to the sixth gear G6 to transmit the actuating force AF1 from the fifth gear G5 to the sixth gear G6. The sixth gear G6 meshes with the seventh gear G7. The seventh gear G7 is secured to the output part 36 to transmit the actuating force AF1 from the seventh gear G7 to the output part 36.

The gear structure 52 includes a rotation restriction structure 54. The rotation restriction structure 54 is configured to allow the output part 36 to rotate in response to the actuating force AF1 generate by the motor 50. The rotation restriction structure 54 is configured to restrict the output part 36 from being rotated by external input force EF applied via at least one of the movable member 14 and the linkage 16 (see e.g., FIG. 6). The rotation restriction structure 54 is configured to restrict the external input force EF from being transmitted from the output part 36 to the motor 50. Thus, the rotation restriction structure 54 is configured to protect the motor 50 from the external input force EF. In the first embodiment, the rotation restriction structure 54 includes a worm gear 54G secured to the rotor shaft 50A of the motor 50. The first gear G1 meshes with the worm gear 54G. However, the rotation restriction structure 54 can include other parts such as a torque diode if needed and/or desired.

Figure 10:
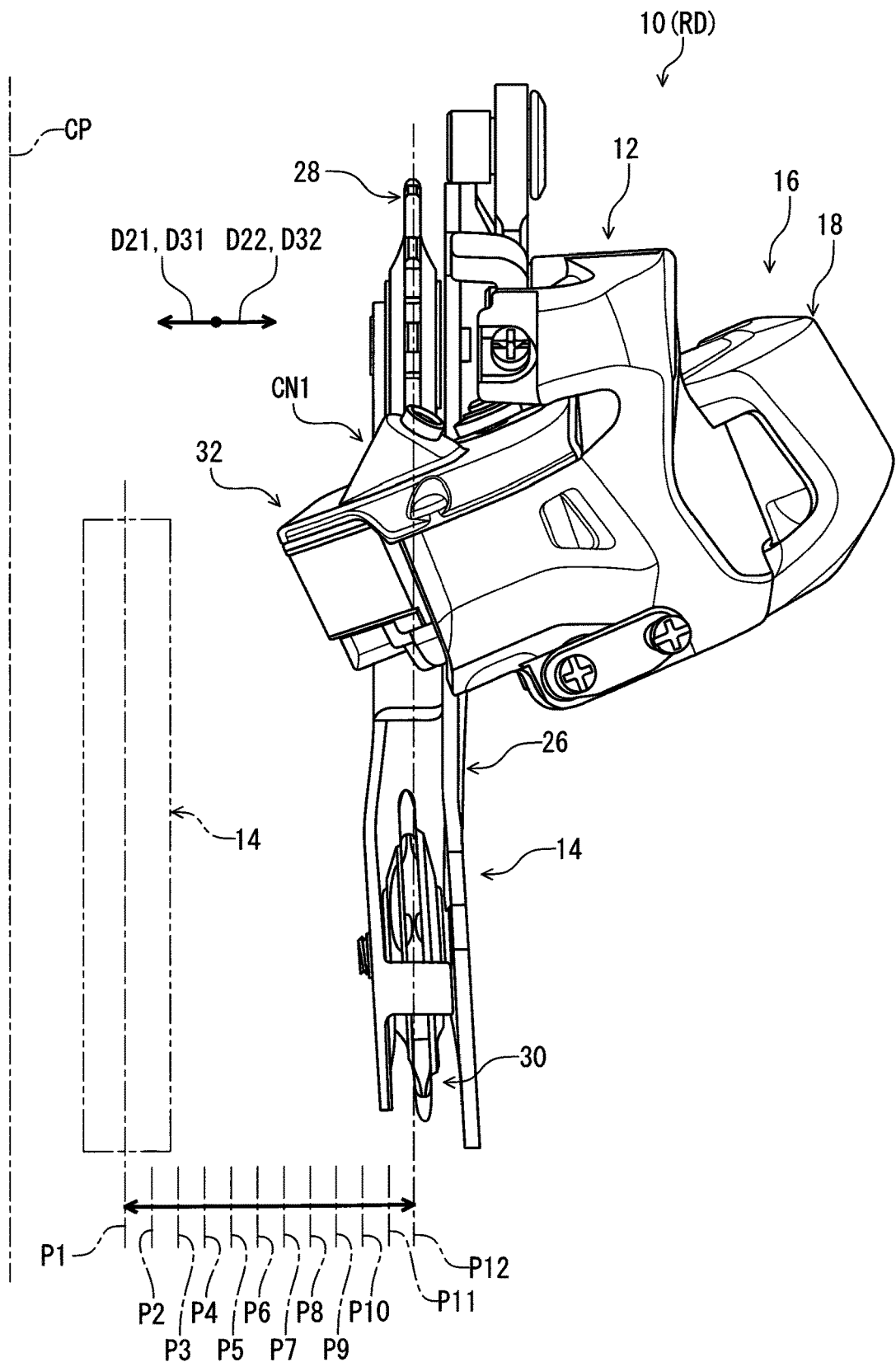
FIG. 10 is a rear view of the derailleur illustrated in FIG. 5.

As seen in FIG. 10, the movable member 14 is configured to be movable relative to the base member 12 in a first direction D21 and a second direction D22 different from the first direction D21. The electrical actuator 32 is configured to operatively move the movable member 14 relative to the base member 12 in the first direction D21 and the second direction D22. In the first embodiment, the second direction D22 is an opposite direction of the first direction D21 and is parallel to the first direction D21. However, the second direction D22 can be other directions different from the first direction D21 if needed and/or desired. For example, the second direction D22 can be inclined relative to the first direction D21 if needed and/or desired.

The movable member 14 is movable relative to the base member 12 in the inward direction D31 toward the transverse center plane CP of the vehicle body 2A. The movable member 14 is movable relative to the base member 12 in the outward direction D32 away from the transverse center plane CP of the vehicle body 2A. The outward direction D32 is an opposite direction of the inward direction D31. The first direction D21 includes the inward direction D31. The second direction D22 includes the outward direction D32. More specifically, the first direction D21 is the inward direction D31. The second direction D22 is the outward direction D32. The first direction D21 and the second direction D22 are perpendicular to the transverse center plane CP of the vehicle body 2A. However, the first direction D21 can include the outward direction D32, and the second direction D22 can include the inward direction D31. At least one of the first direction D21 and the second direction D22 can be non-perpendicular to the transverse center plane CP of the vehicle body 2A if needed and/or desired.

The movable member 14 is movable relative to the base member 12 between a first position P1 and a second position P12. The first position P1 is closer to the transverse center plane CP than the second position P12. The movable member 14 is moved relative to the base member 12 from the second position P12 to the first position P1 in the first direction D21 or the inward direction D31. The movable member 14 is moved relative to the base member 12 from the first position P1 to the second position P12 in the second direction D22 or the outward direction D32. However, the second position P12 can be closer to the transverse center plane CP than the first position P1 if needed and/or desired.

The first position P1 corresponds to the largest sprocket RS1 of the rear sprocket assembly RS (see e.g., FIG. 2). The second position P12 corresponds to the smallest sprocket RS12 of the rear sprocket assembly RS (see e.g., FIG. 2). The first position P1 corresponds to an innermost position and/or a low gear position. The second position P12 corresponds to an outermost position and/or a top gear position. The first position P1 can also be referred to as an innermost end position P1 or a low-gear position P1. The second position P12 can also be referred to as an outermost end position P12 or a top-gear position P12. However, the first position P1 can correspond to the smallest sprocket RS12, an outermost position, and/or a top gear position. The second position P12 can correspond to the largest sprocket RS1, an innermost position, and/or a low gear position.

The electrical actuator 32 is configured to move the movable member 14 in the first direction D21 or the inward direction D31 in response to the first control signal CS11 (see e.g., FIG. 3). The electrical actuator 32 is configured to move the movable member 14 in the second direction D22 or the outward direction D32 in response to the first additional control signal CS12 (see e.g., FIG. 3).

The electrical actuator 32 is configured to stop the movable member 14 in at least one intermediate position which is different from the first position P1 and the second position P12. The at least one intermediate position is defined between the first position P1 and the second position P12.

In the first embodiment, the electrical actuator 32 is configured to stop the movable member 14 in each of a plurality of intermediate positions P2 to P11. The electrical actuator 32 is configured to position the movable member 14 in each of the plurality of intermediate positions P2 to P11. The intermediate positions P2 to P11 are arranged in the second direction D22 in this order. The intermediate position P2 is the closest to the first position P1 among the intermediate positions P2 to P11. The intermediate position P11 is the closest to the second position P12 among the intermediate positions P2 to P11. The total number of the intermediate positions is not limited to the above embodiment.

Figure 11:
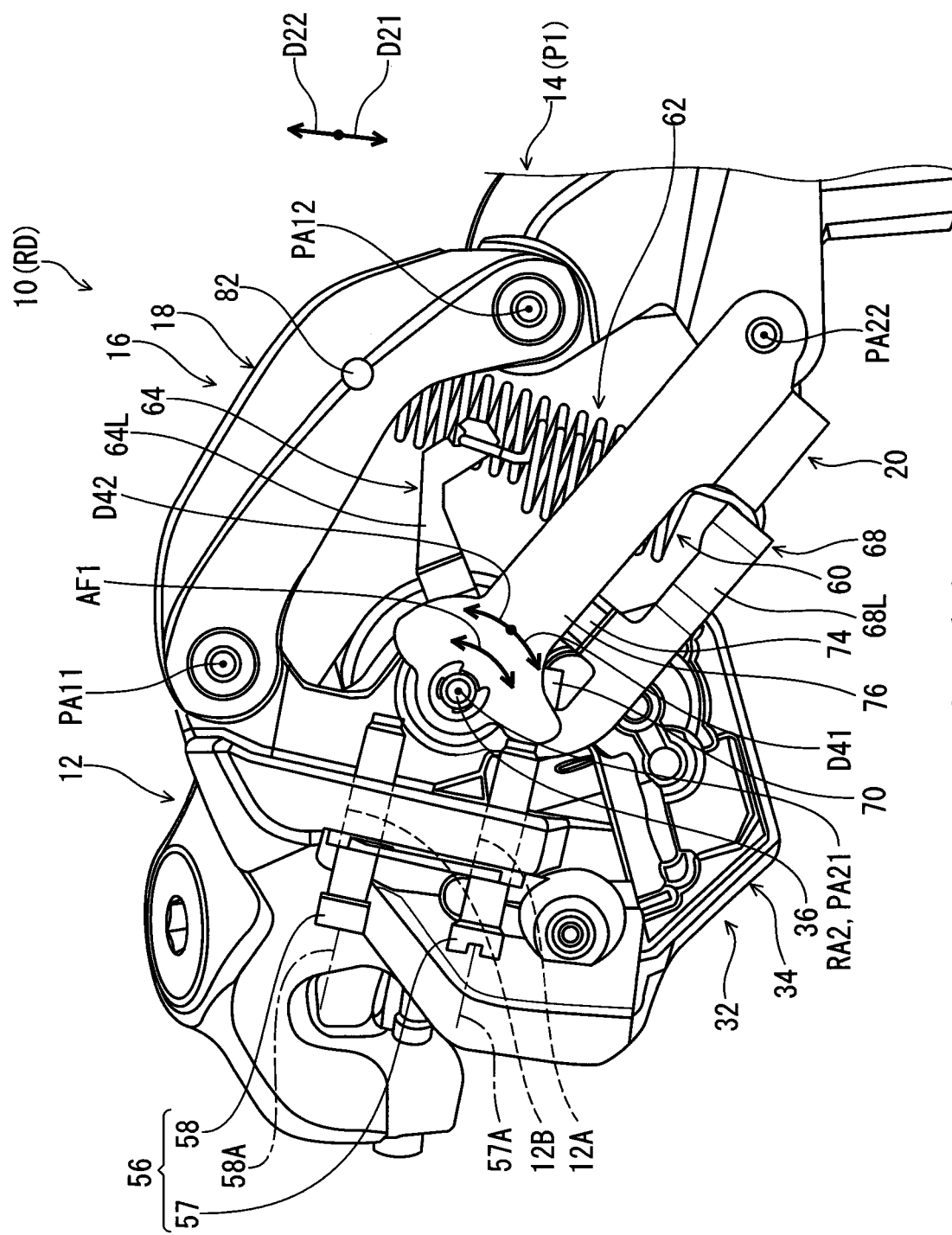
FIG. 11 is a perspective view of the derailleur illustrated in FIG. 4 (first position).
Figure 12:
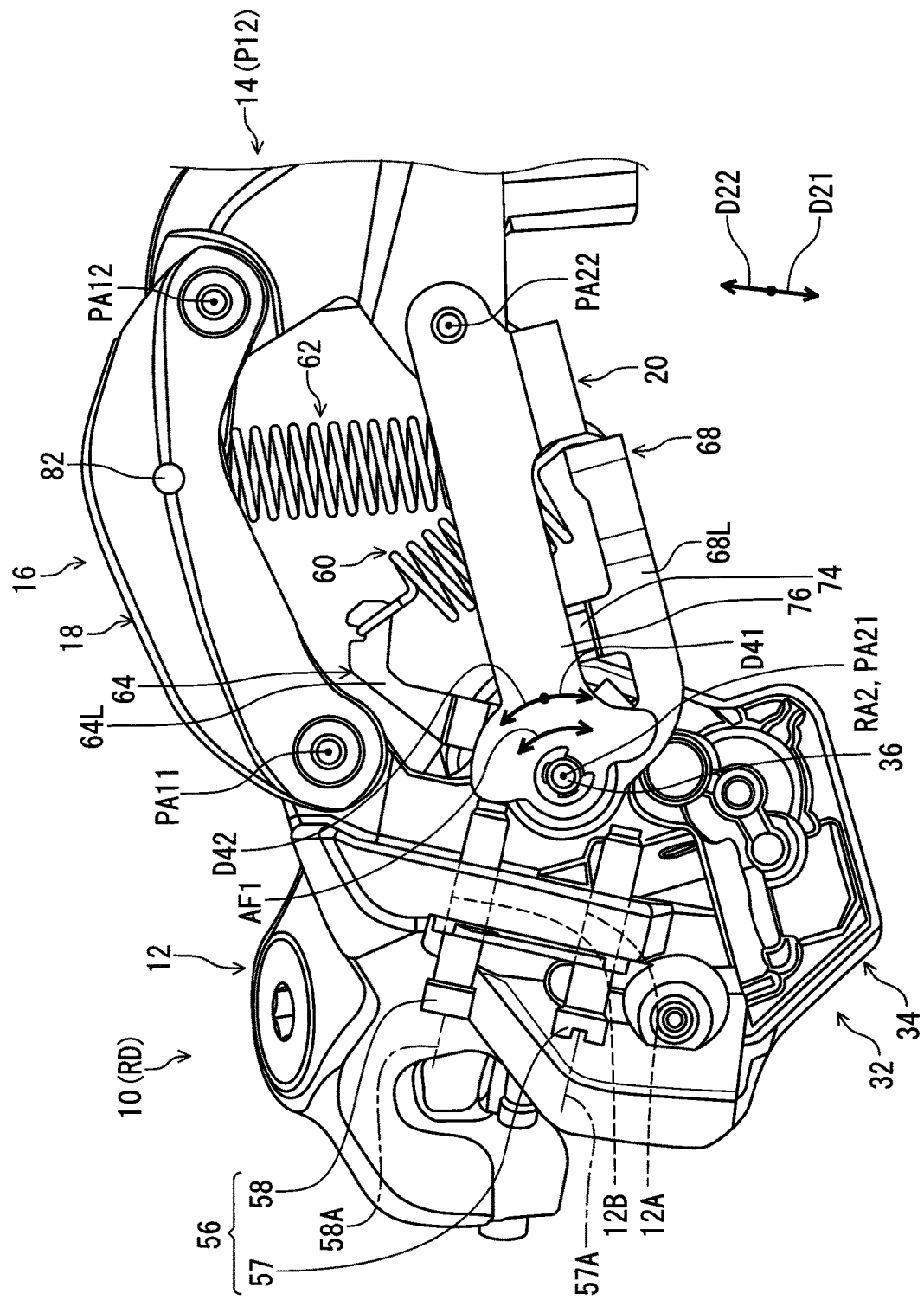
FIG. 12 is a perspective view of the derailleur illustrated in FIG. 5 (second position).

FIGS. 4 and 11 show a state of the derailleur RD in which the movable member 14 is in the first position P1. FIGS. 4 and 12 show a state of the derailleur RD in which the movable member 14 is in the second position P12. In FIGS. 11 and 12, the chain guide 24 is omitted from the movable member 14.

As seen in FIGS. 11 and 12, the derailleur RD includes an adjustment structure 56. The adjustment structure 56 is configured to change an amount of movement of the movable member 14. The adjustment structure 56 is configured to change the first position P1 relative to the base member 12 in the first direction D21 or the second direction D22. The adjustment structure 56 is configured to change the second position P12 relative to the base member 12 in the first direction D21 or the second direction D22.

The adjustment structure 56 is configured to stop the movable member 14 in the first position P1 when the movable member 14 is moved toward the first position P1 in the first direction D21. The adjustment structure 56 is configured to position the movable member 14 in the first position P1. The adjustment structure 56 is configured to stop the movable member 14 in the second position P12 when the movable member 14 is moved toward the second position P12 in the second direction D22. The adjustment structure 56 is configured to position the movable member 14 in the second position P12.

The adjustment structure 56 includes a first adjustment screw 57 and a second adjustment screw 58. The first adjustment screw 57 is attached to the base member 12. The second adjustment screw 58 is attached to the base member 12. The base member 12 includes a first threaded hole 12A and a second threaded hole 12B. The first adjustment screw 57 is threadedly engaged with the first threaded hole 12A. The second adjustment screw 58 is threadedly engaged with the second threaded hole 12B.

The first adjustment screw 57 is contactable with at least one of the movable member 14 and the linkage 16. The second adjustment screw 58 is contactable with at least one of the movable member 14 and the linkage 16. In the first embodiment, the first adjustment screw 57 is contactable with the second link 20 of the linkage 16. The second adjustment screw 58 is contactable with the second link 20 of the linkage 16. As seen in FIG. 11, the first adjustment screw 57 is in contact with the second link 20 in a first state where the movable member 14 is in the first position P1. As seen in FIG. 12, the second adjustment screw 58 is in contact with the second link 20 in a second state where the movable member 14 is in the second position P12. However, the first adjustment screw 57 can be configured to be contactable with the first link 18 of the linkage 16 or the movable member 14 if needed and/or desired. The second adjustment screw 58 can be configured to be contactable with the first link 18 of the linkage 16 or the movable member 14 if needed and/or desired.

Rotation of the first adjustment screw 57 relative to the base member 12 moves the first adjustment screw 57 relative to the base member 12 along a first longitudinal axis 57A of the first adjustment screw 57. Thus, rotation of the first adjustment screw 57 relative to the base member 12 changes the first position P1 of the movable member 14.

Rotation of the second adjustment screw 58 relative to the base member 12 moves the second adjustment screw 58 relative to the base member 12 along a second longitudinal axis 58A of the second adjustment screw 58. Thus, rotation of the second adjustment screw 58 relative to the base member 12 changes the second position P12 of the movable member 14.

As seen in FIGS. 11 and 12, the derailleur RD for the human-powered vehicle 2 comprises a first biasing member 60 and a second biasing member 62. The second biasing member 62 is a separate member from the first biasing member 60.

The electrical actuator 32 is configured to move the movable member 14 in the first direction D21 via the second biasing member 62 if the output part 36 of the electrical actuator 32 rotates in a first rotational direction D41. The second biasing member 62 is configured to transmit the actuating force AF1 to the first link 18 in response to a first rotation of the output part 36 of the electrical actuator 32 in the first rotational direction D41. The movable member 14 is configured to move relative to the base member 12 in the first direction D21 in response to the actuating force AF1 transmitted from the output part 36 of the electrical actuator 32 via the second biasing member 62.

The electrical actuator 32 is configured to move the movable member 14 in the second direction D22 via the first biasing member 60 if the output part 36 of the electrical actuator 32 rotates in a second rotational direction D42 which is an opposite direction of the first rotational direction D41. The first biasing member 60 is configured to transmit the actuating force AF1 to the second link 20 in response to a second rotation of the output part 36 of the electrical actuator 32 in the second rotational direction D42. The movable member 14 is configured to move relative to the base member 12 in the second direction D22 in response to the actuating force AF1 transmitted from the output part 36 of the electrical actuator 32 via the first biasing member 60.

As seen in FIG. 11, the output part 36 is configured to operatively coupled to the movable member 14 to move the movable member 14 relative to the base member 12. The derailleur RD further comprises an output member 64. The output member 64 is coupled to the output part 36 of the electrical actuator 32 to rotate along with the output part 36. The output member 64 is rotatable relative to the actuator casing 34 about the rotational axis RA2 along with the output part 36 of the electrical actuator 32.

The output part 36 is coupled to the output member 64 to transmit the actuating force AF1 from the output part 36 to the output member 64 in the first rotational direction D41 and the second rotational direction D42. The output part 36 is secured to the output member 64 to transmit the actuating force AF1 from the output part 36 to the output member 64 in the first rotational direction D41 and the second rotational direction D42.

In the first embodiment, the output member 64 extends radially outwardly from the rotational axis RA2 of the output part 36. The output member 64 includes an output lever 64L. The output lever 64L extends radially outwardly from the rotational axis RA2 of the output part 36. However, the structure of the output member 64 is not limited to the output lever 64L.

As seen in FIG. 11, the derailleur RD further comprises a saver member 68. The saver member 68 is pivotally coupled to at least one of the base member 12, the movable member 14, the linkage 16, and the electrical actuator 32. In the first embodiment, the saver member 68 is pivotally coupled to the base member 12 through the output part 36 of the electrical actuator 32. The saver member 68 is pivotally coupled to the output part 36 of the electrical actuator 32. The saver member 68 is pivotable relative to the output part 36 of the electrical actuator 32 about the rotational axis RA2.

In the first embodiment, the saver member 68 extends radially outwardly from the rotational axis RA2 of the output part 36. The saver member 68 includes a saver lever 68L. The saver lever 68L extends radially outwardly from the rotational axis RA2 of the output part 36. However, the structure of the saver member 68 is not limited to the saver lever 68L.

Figure 13:
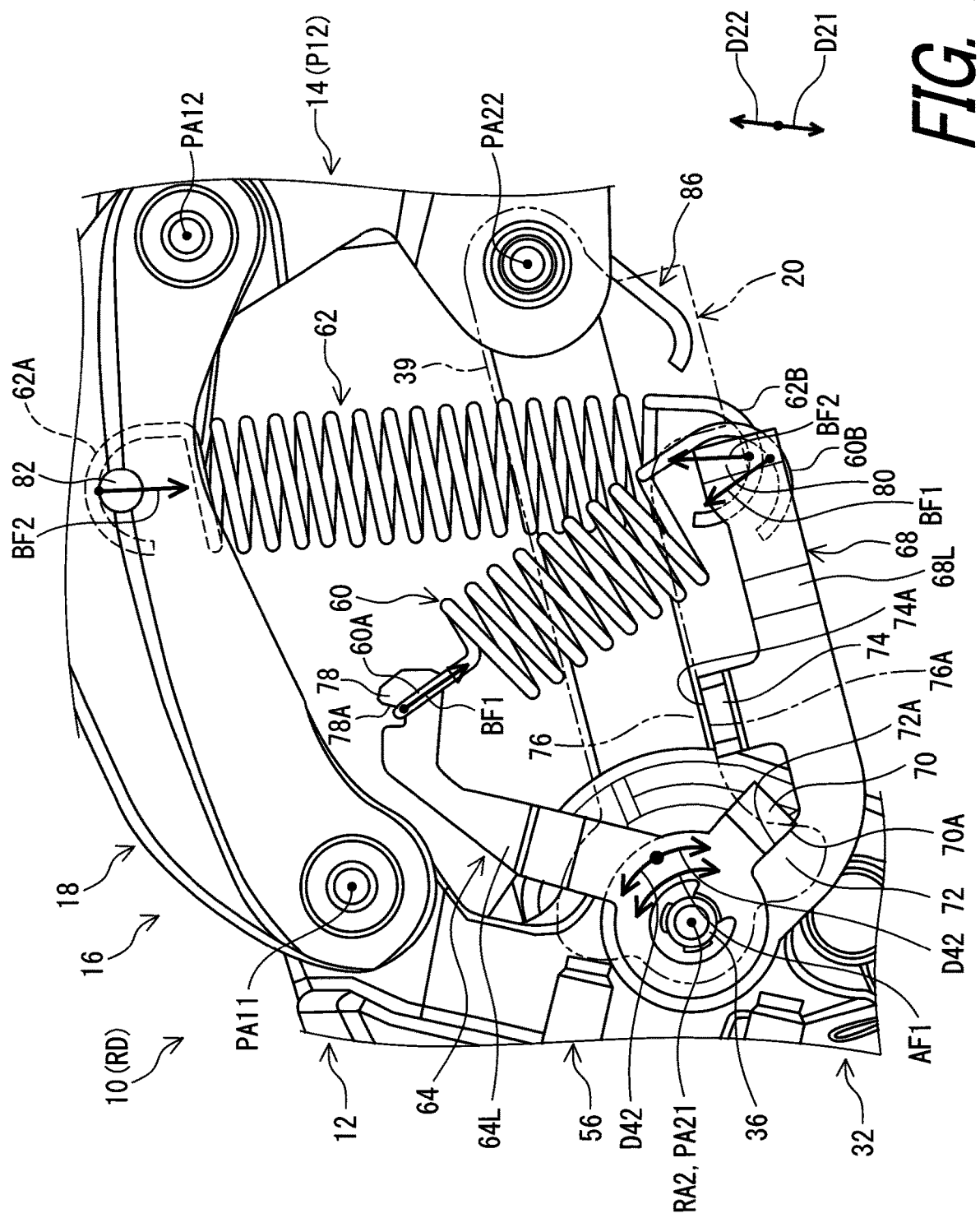
FIG. 13 is an enlarged partial perspective view of the derailleur illustrated in FIG. 5, with a second link omitted (second position).

As seen in FIG. 13, the second link 20, the output member 64, and the saver member 68 are provided to at least partially overlap with each other as viewed along the rotational axis RA2 or the second pivot axis PA21. In the first embodiment, the second link 20, the output member 64, and the saver member 68 are provided to partially overlap with each other as viewed along the rotational axis RA2 or the second pivot axis PA21. However, at least one of the second link 20, the output member 64, and the saver member 68 can be provided to entirely overlap with another of the second link 20, the output member 64, and the saver member 68 as viewed along the rotational axis RA2 or the second pivot axis PA21 if needed and/or desired.

As seen in FIG. 7, the output member 64 is secured to the output part 36 of the electrical actuator 32. The output member 64 includes a hole 64A. The output part 36 of the electrical actuator 32 is press-fitted in the hole 64A of the output member 64. In the first embodiment, the output part 36 of the electrical actuator 32 is a separate member from the output member 64. However, the output part 36 of the electrical actuator 32 can be integrally provided with the output member 64 as a one-piece unitary member if needed and/or desired.

The saver member 68 includes a hole 68A. The output part 36 of the electrical actuator 32 is rotatably provided in the hole 68A of the saver member 68 about the rotational axis RA2. The output part 36 includes an intermediate member 69. The intermediate member 69 is secured to the output shaft 38. The intermediate member 69 includes a hole 69A. The output shaft 38 is press-fitted in the hole 69A of the intermediate member 69. The intermediate member 69 is slidably provided in the hole 68A of the saver member 68. The intermediate member 69 can be integrally provided with the output shaft 38 as a one-piece unitary member if needed and/or desired.

The output part 36 is configured to couple the second link 20, the output member 64, and the saver member 68. The output part 36 and the output member 64 are pivotable relative to the base member 12, the second link 20, and the saver member 68 about the rotational axis RA2 and the second pivot axis PA21. The second link 20 is pivotable relative to the base member 12, the output part 36, the output member 64, and the saver member 68 about the rotational axis RA2 and the second pivot axis PA21. The saver member 68 is pivotable relative to the base member 12, the output part 36, the output member 64, and the second link 20 about the rotational axis RA2 and the second pivot axis PA21.

As seen in FIG. 13, the second biasing member 62, the output member 64, and the saver member 68 are configured to transmit the actuating force AF1 to the first link 18 in response to the first rotation of the output part 36 of the electrical actuator 32. The first biasing member 60, the output member 64, and the saver member 68 are configured to transmit the actuating force AF1 to the second link 20 in response to the second rotation of the output part 36 of the electrical actuator 32.

The output member 64 includes a first contact part 70 contactable with the saver member 68. The saver member 68 includes a first additional contact part 72 contactable with the first contact part 70 of the output member 64. The first contact part 70 includes a first contact surface 70A contactable with the first additional contact part 72. The first additional contact part 72 includes a first additional contact surface 72A contactable with the first contact surface 70A. The first contact surface 70A faces in the first rotational direction D41. The first additional contact surface 72A faces in the second rotational direction D42.

The first biasing member 60 is initially extended between the output member 64 and the saver member 68 in a state where the first contact part 70 is in contact with the first additional contact part 72. Thus, the first contact part 70 is pressed against the first additional contact part 72 by first biasing force BF1 of the first biasing member 60.

The first contact part 70 is pressed against the first additional contact part 72 in response to a pivotal movement of the output member 64 in the first rotational direction D41. The first additional contact part 72 is pressed against the first contact part 70 in response to a pivotal movement of the saver member 68 in the second rotational direction D42. Thus, the saver member 68 is configured to pivot relative to the one of the base member 12 and the movable member 14 in the first rotational direction D41 in response to a rotation of the output member 64 in the first rotational direction D41. The output member 64 is configured to pivot relative to the one of the base member 12 and the movable member 14 in the second rotational direction D42 in response to a rotation of the saver member 68 in the second rotational direction D42.

The saver member 68 includes a second contact part 74 contactable with the second link 20. The second link 20 includes a second additional contact part 76 contactable with the second contact part 74 of the saver member 68. The second contact part 74 includes a second contact surface 74A contactable with the second additional contact part 76. The second additional contact part 76 includes a second additional contact surface 76A contactable with the second contact surface 74A. The second contact surface 74A faces in the second rotational direction D42. The second additional contact surface 76A faces in the first rotational direction D41.

The second biasing member 62 is initially extended between the first link 18 and the saver member 68 in a state where the second contact part 74 is in contact with the second additional contact part 76. Thus, the second contact part 74 is pressed against the second additional contact part 76 by second biasing force BF2 of the second biasing member 62.

The second contact part 74 is pressed against the second additional contact part 76 in response to a pivotal movement of the saver member 68 in the second rotational direction D42. The second additional contact part 76 is pressed against the second contact part 74 in response to a pivotal movement of the second link 20 in the first rotational direction D41. Thus, the saver member 68 is configured to pivot relative to the one of the base member 12 and the movable member 14 in the first rotational direction D41 in response to a rotation of the second link 20 in the first rotational direction D41. The second link 20 is configured to pivot relative to the one of the base member 12 and the movable member 14 in the second rotational direction D42 in response to a rotation of the saver member 68 in the second rotational direction D42.

Figure 14:
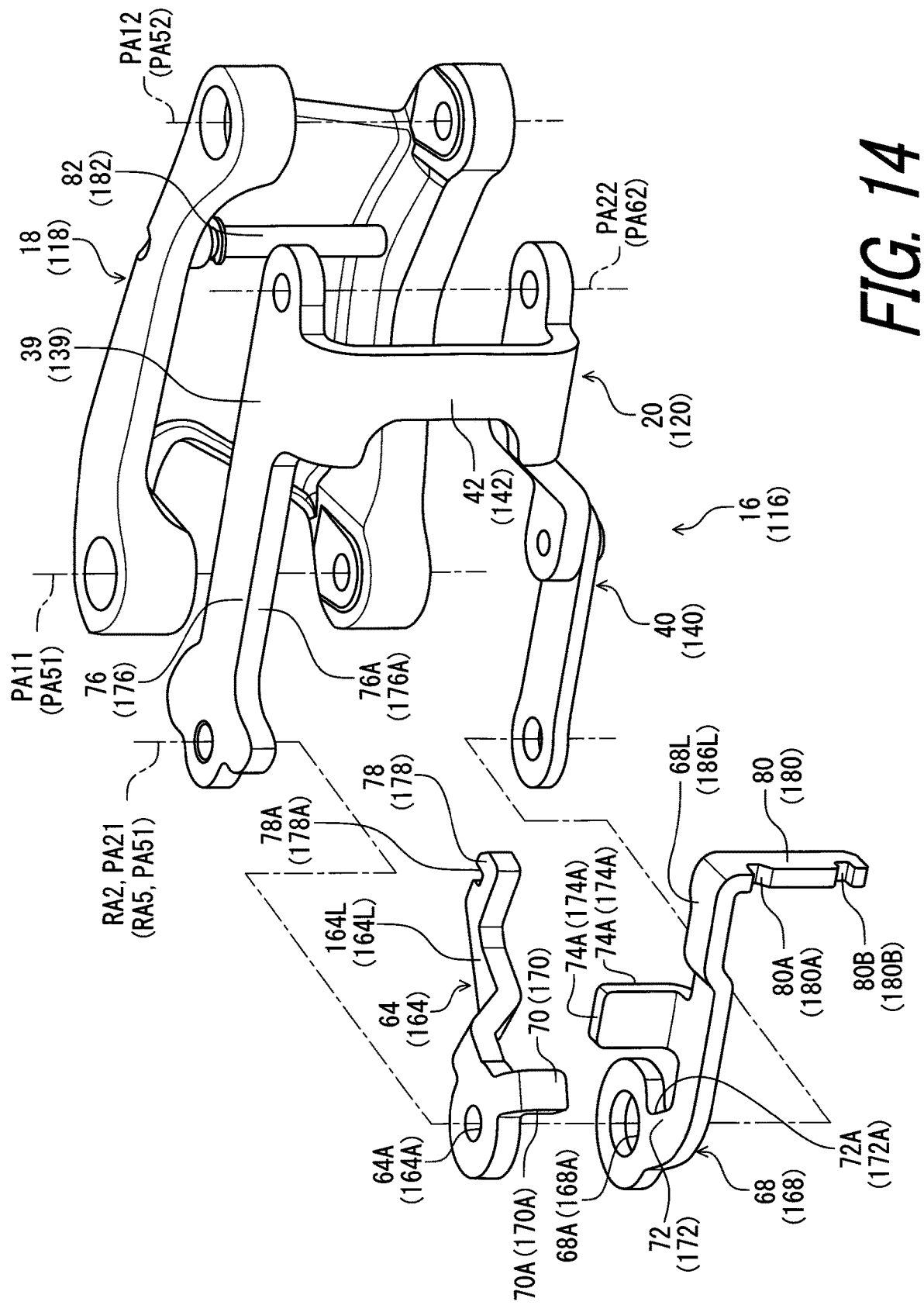
FIG. 14 is an exploded perspective view of a linkage, an output member, and a saver member of the derailleur illustrated in FIG. 4.

As seen in FIG. 14, the first contact part 70 extends from the output lever 64L along the second pivot axis PA21. The saver lever 68L includes the first additional contact part 72. The second contact part 74 extends from the saver lever 68L along the second pivot axis PA21. The first lever 39 includes the second additional contact part 76.

The output member 64 includes a first coupling part 78. The first coupling part 78 includes a first coupling recess 78A. The saver member 68 includes a second coupling part 80. The second coupling part 80 includes second coupling recesses 80A and 80B. The first link 18 includes a third coupling part 82.

As seen in FIG. 13, the first biasing member 60 is coupled to the first coupling part 78 and the second coupling part 80. The second biasing member 62 is coupled to the second coupling part 80 and the third coupling part 82.

The first biasing member 60 includes a first end 60A and a first opposite end 60B. The first end 60A of the first biasing member 60 is operatively coupled to the output part 36 of the electrical actuator 32. In the first embodiment, the first end 60A of the first biasing member 60 is coupled to the output member 64. The first opposite end 60B of the first biasing member 60 is coupled to the saver member 68.

The first end 60A of the first biasing member 60 is coupled to the first coupling part 78 of the output member 64. The first end 60A of the first biasing member 60 is provided in the first coupling recess 78A of the first coupling part 78. The first opposite end 60B of the first biasing member 60 is coupled to the second coupling part 80 of the saver member 68. The first opposite end 60B of the first biasing member 60 is provided in the second coupling recess 80A (see e.g., FIG. 14) of the second coupling part 80.

As seen in FIG. 13, the second biasing member 62 includes a second end 62A and a second opposite end 62B. The second end 62A of the second biasing member 62 is coupled to the first link 18. The second opposite end 62B of the second biasing member 62 is coupled to the saver member 68. The saver member 68 is coupled to the first biasing member 60 and the second biasing member 62.

The second end 62A of the second biasing member 62 is coupled to the third coupling part 82 of the first link 18. The second opposite end 62B of the second biasing member 62 is coupled to the second coupling part 80 of the saver member 68. The second opposite end 62B of the second biasing member 62 is provided in the second coupling recess 80B (see e.g., FIG. 14) of the second coupling part 80.

As seen in FIG. 8, the derailleur RD comprises a third biasing member 86. The third biasing member 86 is configured to apply third biasing force to at least one of the movable member 14 and the linkage 16 to move the movable member 14 relative to the base member 12 in one of the first direction D21 and the second direction D22. In the first embodiment, the third biasing member 86 is configured to apply the third biasing force to the movable member 14 and the linkage 16 to move the movable member 14 relative to the base member 12 in the second direction D22. The third biasing member 86 is configured to apply the third biasing force to the movable member 14 and the linkage 16 to move the movable member 14 toward the second position P12 in the second direction D22. However, the third biasing member 86 is configured to apply at least one of the third biasing force to the movable member 14 and the linkage 16 to move the movable member 14 relative to the base member 12 in the first direction D21 if needed and/or desired.

As seen in FIG. 13, since the first contact part 70 is in contact with the first additional contact part 72, the saver member 68 is rotated about the rotational axis RA2 in the first rotational direction D41 when the electrical actuator 32 rotates the output member 64 in the first rotational direction D41. Since the second biasing force BF2 is greater than force necessary to shift the chain C, the first link 18 is pulled by the saver member 68 in the first direction D21 while the initial state of the second biasing member 62 is maintained. Namely, the second biasing member 62 is configured to transmit the actuating force AF1 to the first link 18 in response to the first rotation of the output part 36 of the electrical actuator 32 in the first rotational direction D41. Thus, the chain C is shifted in the first direction D21 (e.g., the inward direction D31 in the first embodiment) relative to the rear sprocket assembly RS by a distance (e.g., a distance between adjacent two rear sprockets) corresponding to a rotational angle of the output part 36 of the electrical actuator 32.

Since the first biasing force BF1 is greater than force necessary to shift the chain C, the saver member 68 is rotated about the rotational axis RA2 in the second rotational direction D42 when the electrical actuator 32 rotates the output member 64 in the second rotational direction D42. Since the second contact part 74 is in contact with the second additional contact part 76, the second link 20 is rotated about the second pivot axis PA21 in the second rotational direction D42 in response to the rotation of the saver member 68 in the second rotational direction D42. Namely, the first biasing member 60 is configured to transmit the actuating force AF1 to the second link 20 in response to the second rotation of the output part 36 of the electrical actuator 32 in the second rotational direction D42. Thus, the chain C is shifted in the second direction D22 (e.g., the outward direction D32 in the first embodiment) relative to the rear sprocket assembly RS by a distance (e.g., a distance between adjacent two rear sprockets) corresponding to a rotational angle of the output part 36 of the electrical actuator 32.

Figure 15:
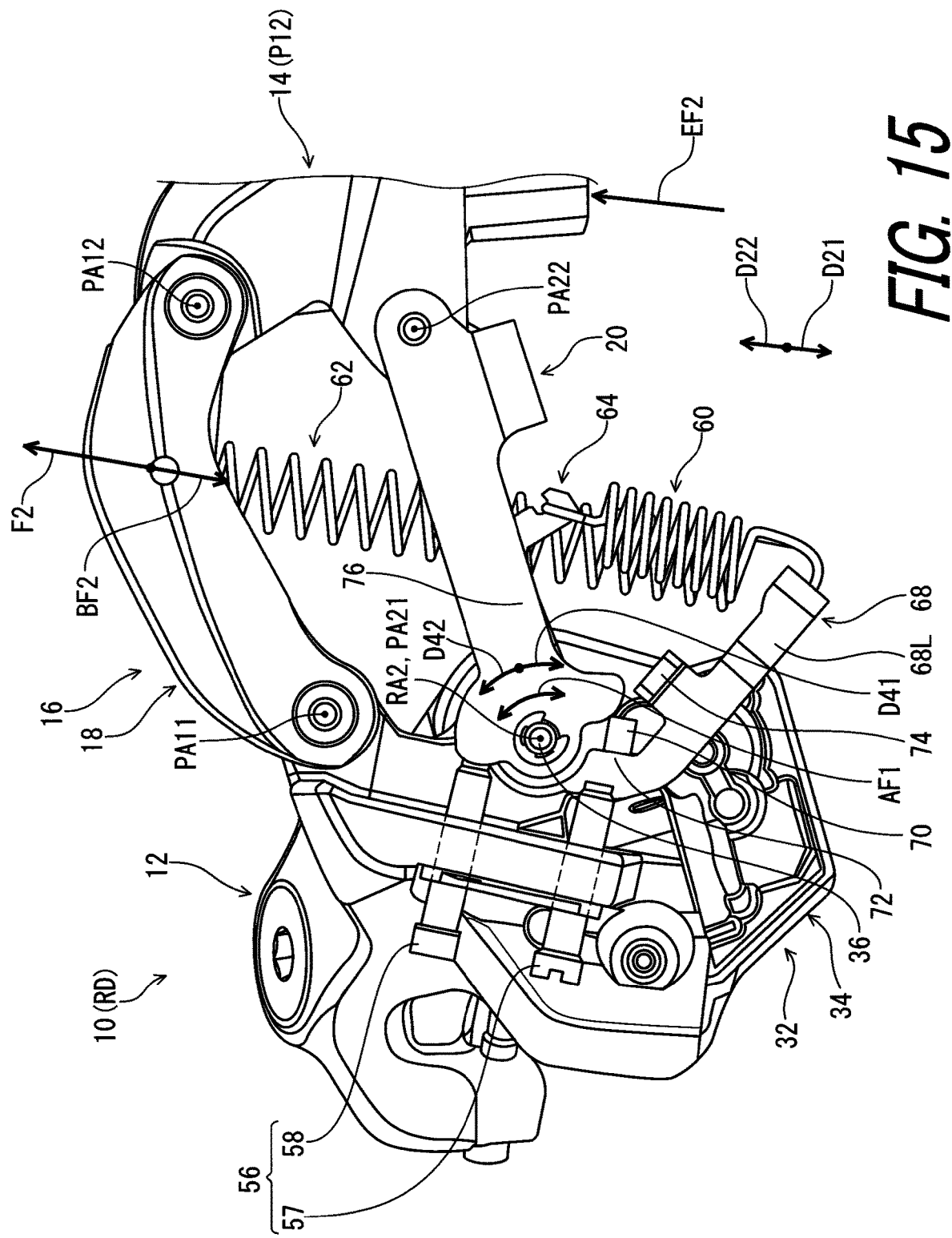
FIG. 15 is a perspective view of the derailleur in which a movable member is moved from the first position to the second position by second external force.
Figure 16:
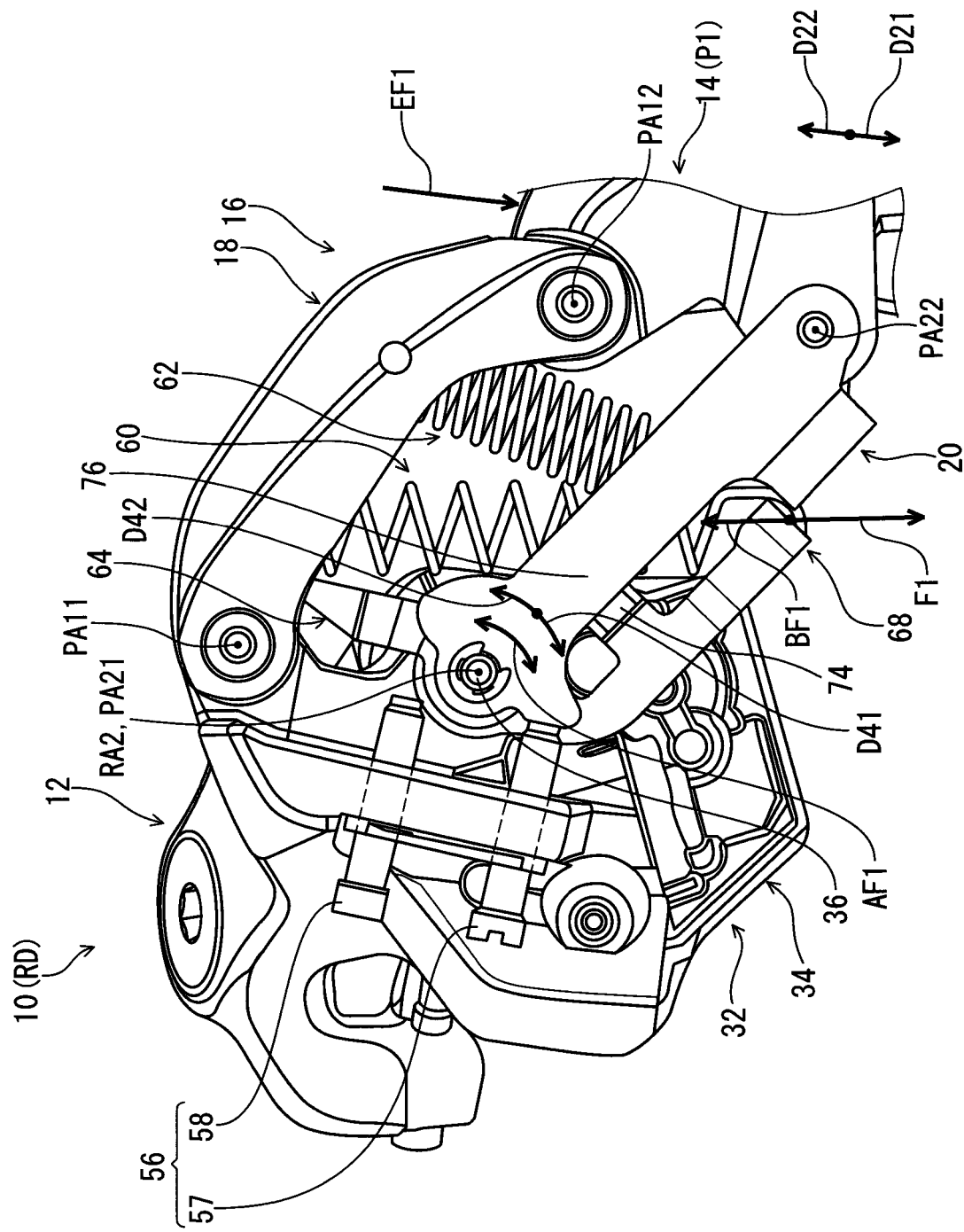
FIG. 16 is a perspective view of the derailleur in which a movable member is moved from the second position to the first position by first external force.

FIG. 15 shows a state of the derailleur RD in which the movable member 14 is moved from the first position P1 (see e.g., FIG. 11) to the second position P12 in the second direction D22 in response to second external force EF2. FIG. 16 shows a state of the derailleur RD in which the movable member 14 is moved from the second position P12 (see e.g., FIG. 12) to the first position P1 in the first direction D21 in response to first external force EF1. Each of the first external force EF1 and the second external force EF2 is caused by contact of at least one of the movable member 14, the linkage 16, and other parts attached to the movable member 14 and/or the linkage 16 with an object provided on a road. Each of the first external force EF1 and the second external force EF2 does not include the actuating force AF1 generated by the electrical actuator 32. In FIGS. 15 and 16, the chain guide 24 is omitted from the movable member 14.

As seen in FIGS. 12 and 16, the first biasing member 60 is configured to deform if the first external force EF1 is applied to move the movable member 14 in the first direction D21. The first biasing member 60 is configured to elastically deform if the first external force EF1 is applied to move the movable member 14 in the first direction D21. The first biasing member 60 is configured to elastically deform if the first external force EF1 is applied to move the movable member 14 in the first direction D21. The first biasing member 60 is configured to deform if the first external force EF1 is greater than a first threshold. If the first external force EF1 is less than or equal to the first threshold, the first biasing member 60 is configured to return to an original state (e.g., the second position P12) which is a state of the first biasing member 60 before the first external force EF1 is applied.

The first biasing member 60 is configured to defoim in response to first force F1 which is caused by the first external force EF1 and which is applied to the first biasing member 60 against the first biasing force BF1 of the first biasing member 60. The first biasing member 60 is configured to elastically deform in response to the first force F1 which is caused by the first external force EF1 and which is applied to the first biasing member 60 against the first biasing force BF1 of the first biasing member 60. The first force F1 is greater than the first biasing force BF1.

In the first embodiment, the first biasing member 60 is configured to reduce the first external force EF1 transmitted to the output part 36. The first biasing member 60 is configured to reduce shock which is caused by the first external force EF1 and which is transmitted to the output part 36 of the electrical actuator 32. The first biasing member 60 is configured to allow the movable member 14 to move relative to the base member 12 in the first direction D21 in response to the first external force EF1. The first biasing member 60 is configured to allow the movable member 14 to move relative to the base member 12 in the first direction D21 in response to the first external force EF1 while the output part 36 of the electrical actuator 32 is substantially stationary relative to the base member 12.

The movable member 14 is stopped in the first position P1 when the linkage 16 comes into contact with the first adjustment screw 57 of the adjustment structure 56. The movable member 14 can be stopped in other positions provided between the first position P1 and the second position P12.

In FIGS. 12 and 16, the movable member 14 is moved relative to the base member 12 from the second position P12 in the first direction D21 in response to the first external force EF1. However, the movable member 14 can be moved from one of the intermediate positions P2 to P11 in the first direction D21 in response to the first external force EF1 when the first external force EF1 is applied in a state where the movable member 14 is in the one of the intermediate positions P2 to P11.

As seen in FIGS. 11 and 15, the second biasing member 62 is configured to deform if the second external force EF2 is applied to move the movable member 14 in the second direction D22. The second biasing member 62 is configured to elastically deform if the second external force EF2 is applied to move the movable member 14 in the second direction D22. The second biasing member 62 is configured to elastically deform if the second external force EF2 is applied to move the movable member 14 in the second direction D22. The second biasing member 62 is configured to deform if the second external force EF2 is greater than a second threshold. If the second external force EF2 is less than or equal to the second threshold, the second biasing member 62 is configured to return to an original state (e.g., the first position P1) which is a state of the second biasing member 62 before the second external force EF2 is applied.

The second biasing member 62 is configured to deform in response to second force F2 which is caused by the second external force EF2 and which is applied to the second biasing member 62 against the second biasing force BF2 of the second biasing member 62. The second biasing member 62 is configured to elastically deform in response to the second force F2 which is caused by the second external force EF2 and which is applied to the second biasing member 62 against the second biasing force BF2 of the second biasing member 62. The second force F2 is greater than the second biasing force BF2.

In the first embodiment, the second biasing member 62 is configured to reduce the second external force EF2 transmitted to the output part 36. The second biasing member 62 is configured to reduce shock which is caused by the second external force EF2 and which is transmitted to the electrical actuator 32. The second biasing member 62 is configured to allow the movable member 14 to move relative to the base member 12 in the second direction D22 in response to the second external force EF2. The second biasing member 62 is configured to allow the movable member 14 to move relative to the base member 12 in the second direction D22 in response to the second external force EF2 while the output part 36 of the electrical actuator 32 is substantially stationary relative to the base member 12.

The movable member 14 is stopped in the second position P12 when the linkage 16 comes into contact with the second adjustment screw 58 of the adjustment structure 56. The movable member 14 can be stopped in other positions provided between the second position P12 and the second position P12.

In FIGS. 11 and 15, the movable member 14 is moved relative to the base member 12 from the first position P1 in the second direction D22 in response to the second external force EF2. However, the movable member 14 can be moved from one of the intermediate positions P2 to P11 in the second direction D22 in response to the second external force EF2 when the second external force EF2 is applied in a state where the movable member 14 is in the one of the intermediate positions P2 to P11.

Figure 17:
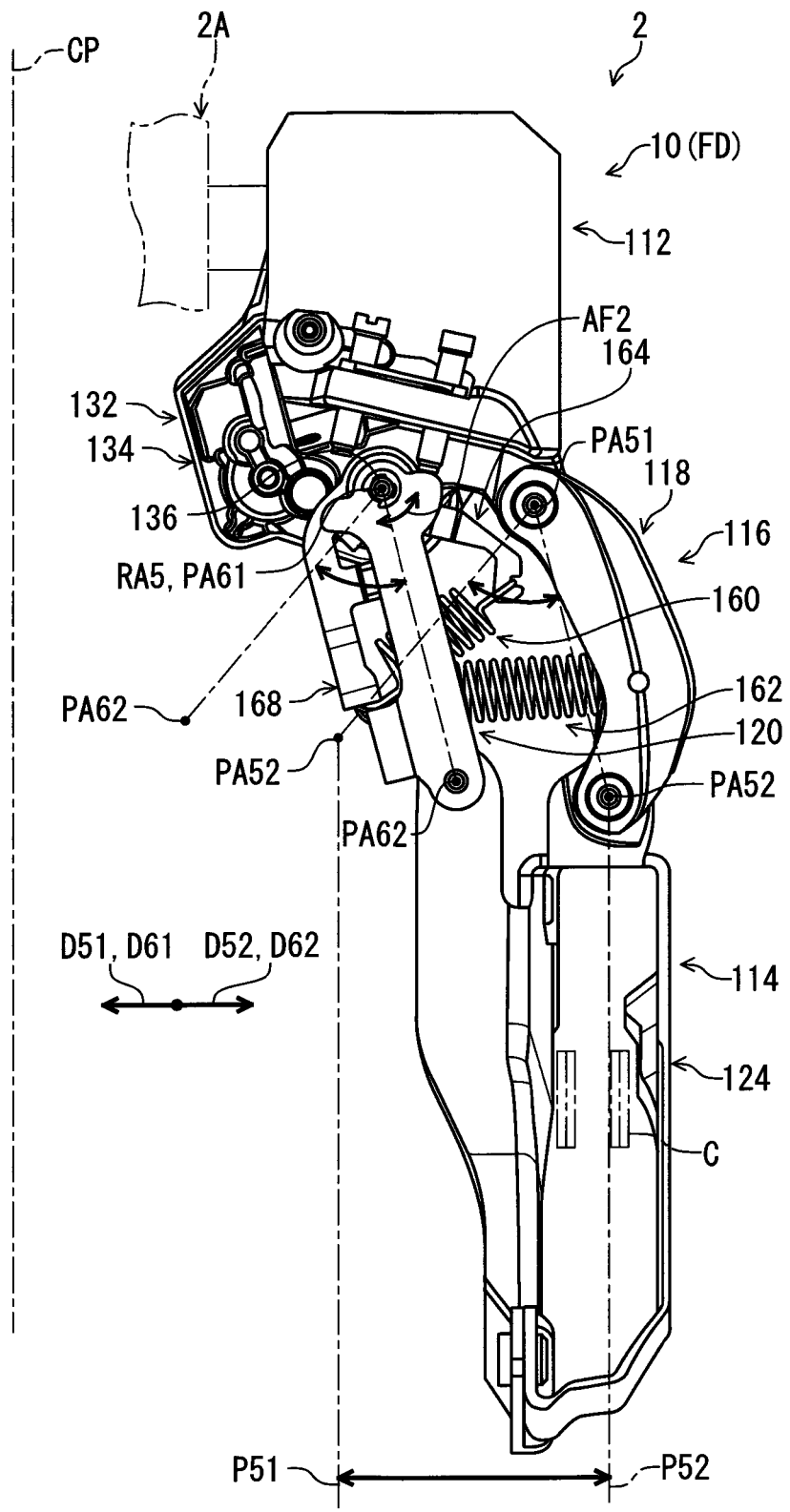
FIG. 17 is a rear view of another derailleur of the human-powered vehicle illustrated in FIG. 1.

As seen in FIG. 17, the derailleur FD for the human-powered vehicle 2 comprises a base member 112, a movable member 114, and a linkage 116. The base member 112 is configured to be attached to the vehicle body 2A of the human-powered vehicle 2. The movable member 114 is configured to be movable relative to the base member 112. The linkage 116 is configured to movably connect the movable member 114 to the base member 112.

The linkage 116 has substantially the same structure as the structure of the linkage 16 of the derailleur RD. The linkage 116 includes a first link 118. The first link 118 has substantially the same structure as the structure of the first link 18 of the derailleur RD. The first link 118 is pivotally coupled to the base member 112 about a first pivot axis PA51 and is pivotally coupled to the movable member 114 about a first additional pivot axis PA52. The first additional pivot axis PA52 is offset from the first pivot axis PA51. The first additional pivot axis PA52 is parallel to the first pivot axis PA51. However, the first additional pivot axis PA52 can be non-parallel to the first pivot axis PA51 if needed and/or desired.

The linkage 116 includes a second link 120. The second link 120 has substantially the same structure as the structure of the second link 20 of the derailleur RD. The second link 120 is pivotally coupled to the base member 112 about a second pivot axis PA61 and is pivotally coupled to the movable member 114 about a second additional pivot axis PA62. The second additional pivot axis PA62 is offset from the second pivot axis PA61. The second additional pivot axis PA62 is parallel to the second pivot axis PA61. However, the second additional pivot axis PA62 can be non-parallel to the second pivot axis PA61 if needed and/or desired.

The movable member 114 includes a chain guide 124. The movable member 114 can include a movable body such as the movable body 22 of the derailleur RD if needed and/or desired. The chain guide 124 is configured to be engaged with the chain C. The chain guide 124 is configured to shift the chain C relative to the base member 112. The linkage 116 is configured to movably connect the chain guide 124 to the base member 112. The first link 118 is pivotally coupled to the chain guide 124 about the first additional pivot axis PA52. The second link 120 is pivotally coupled to the chain guide 124 about the second additional pivot axis PA62.

The derailleur FD for the human-powered vehicle 2 comprises an electrical actuator 132. The electrical actuator 132 has substantially the same structure as the structure of the electrical actuator 32 of the derailleur RD. The electrical actuator 132 is configured to operatively move the movable member 114 relative to the base member 112. The electrical actuator 132 is configured to generate actuating force AF2 to move the movable member 114 relative to the base member 112. The electrical actuator 132 is attached to the base member 112. The electrical actuator 132 includes an actuator casing 134. The actuator casing 134 is secured to the base member 112. However, the electrical actuator 132 can be attached to members (e.g., the movable member 114 or the linkage 116) other than the base member 112 if needed and/or desired.

The electrical actuator 132 includes an output part 136. The output part 136 has substantially the same structure as the structure of the output part 36 of the derailleur RD. The output part 136 is rotatable relative to the actuator casing 134 about a rotational axis RA5. The output part 136 is configured to rotate relative to the actuator casing 134 about the rotational axis RA5 to output the actuating force AF2. The output part 136 has substantially the same structure as the structure of the output part 36 of the derailleur RD.

The second link 120 is pivotally coupled to the output part 136 about the rotational axis RA5. The second link 120 is pivotally coupled to the base member 112 via the output part 136 about the rotational axis RA5. Namely, the second pivot axis PA61 is coincident with the rotational axis RA5. However, the second pivot axis PA61 can be offset from the rotational axis RA5 if needed and/or desired.

Since the linkage 116 has substantially the same structure as the structure of the linkage 16 of the derailleur RD, the description regarding the linkage 16 of the derailleur RD can be utilized to describe the linkage 116 by replacing the reference numerals "12," "14," "16," "20," "39" "40," "42," "12A," "12B," "P1," "P12," "D21," "D22," "RA2," "PA11," "PA12," "PA21," and "PA22" with "112," "114," "116," "120," "139," "140," "142," "112A," "112B," "P51," "P52," "D51," "D52," "RA5," "PA51," "PA52," "PA61," and "PA62." Thus, they will not be described in detail here for the sake of brevity.

Since the electrical actuator 132 has substantially the same structure as the structure of the electrical actuator 32 of the derailleur RD, FIG. 9 can be utilize to describe the structure of the electrical actuator 132. As seen in FIG. 9, the electrical actuator 132 includes a motor 150 and a gear structure 152. Since the electrical actuator 132 has substantially the same structure as the structure of the electrical actuator 32 of the derailleur RD, the description regarding the electrical actuator 32 of the derailleur RD can be utilized to describe the electrical actuator 132 by replacing the reference numerals "12," "14," "16," "32," "34," "36," "50," "50A," "52," "54," "AF1," "G1," "G2," "G3," "G4," "G5," "G6," "G7," and "54G" with "112," "114," "116," "132," "134," "136," "150," "150A," "152," "154," "AF2," "G11,"

"G12," "G13," "G14," "G15," "G16," "G17," and "154G." Thus, they will not be described in detail here for the sake of brevity.

As seen in FIG. 17, the movable member 114 is configured to be movable relative to the base member 112 in a first direction D51 and a second direction D52 different from the first direction D51. The electrical actuator 132 is configured to operatively move the movable member 114 relative to the base member 112 in the first direction D51 and the second direction D52. In the first embodiment, the second direction D52 is an opposite direction of the first direction D51 and is parallel to the first direction D51. However, the second direction D52 can be other directions different from the first direction D51 if needed and/or desired. For example, the second direction D52 can be inclined relative to the first direction D51 if needed and/or desired.

The movable member 114 is movable relative to the base member 112 in the inward direction D61 toward the transverse center plane CP of the vehicle body 2A. The movable member 114 is movable relative to the base member 112 in the outward direction D62 away from the transverse center plane CP of the vehicle body 2A. The outward direction D62 is an opposite direction of the inward direction D61. The first direction D51 includes the inward direction D61. The second direction D52 includes the outward direction D62. More specifically, the first direction D51 is the inward direction D61. The second direction D52 is the outward direction D62. The first direction D51 and the second direction D52 are perpendicular to the transverse center plane CP of the vehicle body 2A. However, the first direction D51 can include the outward direction D62, and the second direction D52 can include the inward direction D61. At least one of the first direction D51 and the second direction D52 can be non-perpendicular to the transverse center plane CP of the vehicle body 2A if needed and/or desired.

The movable member 114 is movable relative to the base member 112 between a first position P51 and a second position P52. The first position P51 is closer to the transverse center plane CP than the second position P52. The movable member 114 is moved relative to the base member 112 from the second position P52 to the first position P51 in the first direction D51 or the inward direction D61. The movable member 114 is moved relative to the base member 112 from the first position P51 to the second position P52 in the second direction D52 or the outward direction D62. However, the second position P52 can be closer to the transverse center plane CP than the first position P51 if needed and/or desired.

The first position P51 corresponds to a smallest sprocket FS1 of the front sprocket assembly FS (see e.g., FIG. 2). The second position P52 corresponds to a largest sprocket FS2 of the front sprocket assembly FS (see e.g., FIG. 2). The first position P51 corresponds to an innermost position and/or a low gear position. The second position P52 corresponds to an outermost position and/or a top gear position. The first position P51 can also be referred to as an innermost end position P51 or a low-gear position P51. The second position P52 can also be referred to as an outermost end position P52 or a top-gear position P52. At least one intermediate position can be provided between the first position P51 and the second position P52.

The electrical actuator 132 is configured to move the movable member 114 in the first direction D51 or the inward direction D61 in response to the second control signal CS21 (see e.g., FIG. 3). The electrical actuator 132 is configured to move the movable member 114 in the second direction D52 or the outward direction D62 in response to the second additional control signal CS22 (see e.g., FIG. 3).

Figure 18:
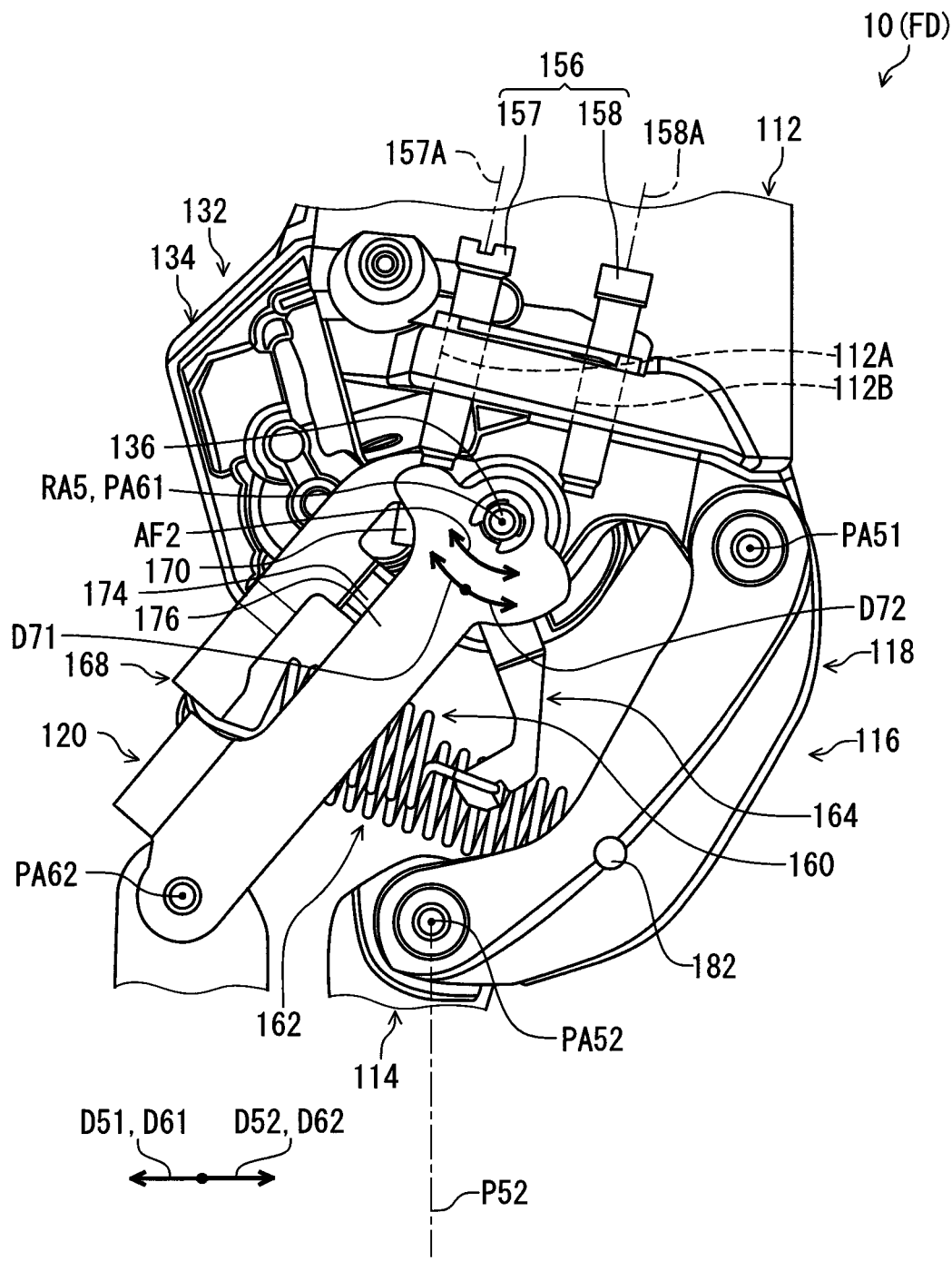
FIG. 18 is a perspective view of the derailleur illustrated in FIG. 17 (first position).
Figure 19:
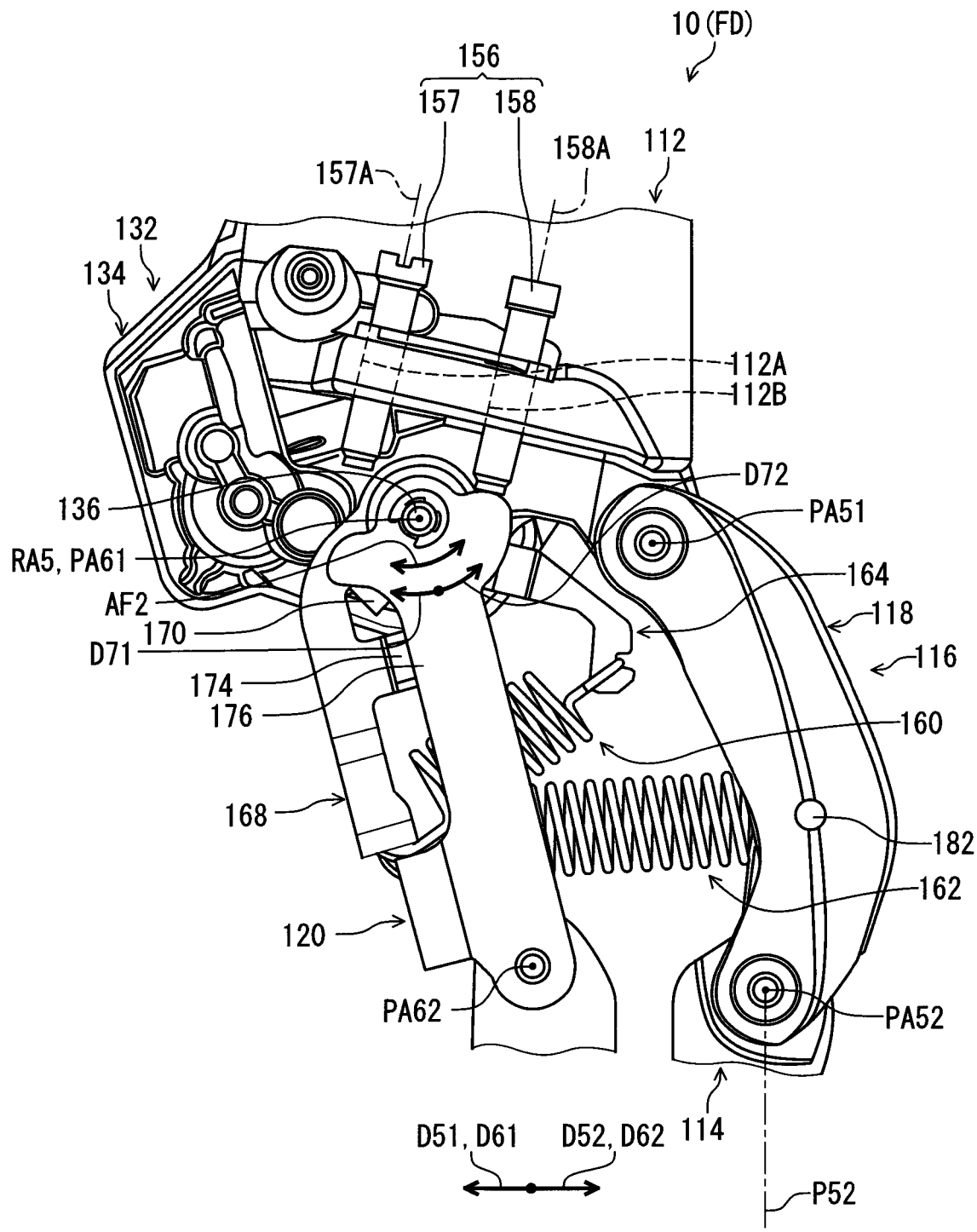
FIG. 19 is a perspective view of the derailleur illustrated in FIG. 17 (second position).

FIG. 18 shows a state of the derailleur FD in which the movable member 114 is in the first position P51. FIG. 19 shows a state of the derailleur FD in which the movable member 114 is in the second position P52.

As seen in FIGS. 18 and 19, the derailleur FD includes an adjustment structure 156. The adjustment structure 156 has substantially the same structure as the structure of the adjustment structure 56 of the derailleur RD. The adjustment structure 156 includes a first adjustment screw 157 and a second adjustment screw 158. The base member 112 includes a first threaded hole 112A and a second threaded hole 112B. The description regarding the adjustment structure 56 of the derailleur RD can be utilized to describe the adjustment structure 156 by replacing the reference numerals "12," "14," "20," "56," "57," "58," "12A," "12B," "P1," "P12," "D21," "D22," "57A," and "58A" with "112," "114," "120," "156," "157," "158," "112A," "112B," "P51," "P52," "D51," "D52," "157A," and "158A." Thus, they will not be described in detail here for the sake of brevity.

As seen in FIGS. 18 and 19, the derailleur FD for the human-powered vehicle 2 comprises a first biasing member 160 and a second biasing member 162. The second biasing member 162 is a separate member from the first biasing member 160. The first biasing member 160 has substantially the same structure as the structure of the first biasing member 60 of the derailleur RD. The second biasing member 162 has substantially the same structure as the structure of the second biasing member 62 of the derailleur RD.

The electrical actuator 132 is configured to move the movable member 114 in the first direction D51 via the second biasing member 162 if the output part 136 of the electrical actuator 132 rotates in a first rotational direction D71. The second biasing member 162 is configured to transmit the actuating force AF2 to the first link 118 in response to a first rotation of the output part 136 of the electrical actuator 132 in the first rotational direction D71. The movable member 114 is configured to move relative to the base member 112 in the first direction D51 in response to the actuating force AF2 transmitted from the output part 136 of the electrical actuator 132 via the second biasing member 162.

The electrical actuator 132 is configured to move the movable member 114 in the second direction D52 via the first biasing member 160 if the output part 136 of the electrical actuator 132 rotates in a second rotational direction D72 which is an opposite direction of the first rotational direction D71. The first biasing member 160 is configured to transmit the actuating force AF2 to the second link 120 in response to a second rotation of the output part 136 of the electrical actuator 132 in the second rotational direction D72. The movable member 114 is configured to move relative to the base member 112 in the second direction D52 in response to the actuating force AF2 transmitted from the output part 136 of the electrical actuator 132 via the first biasing member 160.

As seen in FIG. 18, the output part 136 is configured to be operatively coupled to the movable member 114 to move the movable member 114 relative to the base member 112. The derailleur FD further comprises an output member 164. The output member 164 has substantially the same structure as the structure of the output member 64 of the derailleur RD. The output member 164 is coupled to the output part 136 of the electrical actuator 132 to rotate along with the output part 136. The output member 164 is rotatable relative to the actuator casing 134 about the rotational axis RA5 along with the output part 136 of the electrical actuator 132. The description regarding the output member 64 of the derailleur RD can be utilized to describe the output member 164 by replacing the reference numerals "12," "14," "32," "36," "64," "64A," "64L," "AF1," "D41," "D42," and "RA2" with "112," "114," "132," "136," "164," "164A," "164L," "AF2," "D71," "D72," and "RA5." Thus, they will not be described in detail here for the sake of brevity.

As seen in FIG. 18, the derailleur FD further comprises a saver member 168. The saver member 168 has substantially the same structure as the structure of the saver member 68 of the derailleur RD. The saver member 168 is pivotally coupled to at least one of the base member 112, the movable member 114, the linkage 116, and the electrical actuator 132. In the first embodiment, the saver member 168 is pivotally coupled to the base member 112 through the output part 136 of the electrical actuator 132. The saver member 168 is pivotally coupled to the output part 136 of the electrical actuator 132. The saver member 168 is pivotable relative to the output part 136 of the electrical actuator 132 about the rotational axis RA5. The description regarding the saver member 68 of the derailleur RD can be utilized to describe the saver member 168 by replacing the reference numerals "12," "20," "32," "36," "38," "64," "68," "68A," "68L," "69," "69A," "PA21," and "RA2" with "112," "120," "132," "136," "138," "164," "168," "168A," "168L," "169," "169A," "PA61," and "RA5." Thus, they will not be described in detail here for the sake of brevity.

Figure 20:
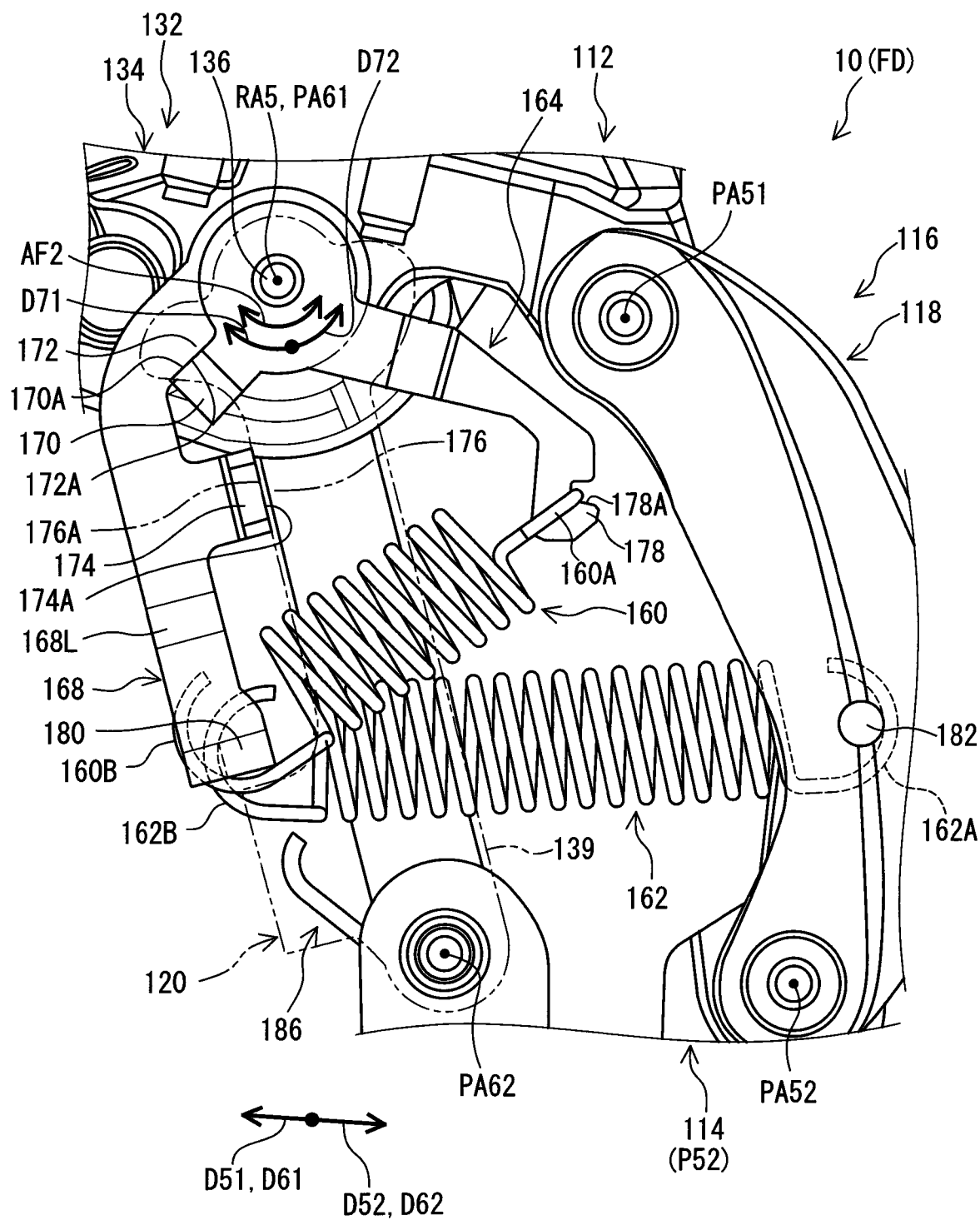
FIG. 20 is an enlarged partial perspective view of the derailleur illustrated in FIG. 18, with a second link omitted (second position).

As seen in FIG. 20, the second biasing member 162, the output member 164, and the saver member 168 are configured to transmit the actuating force AF2 to the first link 118 in response to the first rotation of the output part 136 of the electrical actuator 132. The first biasing member 160, the output member 164, and the saver member 168 are configured to transmit the actuating force AF2 to the second link 120 in response to the second rotation of the output part 136 of the electrical actuator 132.

The output member 164 includes a first contact part 170 contactable with the saver member 168. The saver member 168 includes a first additional contact part 172 contactable with the first contact part 170 of the output member 164. The saver member 168 includes a second contact part 174 contactable with the second link 120. The second link 120 includes a second additional contact part 176 contactable with the second contact part 174 of the saver member 168.

The first contact part 170, the first additional contact part 172, the second contact part 174, and the second additional contact part 176 have substantially the same structures as the structures of the first contact part 70, the first additional contact part 72, the second contact part 74, and the second additional contact part 76 of the derailleur RD. Thus, the description regarding the first contact part 70, the first additional contact part 72, the second contact part 74, and the second additional contact part 76 can be utilized to describe the first contact part 170, the first additional contact part 172, the second contact part 174, and the second additional contact part 176 by replacing the reference numerals "12," "14," "20," "64," "68," "70," "70A," "72," "72A," "74," "74A," "76," "76A," "D41," and "D42" with "112," "114," "120," "164," "168," "170," "170A," "172," "172A," "174," "174A," "176," "176A," "D71," and "D72." Thus, they will not be described in detail here for the sake of brevity.

Since the linkage 116, the output member 164, and the saver member 168 have substantially the same structures as the structures of the linkage 16, the output member 64, and the saver member 68 of the derailleur RD, FIG. 14 can be utilize to describe the linkage 116, the output member 164, and the saver member 168. The description regarding the linkage 16, the output member 64, and the saver member 68 of the derailleur RD can be utilized to describe the linkage 116, the output member 164, and the saver member 168 by replacing the reference numerals "16," "18," "32," "36," "39," "60," "60A," "60B," "62," "62A," "62B," "64" "64L," "68" "68L," "70" "72," "74," "76," "78," "80" 80A," "80B," "82," and "PA21" with "116," "118," "132," "136," "139," "160," "160A," "160B," "162," "162A," "162B," "164," "164L," "168," "168L," "170," "172," "174," "176," "178," "180," 180A," "180B," "182," and "PA61." Thus, they will not be described in detail here for the sake of brevity.

The second link 120, the first biasing member 160, the second biasing member 162, the third biasing member 186, the output member 164, and the saver member 168 have substantially the same structures as the structures of the second link 20, the first biasing member 60, the second biasing member 62, the third biasing member 86, the output member 64, and the saver member 68 of the derailleur RD. The description regarding the second link 20, the first biasing member 60, the second biasing member 62, the third biasing member 86, the output member 64, and the saver member 68 of the derailleur RD can be utilized to describe the second link 120, the first biasing member 160, the second biasing member 162, the third biasing member 186, the output member 164, and the saver member 168 by replacing the reference numerals "12," "14," "16," "18," "32," "36," "39," "60," "60A," "60B," "62," "62A," "62B," "64," "64L," "68" "68L," "70" "72," "74," "76," "78," "78A," "80," "80A," "80B," "86," "D21," "D22," "RD," "P12," and "PA21" with "112," "114," "116," "118," "132," "136," "139," "160," "160A," "160B," "162," "162A," "162B," "164," "164L," "168," "168L," "170," "172," "174," "176," "178," "178A," "180," "180A," "180B," "186," "D51," "D52," "FD," "P52," and "PA61." Thus, they will not be described in detail here for the sake of brevity.

Figure 21:
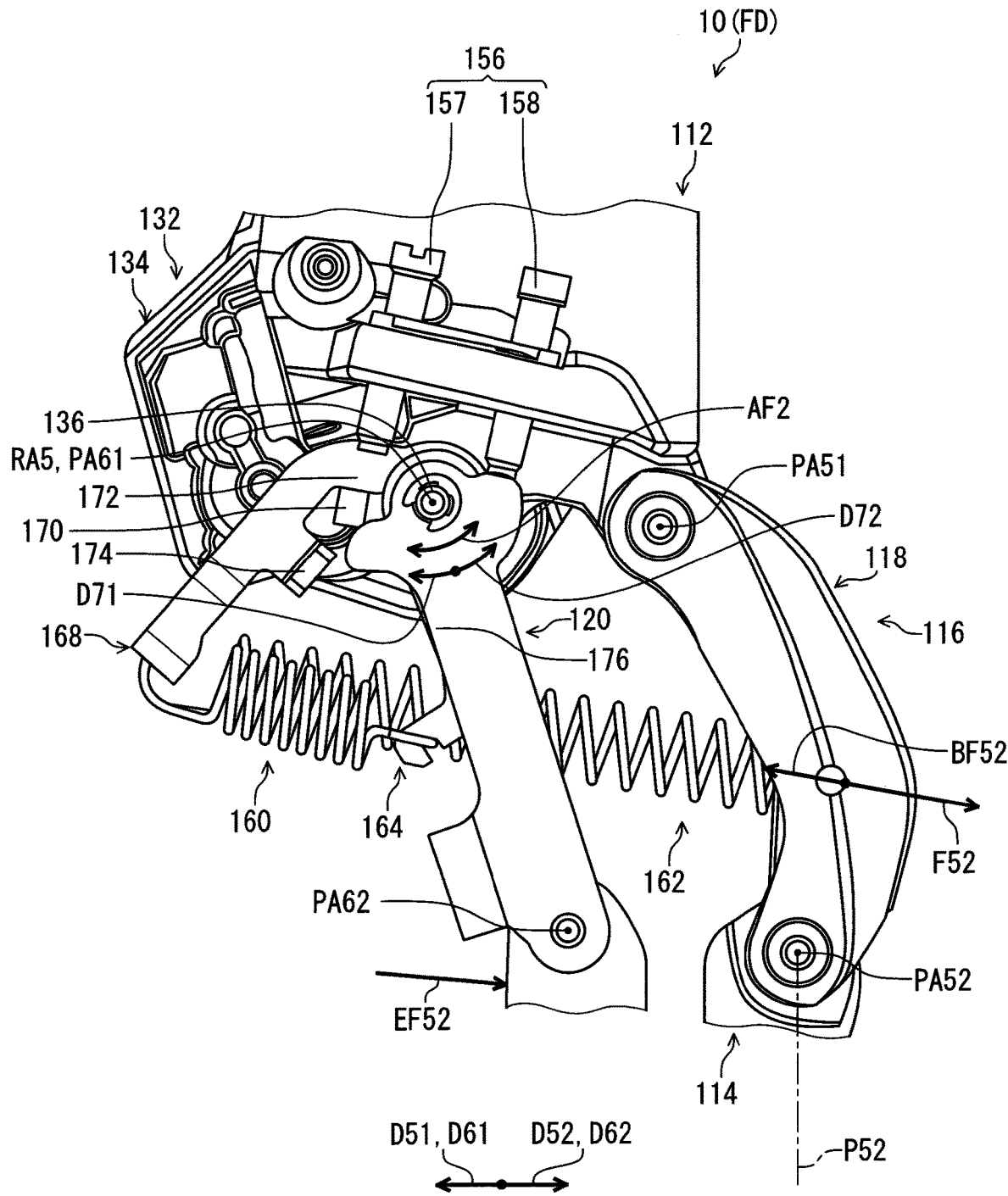
FIG. 21 is a perspective view of the derailleur of FIG. 17 in which a movable member is moved from the first position to the second position by second external force.
Figure 22:
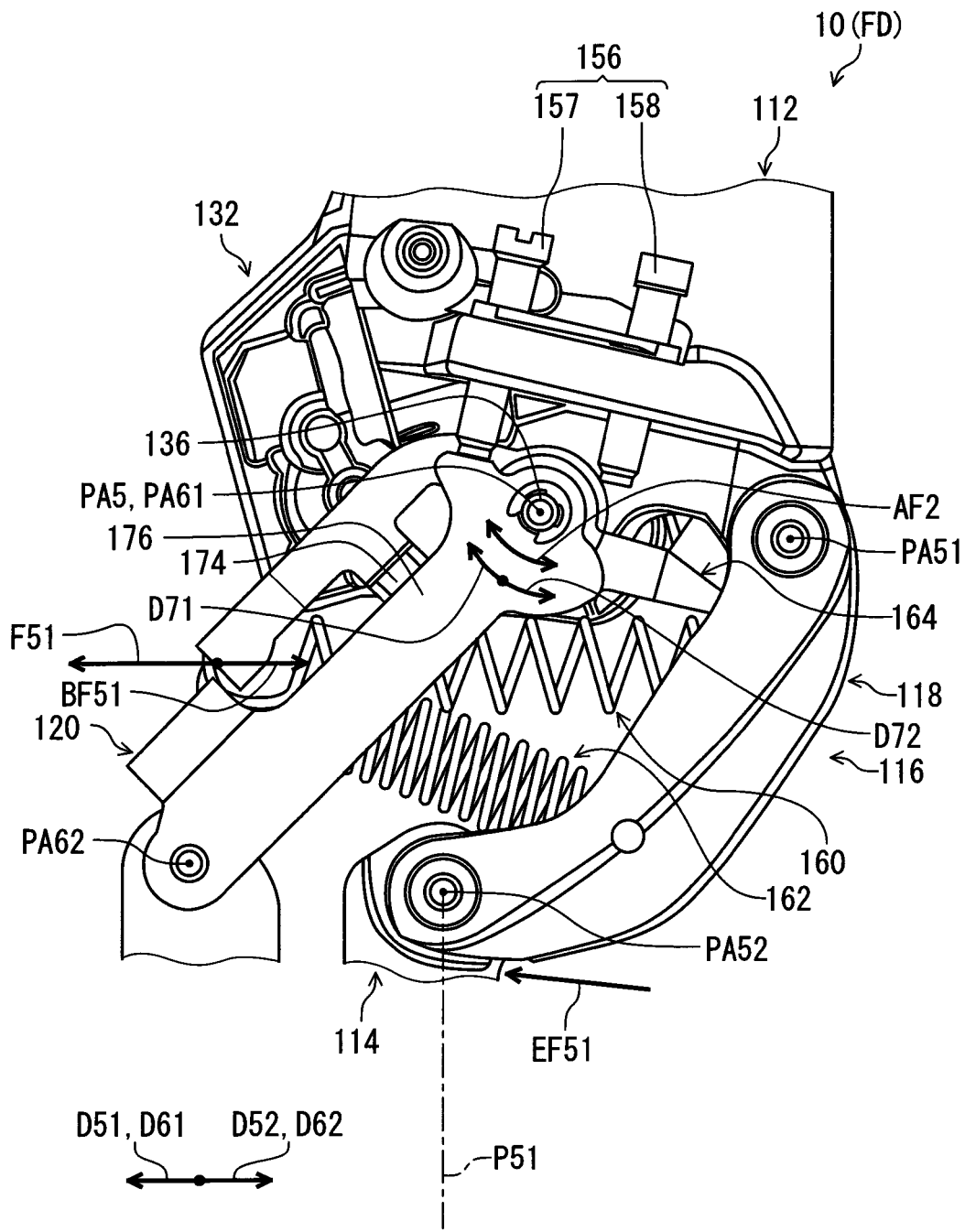
FIG. 22 is a perspective view of the derailleur of FIG. 17 in which a movable member is moved from the second position to the first position by first external force.

FIG. 21 shows a state of the derailleur FD in which the movable member 114 is moved from the first position P51 (see e.g., FIG. 18) to the second position P52 in the second direction D52 in response to second external force EF52. FIG. 22 shows a state of the derailleur FD in which the movable member 114 is moved from the second position P52 (see e.g., FIG. 19) to the first position P51 in the first direction D51 in response to first external force EF51. Each of the first external force EF51 and the second external force EF52 is caused by contact of at least one of the movable member 114 and the linkage 116 with an object provided on a road. In FIGS. 21 and 22, the chain guide 124 is omitted from the movable member 114.

As seen in FIGS. 19 and 22, the first biasing member 160 is configured to deform if the first external force EF51 is applied to move the movable member 114 in the first direction D51. The first biasing member 160 is configured to elastically deform if the first external force EF51 is applied to move the movable member 114 in the first direction D51. The first biasing member 160 is configured to elastically deform if the first external force EF51 is applied to move the movable member 114 in the first direction D51. The first biasing member 160 is configured to deform if the first external force EF51 is greater than a first threshold. If the first external force EF51 is less than or equal to the first threshold, the first biasing member 160 is configured to return to an original state (e.g., the second position P52) which is a state of the first biasing member 160 before the first external force EF51 is applied.

The first biasing member 160 is configured to deform in response to first force F51 which is caused by the first external force EF51 and which is applied to the first biasing member 160 against first biasing force BF51 of the first biasing member 160. The first biasing member 160 is configured to elastically deform in response to the first force F51 which is caused by the first external force EF51 and which is applied to the first biasing member 160 against the first biasing force BF51 of the first biasing member 160. The first force F51 is greater than the first biasing force BF51.

In the first embodiment, the first biasing member 160 is configured to reduce the first external force EF51 transmitted to the output part 136. The first biasing member 160 is configured to reduce shock which is caused by the first external force EF51 and which is transmitted to the electrical actuator 132. The first biasing member 160 is configured to allow the movable member 114 to move relative to the base member 112 in the first direction D51 in response to the first external force EF51. The first biasing member 160 is configured to allow the movable member 114 to move relative to the base member 112 in the first direction D51 in response to the first external force EF51 while the output part 136 of the electrical actuator 132 is substantially stationary relative to the base member 112.

The movable member 114 is stopped in the first position P51 when the linkage 116 comes into contact with the first adjustment screw 157 of the adjustment structure 156. The movable member 114 can be stopped in other positions provided between the first position P51 and the second position P52.

As seen in FIGS. 18 and 21, the second biasing member 162 is configured to deform if the second external force EF52 is applied to move the movable member 114 in the second direction D52. The second biasing member 162 is configured to elastically deform if the second external force EF52 is applied to move the movable member 114 in the second direction D52. The second biasing member 162 is configured to elastically deform if the second external force EF52 is applied to at least one of the movable member 114 and the linkage 116 to move the movable member 114 in the second direction D52. The second biasing member 162 is configured to deform if the second external force EF52 is greater than a second threshold. If the second external force EF52 is less than or equal to the second threshold, the second biasing member 162 is configured to return to an original state (e.g., the first position P51) which is a state of the second biasing member 162 before the second external force EF52 is applied.

The second biasing member 162 is configured to deform in response to second force F52 which is caused by the second external force EF52 and which is applied to the second biasing member 162 against second biasing force BF52 of the second biasing member 162. The second biasing member 162 is configured to elastically deform in response to the second force F52 which is caused by the second external force EF52 and which is applied to the second biasing member 162 against the second biasing force BF52 of the second biasing member 162. The second force F52 is greater than the second biasing force BF52.

In the first embodiment, the second biasing member 162 is configured to reduce the second external force EF52 transmitted to the output part 136. The second biasing member 162 is configured to reduce shock which is caused by the second external force EF52 and which is transmitted to the electrical actuator 132. The second biasing member 162 is configured to allow the movable member 114 to move relative to the base member 112 in the second direction D52 in response to the second external force EF52. The second biasing member 162 is configured to allow the movable member 114 to move relative to the base member 112 in the second direction D52 in response to the second external force EF52 while the output part 136 of the electrical actuator 132 is substantially stationary relative to the base member 112.

The movable member 114 is stopped in the second position P52 when the linkage 116 comes into contact with the second adjustment screw 158 of the adjustment structure 156. The movable member 114 can be stopped in other positions provided between the second position P52 and the second position P52.

As seen in FIG. 3, the derailleur RD includes a position sensor 88 and a motor driver 90. The electrical actuator 32 is electrically connected to the position sensor 88 and the motor driver 90. The position sensor 88 is configured to sense a current gear position of the derailleur RD (e.g., a current position of the movable member 14). Examples of the position sensor 88 include a potentiometer and a rotary encoder. The position sensor 88 is configured to sense an absolute rotational position of the output part 36 of the electrical actuator 32 as the current gear position of the derailleur RD. The motor driver 90 is configured to control the electrical actuator 32 based on the current gear position sensed by the position sensor 88.

In the first embodiment, the position sensor 88 includes a position detector 88A and a sensing object 88B. The sensing object 88B is attached to one of the first to seventh gears G1 to G7 (see e.g., FIG. 9) to rotate along with the one of the first to seventh gears G1 to G7 (see e.g., FIG. 9). The position detector 88A is configured to detect a rotational position of the sensing object 88B to detect the position of the movable member 14. Examples of the position detector 88A include an optical position detector and a magnetic position detector. Examples of the sensing object 88B include a disk having a plurality of slits and a magnet having a plurality of magnetic poles. However, the structure of the position sensor 88 is not limited to the above embodiment and the examples.

The derailleur RD comprises a controller 92 and a communicator 94. In the first embodiment, the controller 92 and the communicator 94 are configured to be mounted to the electrical actuator 32. However, at least one of the controller 92 can be mounted to another member (e.g., the movable member 14 or the linkage 16) of the derailleur RD or another device such as the operating device 3, the operating device 4, the derailleur FD, the electric power source PS, and the wired communication structure WS.

The controller 92 is configured to be electrically connected to the derailleur FD and the electric power source PS with the wired communication structure WS. The communicator 94 is configured to be communicate with the operating device 3, the operating device 4, the derailleur FD, and the electric power source PS. The controller 92 is configured to control the derailleur RD based on the first control signal CS11 and the first additional control signal CS12. The controller 92 is configured to control the derailleur FD based on the second control signal CS21 and the second additional control signal CS22.

In the first embodiment, the controller 92 is configured to control the electrical actuator 32 to move the movable member 14 in the inward direction D31 (see e.g., FIG. 10) in response to the first control signal CS11. The controller 92 is configured to control the electrical actuator 32 to move the movable member 14 in the outward direction D32 (see e.g., FIG. 10) in response to the first additional control signal CS12.

The controller 92 is configured to control the electrical actuator 132 to move the movable member 114 in the inward direction D61 (see e.g., FIG. 17) in response to the second control signal CS21. The controller 92 is configured to control the electrical actuator 132 to move the movable member 114 in the outward direction D62 (see e.g., FIG. 17) in response to the second additional control signal CS22.

The communicator 94 includes a wireless communicator WC3 configured to establish a wireless communication channel. The wireless communicator WC3 is configured to communicate with the operating device 3 and the operating device 4 via the wireless communication channel. The wireless communicator WC3 is configured to wirelessly receive the first control signal CS11, the first additional control signal CS12, the second control signal CS21, and the second additional control signal CS22.

The controller 92 includes a processor 92P, a memory 92M, a circuit board 92C, and a system bus 92D. The processor 92P and the memory 92M are electrically mounted on the circuit board 92C. The processor 92P includes a central processing unit (CPU) and a memory controller. The memory 92M is electrically connected to the processor 92P. The memory 92M includes a read only memory (ROM) and a random-access memory (RAM). The memory 92M includes storage areas each having an address in the ROM and the RAM. The processor 92P is configured to control the memory 92M to store data in the storage areas of the memory 92M and reads data from the storage areas of the memory 92M. The memory 92M (e.g., the ROM) stores a program. The program is read into the processor 92P, and thereby the configuration and/or algorithm of the controller 92 is performed.

The wireless communicator WC3 is electrically mounted on the circuit board 92C. The circuit board 92C is secured to the actuator casing 34 (see e.g., FIG. 8). The wireless communicator WC3 is electrically connected to the processor 92P and the memory 92M with the circuit board 92C and the system bus 92D. The wireless communicator WC3 includes a signal transmitting circuit or circuitry, a signal receiving circuit or circuitry, and an antenna. Thus, the wireless communicator WC3 can also be referred to as a wireless communicator circuit or circuitry WC3.

The wireless communicator WC3 is configured to superimpose digital signals on carrier wave using a predetermined wireless communication protocol to wirelessly transmit a control signal. In the first embodiment, the wireless communicator WC3 is configured to encrypt a control signal using a cryptographic key to generate encrypted wireless signals.

The wireless communicator WC3 is configured to receives a wireless signal via the antenna. In the first embodiment, the wireless communicator WC3 is configured to decode the wireless signal to recognize the first control signal CS11, the first additional control signal CS12, the second control signal CS21, and/or the second additional control signal CS22 which are wirelessly transmitted from the operating device 3 and/or the operating device 4. The wireless communicator WC3 is configured to decrypt the wireless signal using the cryptographic key.

As seen in FIG. 3, the operating device 3 includes a first wireless communicator WC1 configured to wirelessly transmit the first control signal CS11 and the first additional control signal CS12. The first wireless communicator WC1 is configured to wirelessly receive information. The first wireless communicator WC1 is configured to be electrically connected to the first electrical switch SW11 to transmit the first control signal CS11 in response to the first user input U11. The first wireless communicator WC1 is configured to be electrically connected to the first additional electrical switch SW12 to transmit the first additional control signal CS12 in response to the first additional user input U12.

The operating device 3 includes a first processor 3P, a first memory 3M, a first circuit board 3C, and a first system bus 3D. The first processor 3P and the first memory 3M are electrically mounted on the first circuit board 3C. The first processor 3P includes a CPU and a memory controller. The first memory 3M is electrically connected to the first processor 3P. The first memory 3M includes a ROM and a RAM. The first memory 3M includes storage areas each having an address in the ROM and the RAM. The first processor 3P is configured to control the first memory 3M to store data in the storage areas of the first memory 3M and reads data from the storage areas of the first memory 3M. The first circuit board 3C, the first electrical switch SW11, and the first additional electrical switch SW12 are electrically connected to the first system bus 3D. The first electrical switch SW11 and the first additional electrical switch SW12 are electrically connected to the first processor 3P and the first memory 3M with the first circuit board 3C and the first system bus 3D. The first memory 3M (e.g., the ROM) stores a program. The program is read into the first processor 3P, and thereby the configuration and/or algorithm of the operating device 3 is performed.

The first wireless communicator WC1 is electrically mounted on the first circuit board 3C. The first wireless communicator WC1 is electrically connected to the first processor 3P and the first memory 3M with the first circuit board 3C and the first system bus 3D. The first wireless communicator WC1 includes a signal transmitting circuit, a signal receiving circuit, and an antenna. Thus, the first wireless communicator WC1 can also be referred to as a first wireless communication circuit WC1.

The first wireless communicator WC1 is configured to superimpose digital signals such as the first control signal CS11 and the first additional control signal CS12 on carrier wave using a predetermined wireless communication protocol to wirelessly transmit the first control signal CS11 and the first additional control signal CS12. In the first embodiment, the first wireless communicator WC1 is configured to encrypt a control signal (e.g., the first control signal CS11 or the first additional control signal CS12) using a cryptographic key to generate encrypted wireless signals.

The first wireless communicator WC1 is configured to receives a wireless signal via the antenna. In the first embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The operating device 3 includes a first electric power source 3E. The first electric power source 3E is configured to supply electricity to the operating device 3. The first electric power source 3E is configured to be electrically connected to the operating device 3. In the first embodiment, the first electric power source 3E includes a first battery and a first battery holder. The first battery includes a replaceable and/or rechargeable battery. The first battery holder is configured to be electrically connected to the operating device 3 via the first circuit board 3C and the first system bus 3D. The first battery is configured to be detachably attached to the first battery holder. However, the first electric power source 3E is not limited to the first embodiment. For example, the first electric power source 3E can include another component such as a capacitor and an electricity generation element (e.g., a piezoelectric element) instead of or in addition to the first battery and the first battery holder.

As seen in FIG. 3, the operating device 4 includes a second wireless communicator WC2 configured to wirelessly transmit the second control signal CS21 and the second additional control signal CS22. The second wireless communicator WC2 is configured to wirelessly receive information. The second wireless communicator WC2 is configured to be electrically connected to the second electrical switch SW21 to transmit the second control signal CS21 in response to the second user input U21. The second wireless communicator WC2 is configured to be electrically connected to the second additional electrical switch SW22 to transmit the second additional control signal CS22 in response to the second additional user input U22.

The operating device 4 includes a second processor 4P, a second memory 4M, a second circuit board 4C, and a second system bus 4D. The second processor 4P and the second memory 4M are electrically mounted on the second circuit board 4C. The second processor 4P includes a CPU and a memory controller. The second memory 4M is electrically connected to the second processor 4P. The second memory 4M includes a ROM and a RAM. The second memory 4M includes storage areas each having an address in the ROM and the RAM. The second processor 4P is configured to control the second memory 4M to store data in the storage areas of the second memory 4M and reads data from the storage areas of the second memory 4M. The second circuit board 4C, the second electrical switch SW21, and the second additional electrical switch SW22 are electrically connected to the second system bus 4D. The second electrical switch SW21 and the second additional electrical switch SW22 are electrically connected to the second processor 4P and the second memory 4M with the second circuit board 4C and the second system bus 4D. The second memory 4M (e.g., the ROM) stores a program. The program is read into the second processor 4P, and thereby the configuration and/or algorithm of the operating device 4 is performed.

The second wireless communicator WC2 is electrically mounted on the second circuit board 4C. The second wireless communicator WC2 is electrically connected to the second processor 4P and the second memory 4M with the second circuit board 4C and the second system bus 4D. The second wireless communicator WC2 includes a signal transmitting circuit, a signal receiving circuit, and an antenna. Thus, the second wireless communicator WC2 can also be referred to as a second wireless communication circuit WC2.

The second wireless communicator WC2 is configured to superimpose digital signals such as the second control signal CS21 and the second additional control signal CS22 on carrier wave using a predetermined wireless communication protocol to wirelessly transmit the second control signal CS21 and the second additional control signal CS22. In the first embodiment, the second wireless communicator WC2 is configured to encrypt a control signal (e.g., the second control signal CS21 or the second additional control signal CS22) using a cryptographic key to generate encrypted wireless signals.

The second wireless communicator WC2 is configured to receives a wireless signal via the antenna. In the first embodiment, the second wireless communicator WC2 is configured to decode the wireless signal to recognize signals and/or information wirelessly transmitted from another wireless communicator. The second wireless communicator WC2 is configured to decrypt the wireless signal using the cryptographic key.

The operating device 4 includes a second electric power source 4E. The second electric power source 4E is configured to supply electricity to the operating device 4. The second electric power source 4E is configured to be electrically connected to the operating device 4. In the first embodiment, the second electric power source 4E includes a second battery and a second battery holder. The second battery includes a replaceable and/or rechargeable battery. The second battery holder is configured to be electrically connected to the operating device 4 via the second circuit board 4C and the second system bus 4D. The second battery is configured to be detachably attached to the second battery holder. However, the second electric power source 4E is not limited to the first embodiment. For example, the second electric power source 4E can include another component such as a capacitor and an electricity generation element (e.g., a piezoelectric element) instead of or in addition to the second battery and the second battery holder.

Each of the derailleur RD, the operating device 3, and the operating device 4 has a pairing mode. In the pairing mode, the wireless communicator WC3 and the first wireless communicator WC1 are configured to establish the wireless communication channel between the wireless communicator WC3 and the first wireless communicator WC1. In the pairing mode, the wireless communicator WC3 and the second wireless communicator WC2 are configured to establish the wireless communication channel between the wireless communicator WC3 and the second wireless communicator WC2. Each of the derailleur RD, the operating device 3, and the operating device 4 is configured to store unique identifying information.

In the pairing mode of the derailleur RD, the wireless communicator WC3 is configured to transmit identifying information indicating the derailleur RD to the first wireless communicator WC1 and/or configured to receive first identifying information indicating the operating device 3. In the pairing mode of the derailleur RD, the wireless communicator WC3 is configured to transmit the identifying information indicating the derailleur RD to the second wireless communicator WC2 and/or configured to receive second identifying information indicating the operating device 4.

In the pairing mode of the operating device 3, the first wireless communicator WC1 is configured to transmit the first identifying information indicating the operating device 3 to the wireless communicator WC3 and/or configured to receive the identifying information indicating the derailleur RD. In the pairing mode of the operating device 4, the second wireless communicator WC2 is configured to transmit the second identifying information indicating the operating device 4 to the wireless communicator WC3 and/or configured to receive the identifying information indicating the derailleur RD.

The wireless communicator WC3 is configured to recognize signals transmitted from the first wireless communicator WC1 based on the identifying information and/or the first identifying information. The wireless communicator WC3 is configured to recognize signals transmitted from the second wireless communicator WC2 based on the identifying information and/or the second identifying information.

The first wireless communicator WC1 is configured to recognize signals transmitted from the wireless communicator WC3 based on the identifying information and/or the first identifying information. The second wireless communicator WC2 is configured to recognize signals transmitted from the wireless communicator WC3 based on the identifying information and/or the second identifying information.

As seen in FIG. 3, the derailleur FD includes a position sensor 188 and a motor driver 190. The electrical actuator 132 is electrically connected to the position sensor 188 and the motor driver 190. The position sensor 188 is configured to sense a current gear position of the derailleur FD (e.g., a current position of the movable member 14). Examples of the position sensor 188 include a potentiometer and a rotary encoder. The position sensor 188 is configured to sense an absolute rotational position of the output part 36 of the electrical actuator 132 as the current gear position of the derailleur FD. The motor driver 190 is configured to control the electrical actuator 132 based on the current gear position sensed by the position sensor 188.

In the first embodiment, the position sensor 188 includes a position detector 188A and a sensing object 188B. The sensing object 188B is attached to one of the first to seventh gears G11 to G17 (see e.g., FIG. 9) to rotate along with the one of the first to seventh gears G11 to G17 (see e.g., FIG. 9). The position detector 188A is configured to detect a rotational position of the sensing object 188B to detect the position of the movable member 14. Examples of the position detector 188A include an optical position detector and a magnetic position detector. Examples of the sensing object 188B include a disk having a plurality of slits and a magnet having a plurality of magnetic poles. However, the structure of the position sensor 188 is not limited to the above embodiment and the examples.

As seen in FIG. 3, the controller 92 is configured to generate a first control command CC11 based on the first control signal CS11. The controller 92 is configured to generate a first additional control command CC12 based on the first additional control signal CS12. The controller 92 is configured to generate a second control command CC21 based on the second control signal CS21. The controller 92 is configured to generate a second additional control command CC22 based on the second additional control signal CS22.

The first control signal CS11, the first additional control signal CS12, the second control signal CS21, and the second additional control signal CS22 are distinguishable from each other. The first control command CC11, the first additional control command CC12, the second control command CC21, and the second additional control command CC22 are distinguishable from each other.

In the first embodiment, the first control signal CS11 and the first control command CC11 indicate downshifting of the derailleur RD. The first additional control signal CS12 and the first additional control command CC12 indicate upshifting of the derailleur RD. The second control signal CS21 and the second control command CC21 indicate upshifting of the derailleur FD. The second additional control signal CS22 and the second additional control command CC22 indicate downshifting of the derailleur FD.

As seen in FIG. 3, the motor driver 90 is configured to control the electrical actuator 32 based on the first control command CC11 and the first additional control command CC12 generated by the controller 92. The motor driver 90 is configured to control the electrical actuator 32 to move the movable member 14 relative to the base member 12 by one gear position in the first direction D21 based on the first control command CC11 and the current gear position sensed by the position sensor 88. The motor driver 90 is configured to control the electrical actuator 32 to move the movable member 14 relative to the base member 12 by one gear position in the second direction D22 based on the first additional control command CC12 and the current gear position sensed by the position sensor 88.

The motor driver 190 is configured to control the electrical actuator 132 based on the second control command CC21 and the second additional control command CC22 generated by the controller 92. The motor driver 190 is configured to control the electrical actuator 132 to move the movable member 114 relative to the base member 112 by one gear position in the first direction D51 based on the second control command CC21 and the current gear position sensed by the position sensor 188. The motor driver 190 is configured to control the electrical actuator 132 to move the movable member 114 relative to the base member 112 by one gear position in the second direction D52 based on the second additional control command CC22 and the current gear position sensed by the position sensor 188.

As seen in FIG. 3, the controller 92, the derailleur FD, and the electric power source PS communicate with each other via the wired communication structure WS using power line communication (PLC) technology. More specifically, each of the electric cables of the wired communication structure WS includes a ground line and a voltage line that are detachably connected to a serial bus that is formed by communication interfaces. In the first embodiment, the controller 92, the derailleur FD, and the electric power source PS can all communicate with each other through the voltage line using the PLC technology.

The second control command CC21 and the second additional control command CC22 are transmitted from the controller 92 to the derailleur FD through the wired communication structure WS. However, the derailleur FD can include a wireless communicator configured to wirelessly receive the second control signal CS21 and the second additional control signal CS22. In such embodiment, the electric power source PS and the wired communication structure WS can be omitted from the human-powered vehicle 2. Instead, each of the derailleur RD and the derailleur FD can include a battery.

The PLC technology is used for communicating between electric components. The PLC carries data on a conductor that is also used simultaneously for electric power transmission or electric power distribution to the electric components. In the first embodiment, electricity is supplied from the electric power source PS to the derailleur RD and the derailleur FD via the wired communication structure WS. Furthermore, the controller 92 can receive information signals from the derailleur RD, the derailleur FD, and the electric power source PS through the wired communication structure WS using the PLC.

The PLC uses unique identifying information such as a unique identifier that is assigned to each of the derailleur RD, the derailleur FD, and the electric power source PS. Each of the derailleur RD, the derailleur FD, and the electric power source PS is configured to store the identifying information. Based on the identifying information, each of the derailleur RD, the derailleur FD, and the electric power source PS is configured to recognize, based on the identifying information, information signals which are necessary for itself among information signals transmitted via the wired communication structure WS. For example, the controller 92 is configured to recognize information signals transmitted from the derailleur RD, the derailleur FD, and the electric power source PS with the wired communication structure WS. Instead of using the PLC technology, however, separate signal wires can be provided for transmitting data in addition to the ground wire and the voltage wire if needed and/or desired.

The communicator 94 includes a wired communicator PC1 configured to establish a wired communication channel such as the PLC. The wired communicator PC1 is electrically mounted on the circuit board 92C. The wired communicator PC1 is connected to the wired communication structure WS, the derailleur RD, and the system bus 92D. The wired communicator PC1 is configured to separate input signals to a power source voltage and control signals. The wired communicator PC1 is configured to regulate the power source voltage to a level at which the controller 92 and the derailleur RD can properly operate. The wired communicator PC1 is further configured to superimpose output signals such as the second control command CC21 and the second additional control command CC22 on the power source voltage applied to the wired communication structure WS from the electric power source PS.

The derailleur FD includes a wired communicator PC2. The electric power source PS includes a wired communicator PC3. The operating device 3 includes a wired communicator PC4. The operating device 4 includes a wired communicator PC5. The wired communicators PC1, PC2, PC3, PC4, and PC5 are configured to communicate with each other using the PLC. The wired communicators PC2, PC3, PC4, and PC5 have substantially the same structure as the structure of the wired communicator PC1. Thus, they will not be described in detail here for the sake of brevity.

The derailleur RD includes a cable connector CN1 to which an electric cable (e.g., the electric cable EC1) of the wired communication structure WS is detachably connected. The cable connector CN1 is configured to be electrically connected to the controller 92 and the wired communicator PC1. The controller 92 is configured to receive electricity from the electric power source PS via the cable connector CN1 and the wired communicator PC1. In the first embodiment, the cable connector CN1 is provided to the actuator casing 34. However, the cable connector CN1 can be provided to another member such as the base member 12, the movable member 14, and the linkage 16 if needed and/or desired.

As seen in FIG. 8, the cable connector CN1 is provided on the actuator casing 34 of the electrical actuator 32. The electrical actuator 32 is configured to be electrically connected with the operating device 3 via the electric cable EC1. The cable connector CN1 is configured to receive electricity supplied from the electric power source PS via the electric cable EC1. However, the cable connector CN1 can be configured to receive electricity supplied from an electric power source directly mounted to the derailleur RD if needed and/or desired.

As seen in FIG. 3, the controller 92 is configured to detect that an electric cable is connected to the cable connector CN1. For example, the controller 92 is configured to automatically execute the pairing operation of the wireless communicator WC3 in response to the connection between the electric cable and the cable connector CN1 if the wireless communicator WC3 has not been paired with another wireless communicator. The controller 92 can be configured to execute the pairing operation in response to anther input.

The derailleur FD includes a cable connector CN2 to which an electric cable (e.g., the electric cable EC2) of the wired communication structure WS is detachably connected. The cable connector CN2 is configured to be electrically connected to the wired communicator PC2. The electrical actuator 132, the wired communicator PC2, and the motor driver 190 are configured to receive electricity from the electric power source PS via the cable connector CN2 and the wired communicator PC2. In the first embodiment, the cable connector CN2 has substantially the same structure as the structure of the cable connector CN1 of the derailleur RD. The cable connector CN2 is provided to the actuator casing 134. However, the cable connector CN2 can be provided to another member such as the base member 112, the movable member 114, and the linkage 116 if needed and/or desired.

As seen in FIG. 3, the operating device 3 is configured to select the first wireless communicator WC1 if the wired communicator PC4 is not electrically connected to the wired communication structure WS. The operating device 4 is configured to select the second wireless communicator WC2 if the wired communicator PC5 is not electrically connected to the wired communication structure WS.

The controller 92 is configured to select the wireless communicator WC3 if the controller 92 wirelessly receives the control signal CS11 and/or CS12 from the operating device 3. The controller 92 is configured to select the wireless communicator WC3 if the controller 92 wirelessly receives the control signal CS21 and/or CS22 from the operating device 4.

Figure 23:
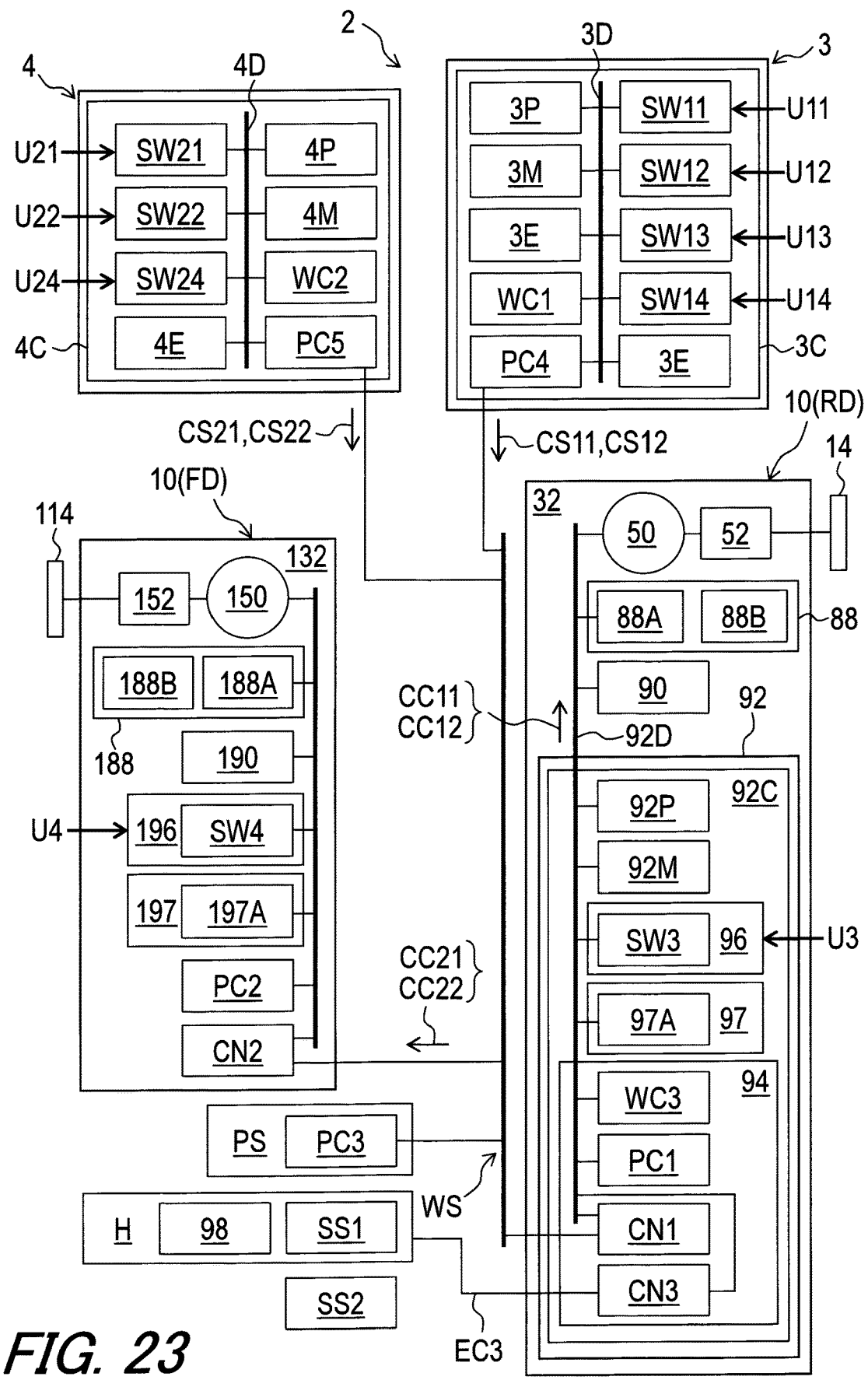
FIG. 23 is a schematic block diagram of the human-powered vehicle illustrated in FIG. 1 (wired communication).

As seen in FIG. 23, the controller 92 is configured to communicate with the operating devices 3 and 4 using the wired communicator PC1 through the wired communication structure WS if the wired communicators PC4 and PC5 of the operating devices 3 and 4 are electrically connected to the wired communication structure WS. The operating device 3 is configured to select the wired communicator PC4 if the wired communicator PC4 is electrically connected to the wired communication structure WS. The operating device 4 is configured to select the wired communicator PC5 if the wired communicator PC5 is electrically connected to the wired communication structure WS.

The controller 92 is configured to select the wired communicator PC1 if the controller 92 receives the control signal CS11 and/or CS12 from the operating device 3 via the wired communication structure WS. The controller 92 is configured to select the wired communicator PC1 if the controller 92 receives the control signal CS21 and/or CS22 from the operating device 4 via the wired communication structure WS. The controller 92 can be configured to change the communication channel between the wired communication channel and the wireless communication channel in response to another input.

As seen in FIG. 3, the human-powered vehicle 2 includes a sensor SS1. In the first embodiment, the sensor SS1 is configured to sense a state of the human-powered vehicle 2. The sensor SS1 includes at least one of an acceleration sensor, a rotation sensor, a gyroscope sensor, a torque sensor, and a motion sensor. The acceleration sensor is configured to sense an acceleration of at least one of the wheel W2 and the rear sprocket assembly RS (see e.g., FIG. 1). The rotation sensor is configured to sense a rotation of at least one of the wheel W2 and the rear sprocket assembly RS (see e.g., FIG. 1). The gyroscope sensor is configured to sense a posture of the human-powered vehicle 2 relative to a direction of gravitational force. The torque sensor is configured to sense a torque applied to the crank CR. The motion sensor is configured to sense a rotation of at least one of the wheel W2 and the rear sprocket assembly RS (see e.g., FIG. 1). The controller 92 is configured to receive a detection result of the sensor SS1 via the cable connector CN1.

For example, in a case where the sensor SS1 is configured to sense an inclined angle of the human-powered vehicle 2 relative to the direction of gravitational force, the inclined angle sensed by the sensor SS1 indicates an inclined angle of a road surface on which the human-powered vehicle 2 runs. The sensor SS1 is configured to be calibrated (e.g., rest) to execute zero adjustment of the sensor SS1 based on a posture of the sensor SS1 of when the sensor SS1 is calibrated. In the first embodiment, as seen in FIG. 2, the sensor SS1 is mounted to a hub assembly H configured to rotatably support the rear sprocket assembly RS. However, the position and/or function of the sensor SS1 is not limited to the first embodiment. For example, in a case where the sensor SS1 include the torque sensor, the sensor SS1 can be mounted to the crank CR.

The human-powered vehicle 2 includes a generator 98 configured to generate electricity using a rotation of the wheel W1 and/or W2. The generator 98 is configured to be electrically connected to the controller 92 of the derailleur RD. The generator 98 is mounted to the hub assembly H (see e.g., FIG. 2). The hub assembly H can also be referred to as a hub dynamo H. The sensor SS1 is mounted to the hub assembly H. The derailleur RD includes an additional connector CN3. The additional connector CN3 is configured to be electrically connected to the generator 98 and the sensor SS1 via an electric cable EC3. The derailleur RD is configured to use electricity supplied from the generator 98. The generator 98 can be omitted from the human-powered vehicle 2 if needed and/or desired. The sensor SS1 can be configured to wirelessly communicate with the wireless communicator WC3 of the derailleur RD.

The human-powered vehicle 2 includes a cadence sensor SS2. The state of the human-powered vehicle 2 can includes the cadence of the human-powered vehicle 2. The cadence sensor SS2 is configured to sense a cadence of the human-powered vehicle 2. The cadence sensor SS2 is configured to sense a rotational speed of the crank CR. The controller 92 is configured to obtain the cadence sensed by the cadence sensor SS2. In the first embodiment, as seen in FIG. 1, the cadence sensor SS2 is mounted to the vehicle body 2A. However, the position of the cadence sensor SS2 is not limited to the first embodiment. For example, the cadence sensor SS2 can be provided at any one of a crank shaft of the crank CR, a crank arm of the crank CR, a pedal attached to the crank CR. The cadence sensor SS2 is configured to wirelessly communicate with the controller 92 of the derailleur RD. However, the cadence sensor SS2 can be configured to be electrically connected to the derailleur RD via the wired communication structure WS.

The controller 92 is configured to control the electrical actuator 32 and/or the electrical actuator 132 based on a running condition of the human-powered vehicle 2. The controller 92 is configured to control the electrical actuator 32 and/or the electrical actuator 132 based on a comparison between the running condition and a threshold.

The controller 92 has a manual shifting mode and an automatic shifting mode. In the manual shifting mode, the controller 92 is configured to control the derailleur RD and the derailleur FD based on the control signals CS11, CS12, CS21, and CS22 transmitted from the operating device 3 and the operating device 4. In the automatic shifting mode, the controller 92 is configured to control the derailleur RD and the derailleur FD based on an automatic gear shift schedule R1 (FIG. 24), a current gear position of the derailleur RD, a current gear position of the derailleur FD, the running condition of the human-powered vehicle 2 (e.g., the inclined angle or the vehicle speed) sensed by the sensor SS1, and the cadence sensed by the cadence sensor SS2 without using the control signals transmitted from the operating device 3 and the operating device 4. In the automatic shifting mode, the controller 92 is configured to automatically maintain the cadence of the crank CR within a preferable cadence range based on the automatic gear shift schedule R1 (FIG. 24), the inclined angle sensed by the sensor SS1, and the cadence sensed by the cadence sensor SS2 without using the control signals transmitted from the operating device 3 and the operating device 4. The controller 92 is configured to store the preferable cadence range in the memory 92M. The preferable cadence range has an upper shifting threshold and a lower shifting threshold and is defined from the upper shifting threshold to the lower shifting threshold.

In the automatic shifting mode, the controller 92 is configured to execute upshifting of the derailleur RD if the cadence sensed by the cadence sensor SS2 is higher than the upper shifting threshold for a determination time. The controller 92 is configured to execute downshifting of the derailleur RD if the cadence sensed by the cadence sensor SS2 is lower than the lower shifting threshold for the determination time. The controller 92 is configured to store the determination time in the memory 92M. Each of the upper shifting threshold and the lower shifting threshold can also be referred as a shifting threshold.

In the automatic shifting mode, the controller 92 is configured to change the upper shifting threshold and the lower shifting threshold based on the inclined angle sensed by the sensor SS1. For example, the controller 92 is configured to increase each of the upper shifting threshold and the lower shifting threshold by a first predetermined percentage if the inclined angle sensed by the sensor SS1 is larger than an upper inclination threshold. The controller 92 is configured to decrease each of the upper shifting threshold and the lower shifting threshold by a second predetermined percentage if the inclined angle sensed by the sensor SS1 is larger than a lower inclination threshold. The controller 92 is configured to store the first predetermined percentage, the second predetermined percentage, the upper inclination threshold, and the lower inclination threshold in the memory 92M.

The controller 92 has a synchronized shifting mode and a non-synchronized shifting mode. The manual shifting mode includes the synchronized shifting mode and the non-synchronized shifting mode. In the synchronized shifting mode, the controller 92 is configured to control the derailleur RD and the derailleur FD based on a synchronized gear shift schedule R2 (FIG. 24) and the control signals transmitted from the operating device 3 without using the control signals transmitted from the operating device 4. The controller 92 is configured to store the synchronized gear shift schedule R2 of the synchronized shifting mode in the memory 92M. In the non-synchronized shifting mode, the controller 92 is configured to control the derailleur RD based on the control signals transmitted from the operating device 3 and is configured to control the derailleur FD based on the control signals transmitted from the operating device 4.

As seen in FIG. 24, the derailleur RD has first to twelfth gear stages. The derailleur FD has low and top gear stages. The drive train DT has 24 gear stages. The automatic gear shift schedule R1 has 14 gear stages among the 24 gear stages. The synchronized gear shift schedule R2 uses 14 gear stages among the 24 gear stages. In the first embodiment, the automatic gear shift schedule R1 is the same as the synchronized gear shift schedule R2. However, the automatic gear shift schedule R1 can be different from the synchronized gear shift schedule R2.

In the first embodiment, each of the automatic gear shift schedule R1 and the synchronized gear shift schedule R2 is used for both upshifting and downshifting. However, the controller 92 can be configured to use an automatic gear upshift schedule for upshifting and an automatic gear downshift schedule route, which is different from the automatic gear upshift schedule, for downshifting. The controller 92 can be configured to use a synchronized gear upshift schedule for upshifting and a synchronized gear downshift schedule route, which is different from the synchronized gear upshift schedule, for downshifting.

In a case where the derailleur FD is omitted from the derailleur 10, the front sprocket assembly FS can include only a single front sprocket. In such an embodiment, the synchronized shifting mode is omitted from the manual shifting mode, and the synchronized gear shift schedule R2 is omitted from the shift schedule of the human-powered vehicle 2 depicted in FIG. 24. The automatic gear shift schedule R1 can be a straight line between the largest and smallest sprockets RS1 and RS12 on the shift schedule.

In a case where the manual shifting mode is omitted from the human-powered vehicle 2, the synchronized shifting mode is omitted from the manual shifting mode, and the synchronized gear shift schedule R2 is omitted from the shift schedule of the human-powered vehicle 2 depicted in FIG. 24. Furthermore, the shift unit of the operating device 3 can be omitted from the operating device 3, and the shift unit of the operating device 4 can be omitted from the operating device 4.

As seen in FIG. 3, the operating device 3 includes a shifting-mode operation switch SW14 configured to receive a shifting-mode input U14. The controller 92 is configured to change the shifting mode between the manual shifting mode and the automatic shifting mode in response to the shifting-mode input U14 received by the shifting-mode operation switch SW14. In a case where the human-powered vehicle 2 has only one of the manual shifting mode and the automatic shifting mode, the shifting-mode operation switch SW14 can be omitted from the operating device 3.

The operating device 4 includes an additional shifting-mode switch SW24 configured to receive an additional shifting-mode input U24. In the manual shifting mode, the controller 92 is configured to change the shifting mode between the synchronized shifting mode and the non-synchronized shifting mode in response to the additional shifting-mode input U24 received by the additional shifting-mode switch SW24. In a case where the human-powered vehicle 2 has only one of the manual shifting mode and the automatic shifting mode and/or has only one of the synchronized shifting mode and the non-synchronized shifting mode as the manual shifting mode, the additional shifting-mode switch SW24 can be omitted from the operating device 4.

As seen in FIG. 3, the derailleur RD includes a user interface 96. The user interface 96 is configured to receive a user input U3 to change a state of the derailleur RD. For example, the user interface 96 is configured to receive the user input U3 to change a communication mode, an adjustment mode, a reset of settings, and/or the thresholds in the derailleur RD. The user interface 96 is configured to be electrically connected to the controller 92.

The controller 92 is configured to detect the user input U3 received by the user interface 96. The user input U3 includes a single normal operation of the user interface 96, a long operation of the user interface 96, and/or a total number of operations of the user interface 96 during a predetermined period of time (e.g., a double click or double tap). The controller 92 can be configured to determine a variety of different operations of the user interface 96 in accordance with the type of the user interface 96.

In the first embodiment, the user interface 96 includes a switch SW3. The switch SW3 is configured to be activated in response to the user input U3. The switch SW3 includes at least one of a push switch, a dial switch, a tactile switch, a slide switch, a capacitive switch, and a toggle switch. However, the user interface 96 is not limited to the above switches. The user interface 96 can include other types of interfaces such as a touch panel. The user interface 96 can be omitted from the derailleur RD if needed and/or desired.

As seen in FIG. 3, the derailleur RD comprises an information device 97. The information device 97 is configured to inform a user of a state of the derailleur RD. The information device 97 includes an indicator 97A. The indicator 97A is configured to indicate a state of the derailleur RD. The state of the derailleur RD includes a state of settings of the derailleur RD, an operating state of the derailleur RD, a communication state of the derailleur RD, an abnormality of the derailleur RD, and/or a state of an electric power source of the derailleur RD (in a case where the derailleur RD includes its own battery). For example, the indicator 97A includes a light-emitting diode (LED). The indicator 97A is electrically connected to the controller 92. The indicator 97A is electrically mounted on the circuit board 92C of the controller 92. The information device 97 is not limited to the above structure.

As seen in FIG. 3, the derailleur FD includes a user interface 196. The user interface 196 is configured to receive a user input U4 to change a state of the derailleur FD. For example, the user interface 196 is configured to receive the user input U4 to change a communication mode, an adjustment mode, a reset of settings, and/or the thresholds in the derailleur FD. The user interface 196 is configured to be electrically connected to the controller 92 via the wired communication structure WS.

The controller 92 is configured to detect the user input U4 received by the user interface 196. The user input U4 includes a single normal operation of the user interface 196, a long operation of the user interface 196, and/or a total number of operations of the user interface 196 during a predetermined period of time (e.g., a double click or double tap). The controller 92 can be configured to determine a variety of different operations of the user interface 196 in accordance with the type of the user interface 196.

In the first embodiment, the user interface 196 includes a switch SW4. The switch SW4 is configured to be activated in response to the user input U4. The switch SW4 includes at least one of a push switch, a dial switch, a tactile switch, a slide switch, a capacitive switch, and a toggle switch. However, the user interface 196 is not limited to the above switches. The user interface 196 can include other types of interfaces such as a touch panel. The user interface 196 can be omitted from the derailleur FD if needed and/or desired.

As seen in FIG. 3, the derailleur FD comprises an information device 197. The information device 197 is configured to inform a user of a state of the derailleur FD. The information device 197 includes an indicator 197A. The indicator 197A is configured to indicate a state of the derailleur FD. The state of the derailleur FD includes a state of settings of the derailleur FD, an operating state of the derailleur FD, a communication state of the derailleur FD, an abnormality of the derailleur FD, and/or a state of an electric power source of the derailleur FD (in a case where the derailleur FD includes its own battery). For example, the indicator 197A includes a light-emitting diode (LED). The indicator 197A is electrically connected to the controller 92. The information device 197 is not limited to the above structure.

Second Embodiment

A derailleur 210 in accordance with a second embodiment will be described below referring to FIGS. 25 to 30. The derailleur 210 includes a derailleur RD2 and a derailleur FD2. The derailleur RD2 has the same structure and/or configuration as those of the derailleur RD except for the arrangement of the electrical actuator 32, the output member 64, and the saver member 68. The derailleur FD2 has the same structure and/or configuration as those of the derailleur FD except for the arrangement of the electrical actuator 132, the output member 146, and the saver member 148. Thus, elements having substantially the same function as those in the first embodiment will be numbered the same here and will not be described and/or illustrated again in detail here for the sake of brevity.

Figure 25:
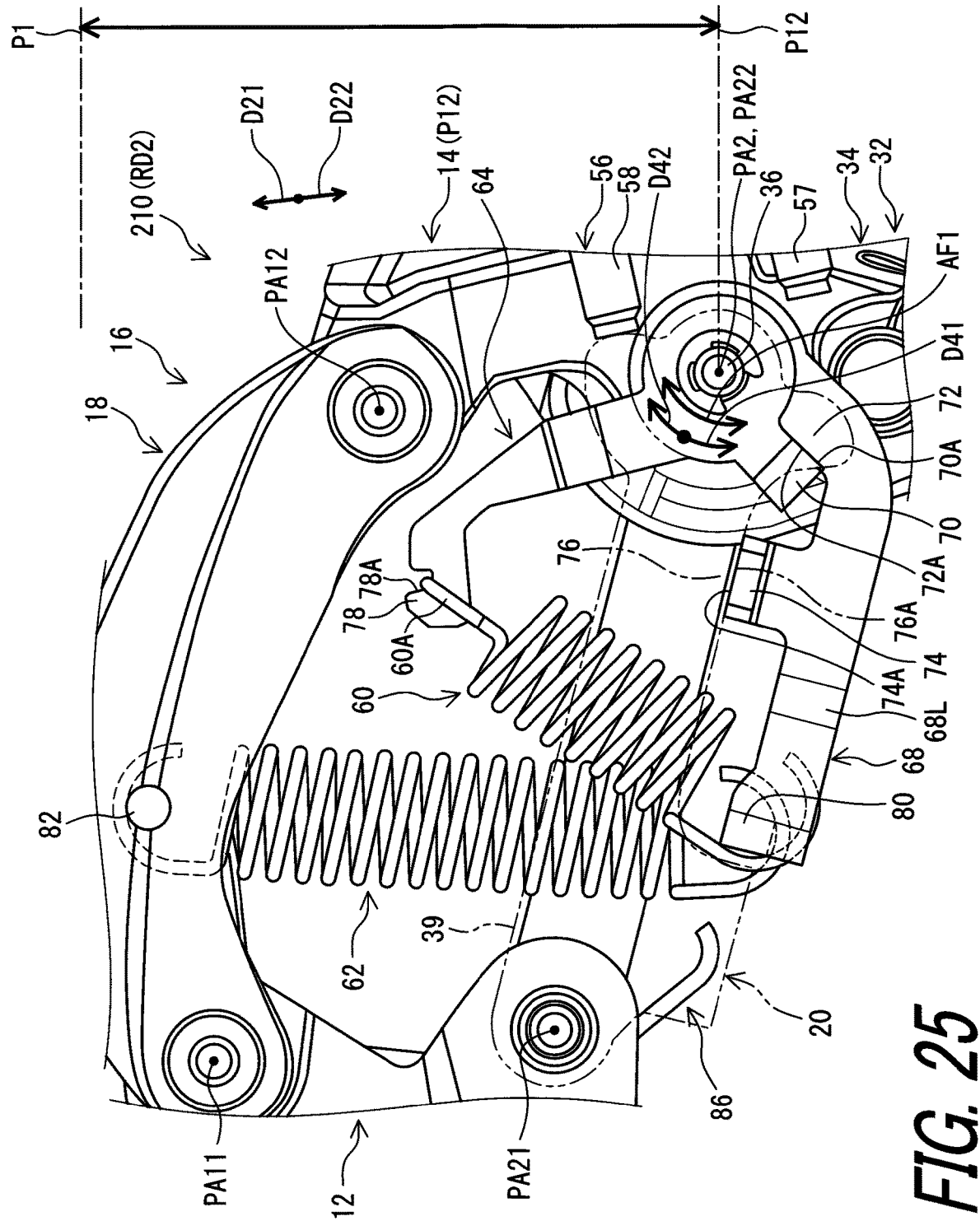
FIG. 25 is an enlarged partial perspective view of a derailleur in accordance with a second embodiment, with a second link omitted (second position).

As seen in FIG. 25, the derailleur RD2 for the human-powered vehicle 2 comprises the base member 12, the movable member 14, and the linkage 16. The derailleur RD2 for the human-powered vehicle 2 comprises the electrical actuator 32. The derailleur RD2 for the human-powered vehicle 2 comprises the first biasing member 60 and the second biasing member 62. The derailleur RD2 further comprises the output member 64. The derailleur RD further comprises the saver member 68. The base member 12, the movable member 14, the linkage 16, the electrical actuator 32, the output member 64, and the saver member 68 of the derailleur RD2 have substantially the same structures as the structures of the base member 12, the movable member 14, the linkage 16, the electrical actuator 32, the output member 64, and the saver member 68 of the derailleur RD.

In FIG. 25, the linkage 16, the electrical actuator 32, the output member 64, and the saver member 68 of the derailleur RD2 are plane-symmetrical to the linkage 16, the electrical actuator 32, the output member 64, and the saver member 68 of the derailleur RD depicted in FIG. 13. However, the linkage 16, the electrical actuator 32, the output member 64, and the saver member 68 of the derailleur RD2 can be asymmetrical to the linkage 16, the electrical actuator 32, the output member 64, and the saver member 68 of the derailleur RD depicted in FIG. 13.

In the second embodiment, the electrical actuator 32 is attached to the movable member 14. The actuator casing 34 is secured to the movable member 14. However, the electrical actuator 32 can be attached to another member such as the base member 12 and the linkage 16 if needed and/or desired.

In the second embodiment, the first direction D21 includes the outward direction D32. The second direction D22 includes the inward direction D31. More specifically, the first direction D21 is the outward direction D32. The second direction D22 is the inward direction D31. However, the first direction D21 can include the inward direction D31, and the second direction D22 can include the outward direction D32.

The second position P12 is closer to the transverse center plane CP than the first position P1. The movable member 14 is moved relative to the base member 12 from the second position P12 to the first position P1 in the first direction D21 or the outward direction D32. The movable member 14 is moved relative to the base member 12 from the first position P1 to the second position P12 in the second direction D22 or the inward direction D31. However, the first position P1 can be closer to the transverse center plane CP than the second position P12 if needed and/or desired.

The first position P1 corresponds to the smallest sprocket RS12 of the rear sprocket assembly RS (see e.g., FIG. 2). The second position P12 corresponds to the largest sprocket RS1 of the rear sprocket assembly RS (see e.g., FIG. 2). However, the first position P1 can correspond to the largest sprocket RS1, an innermost position, and/or a low gear position. The second position P12 can correspond to the smallest sprocket RS12, an outermost position, and/or a top gear position.

The electrical actuator 32 is configured to move the movable member 14 in the first direction D21 or the outward direction D32 in response to the first control signal CS11 (see e.g., FIG. 3). The electrical actuator 32 is configured to move the movable member 14 in the second direction D22 or the inward direction D31 in response to the first additional control signal CS12 (see e.g., FIG. 3).

Figure 26:
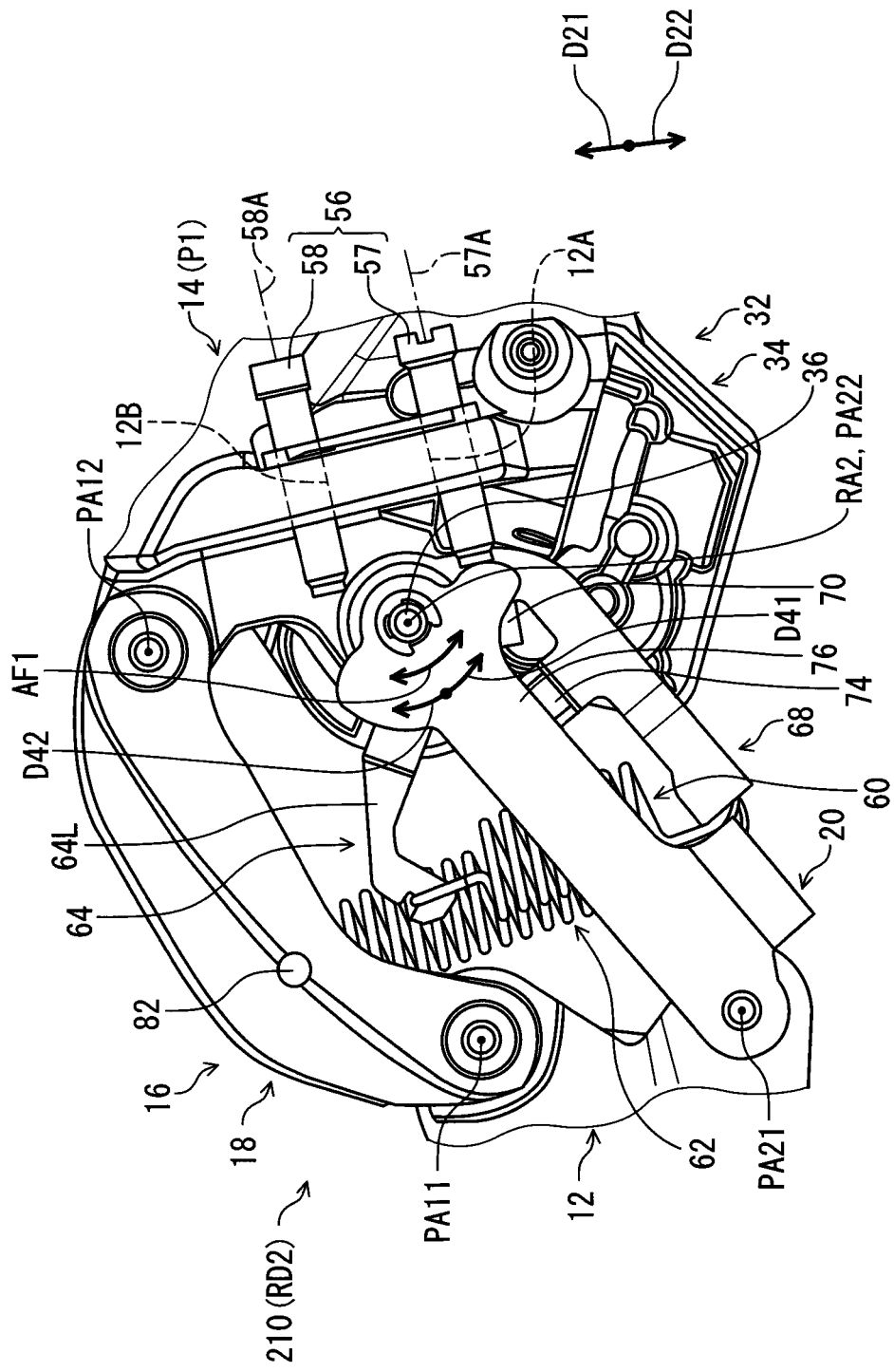
FIG. 26 is a perspective view of the derailleur illustrated in FIG. 25 (first position).
Figure 27:
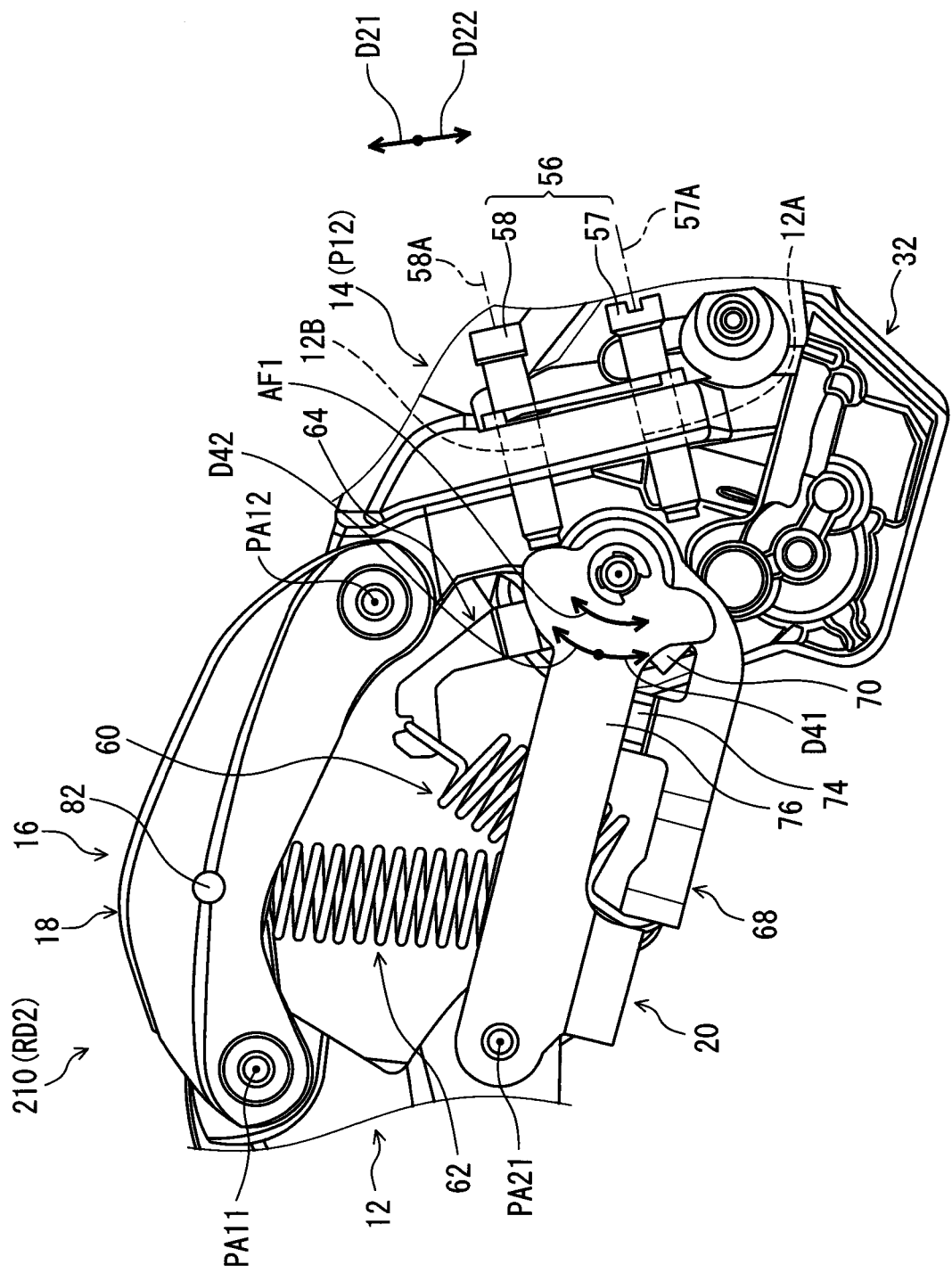
FIG. 27 is a perspective view of the derailleur illustrated in FIG. 25 (second position).

FIG. 26 shows a state of the derailleur RD in which the movable member 14 is in the first position P1. FIG. 27 shows a state of the derailleur RD in which the movable member 14 is in the second position P12. In FIGS. 26 and 27, the chain guide 24 is omitted from the movable member 14.

As seen in FIGS. 26 and 27, the electrical actuator 32 is configured to move the movable member 14 in the first direction D21 via the second biasing member 62 if the output part 36 of the electrical actuator 32 rotates in the first rotational direction D41. The second biasing member 62 is configured to transmit the actuating force AF1 to the first link 18 in response to the first rotation of the output part 36 of the electrical actuator 32 in the first rotational direction D41. The movable member 14 is configured to move relative to the base member 12 in the first direction D21 in response to the actuating force AF1 transmitted from the output part 36 of the electrical actuator 32 via the second biasing member 62.

The electrical actuator 32 is configured to move the movable member 14 in the second direction D22 via the first biasing member 60 if the output part 36 of the electrical actuator 32 rotates in the second rotational direction D42 which is an opposite direction of the first rotational direction D41. The first biasing member 60 is configured to transmit the actuating force AF1 to the second link 20 in response to the second rotation of the output part 36 of the electrical actuator 32 in the second rotational direction D42. The movable member 14 is configured to move relative to the base member 12 in the second direction D22 in response to the actuating force AF1 transmitted from the output part 36 of the electrical actuator 32 via the first biasing member 60.

The second biasing member 62, the output member 64, and the saver member 68 are configured to transmit the actuating force AF1 to the first link 18 in response to the first rotation of the output part 36 of the electrical actuator 32. The first biasing member 60, the output member 64, and the saver member 68 are configured to transmit the actuating force AF1 to the second link 20 in response to the second rotation of the output part 36 of the electrical actuator 32.

Figure 28:
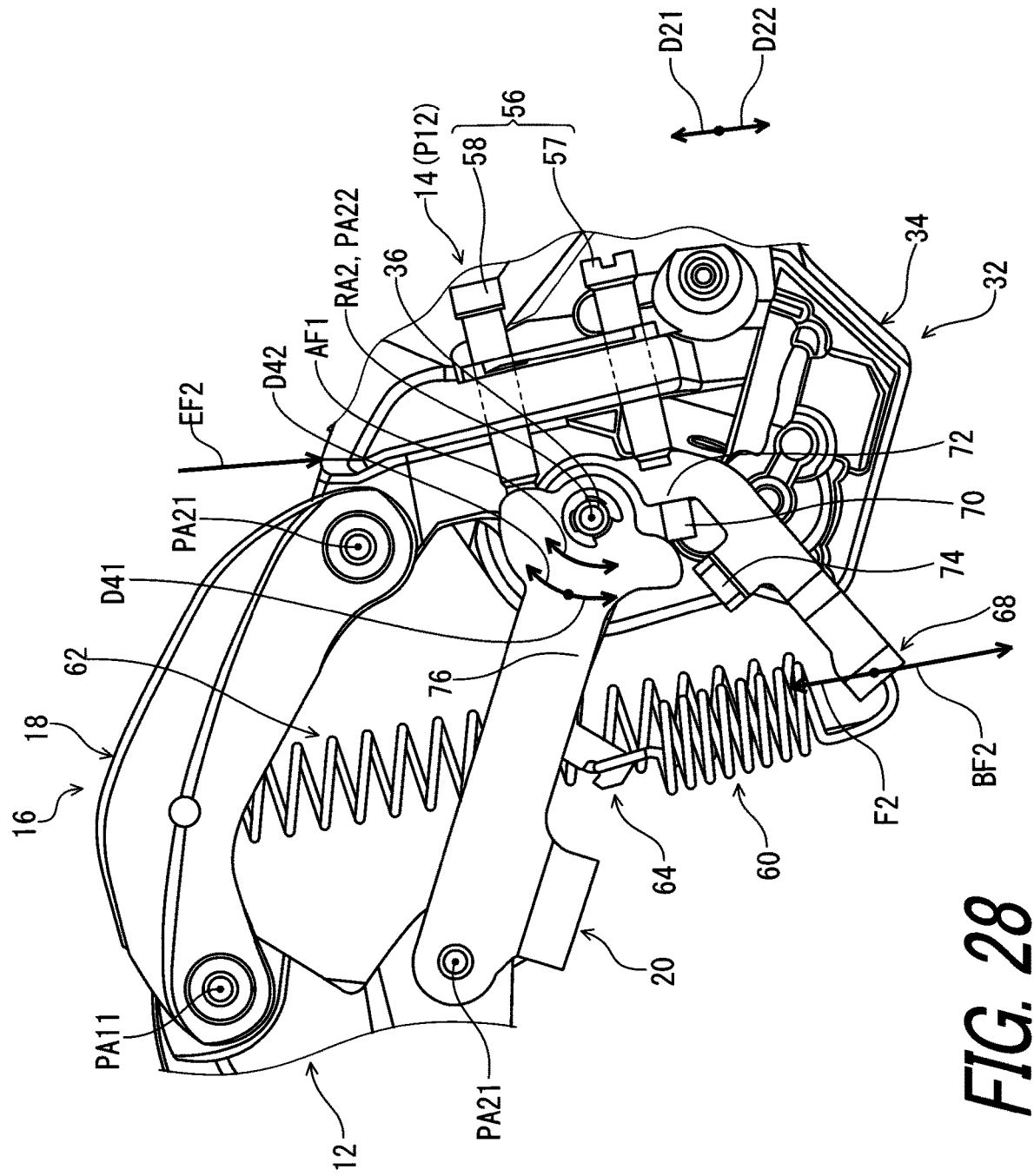
FIG. 28 is a perspective view of the derailleur of FIG. 25 in which a movable member is moved from the first position to the second position by second external force.
Figure 29:
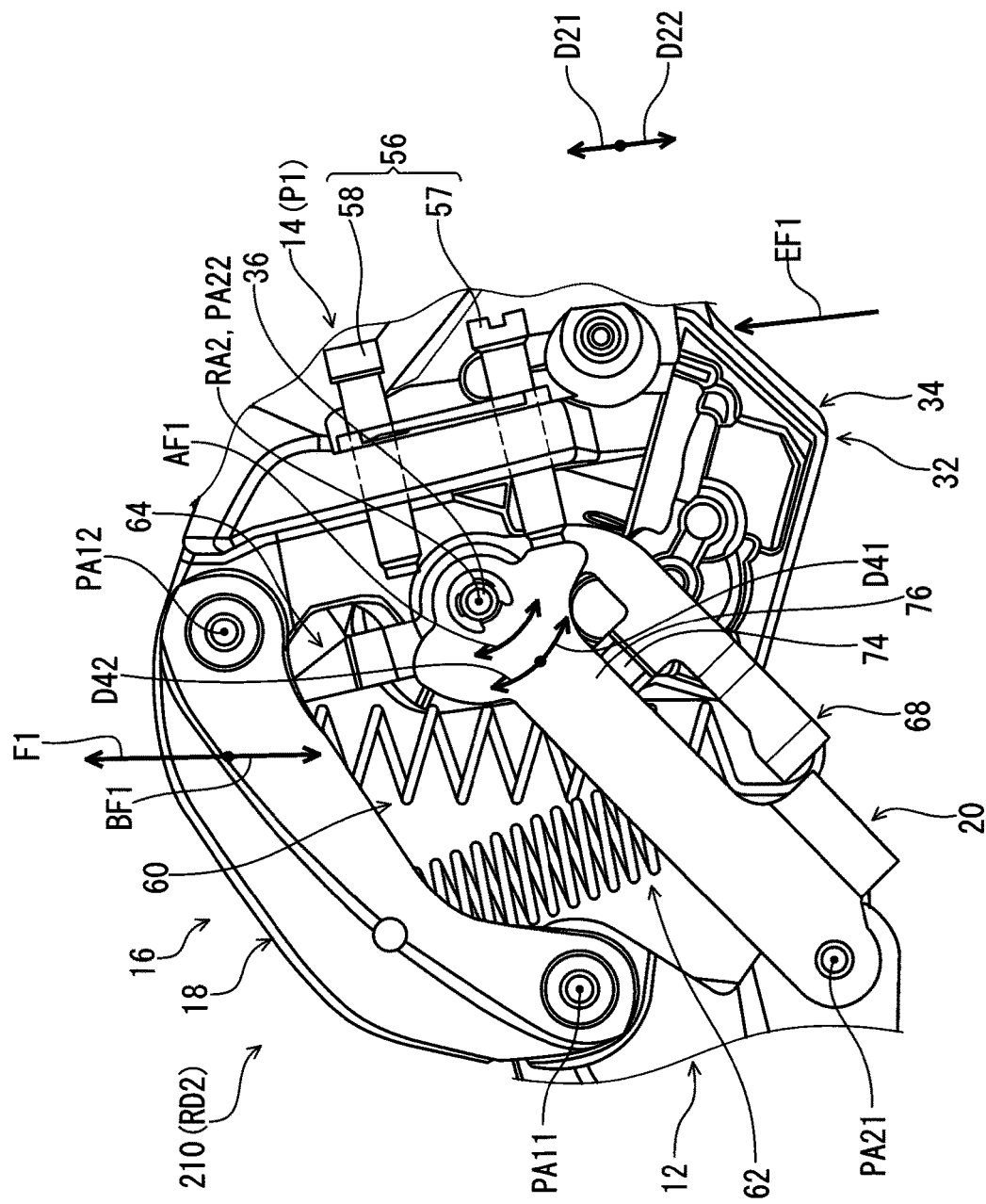
FIG. 29 is a perspective view of the derailleur of FIG. 25 in which a movable member is moved from the second position to the first position by first external force.

FIG. 28 shows a state of the derailleur RD in which the movable member 14 is moved from the first position P1 (see e.g., FIG. 26) to the second position P12 in the second direction D22 in response to second external force EF2. FIG. 29 shows a state of the derailleur RD in which the movable member 14 is moved from the second position P12 (see e.g., FIG. 27) to the first position P1 in the first direction D21 in response to first external force EF1. In FIGS. 28 and 29, the chain guide 24 is omitted from the movable member 14.

As seen in FIGS. 27 and 29, the first biasing member 60 is configured to deform if the first external force EF1 is applied to move the movable member 14 in the first direction D21. The first biasing member 60 is configured to reduce the first external force EF1 transmitted to the output part 36. The first biasing member 60 is configured to allow the movable member 14 to move relative to the base member 12 in the first direction D21 in response to the first external force EF1.

The first biasing member 60 is configured to deform in response to the first force F1 which is caused by the first external force EF1 and which is applied to the first biasing member 60 against the first biasing force BF1 of the first biasing member 60.

As seen in FIGS. 26 and 28, the second biasing member 62 is configured to deform if the second external force EF2 is applied to move the movable member 14 in the second direction D22. The second biasing member 62 is configured to reduce the second external force EF2 transmitted to the output part 36. The second biasing member 62 is configured to allow the movable member 14 to move relative to the base member 12 in the second direction D22 in response to the second external force EF2. The second biasing member 62 is configured to deform in response to the second force F2 which is caused by the second external force EF2 and which is applied to the second biasing member 62 against the second biasing force BF2 of the second biasing member 62.

Since the derailleur RD2 has substantially the same structure as the structure of the derailleur RD, the description regarding the derailleur RD can be utilized to describe the derailleur RD2. Thus, they will not be described in detail here for the sake of brevity.

Figure 30:
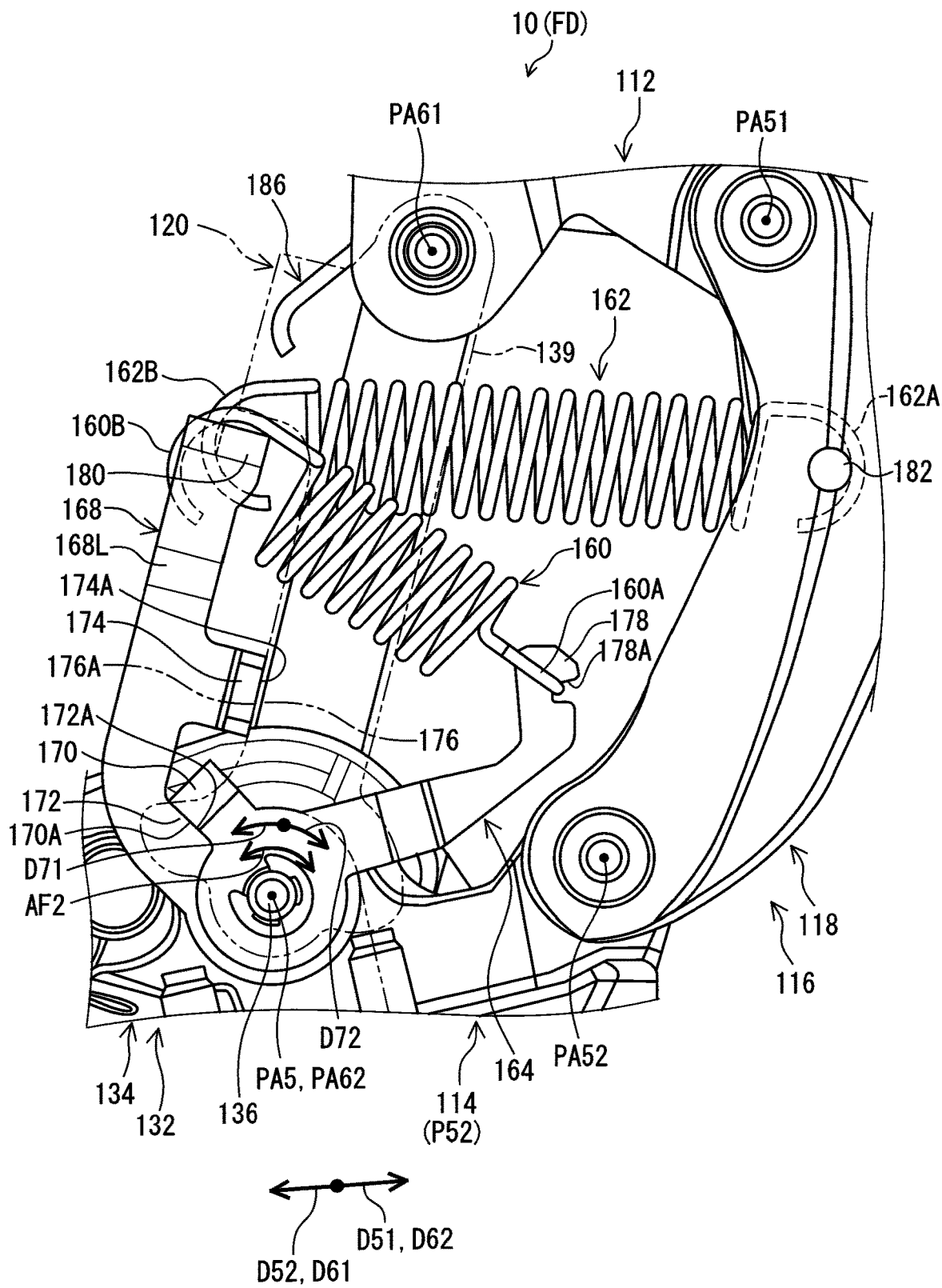
FIG. 30 is an enlarged partial perspective view of another derailleur in accordance with the second embodiment, with a second link omitted (second position).

As seen in FIG. 30, the derailleur FD2 for the human-powered vehicle 2 comprises the base member 112, the movable member 114, and the linkage 116. The derailleur FD2 for the human-powered vehicle 2 comprises the electrical actuator 132. The derailleur FD2 for the human-powered vehicle 2 comprises the first biasing member 160 and the second biasing member 162. The derailleur FD2 further comprises the output member 164. The derailleur FD further comprises the saver member 168. The base member 112, the movable member 114, the linkage 116, the electrical actuator 132, the output member 164, and the saver member 168 of the derailleur FD2 have substantially the same structures as the structures of the base member 112, the movable member 114, the linkage 116, the electrical actuator 132, the output member 164, and the saver member 168 of the derailleur FD.

In FIG. 30, the linkage 116, the electrical actuator 132, the output member 164, and the saver member 168 of the derailleur FD2 are plane-symmetrical to the linkage 116, the electrical actuator 132, the output member 164, and the saver member 168 of the derailleur FD depicted in FIG. 20. However, the linkage 16, the electrical actuator 32, the output member 64, and the saver member 68 of the derailleur FD2 can be asymmetrical to the linkage 16, the electrical actuator 32, the output member 64, and the saver member 68 of the derailleur FD depicted in FIG. 20.

In the second embodiment, the electrical actuator 132 is attached to the movable member 114. The actuator casing 134 is secured to the movable member 114. However, the electrical actuator 132 can be attached to another member such as the base member 112 and the linkage 116 if needed and/or desired.

In the second embodiment, the first direction D51 includes the outward direction D62. The second direction D52 includes the inward direction D61. More specifically, the first direction D51 is the outward direction D62. The second direction D52 is the inward direction D61. However, the first direction D51 can include the inward direction D61, and the second direction D52 can include the outward direction D62.

The second position P52 is closer to the transverse center plane CP than the first position P51. The movable member 114 is moved relative to the base member 112 from the second position P52 to the first position P51 in the first direction D51 or the outward direction D62. The movable member 114 is moved relative to the base member 112 from the first position P51 to the second position P52 in the second direction D52 or the inward direction D61. However, the first position P51 can be closer to the transverse center plane CP than the second position P52 if needed and/or desired.

The first position P51 corresponds to the largest sprocket FS2 of the front sprocket assembly FS (see e.g., FIG. 2). The second position P52 corresponds to the smallest sprocket FS1 of the front sprocket assembly FS (see e.g., FIG. 2). However, the first position P51 can correspond to the smallest sprocket FS1, an innermost position, and/or a top gear position. The second position P52 can correspond to the largest sprocket FS2, an outermost position, and/or a low gear position.

Since the derailleur FD2 has substantially the same structure as the structure of the derailleur FD, the description regarding the derailleur FD can be utilized to describe the derailleur FD2. Thus, they will not be described in detail here for the sake of brevity.

Modifications

Figure 31:
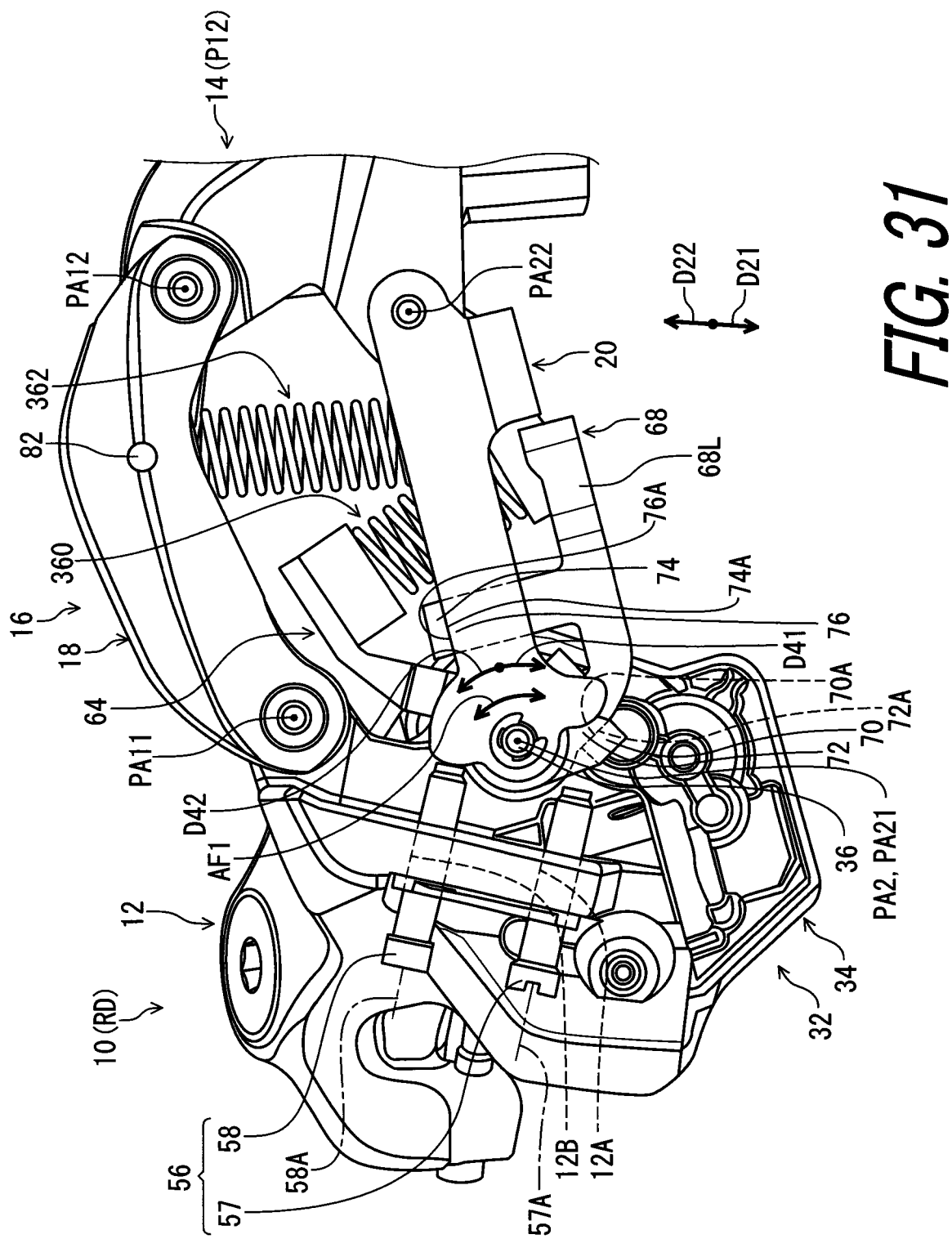
FIG. 31 is a partial perspective view of a derailleur in accordance with a modification (second position).

In the derailleur RD of the first embodiment, as seen in FIG. 12, at least one of the first biasing member 60 and the second biasing member 62 includes an extension spring. Each of the first biasing member 60 and the second biasing member 62 includes an extension spring. However, the structures of the first biasing member 60 and the second biasing member 62 are not limited to the structures disclosed in the first embodiment. As seen in FIG. 31, the derailleur RD can comprise a first biasing member 360 and a second biasing member 362. At least one of the first biasing member 360 and the second biasing member 362 includes a compression spring. In FIG. 31, each of the first biasing member 360 and the second biasing member 362 includes a compression spring.

In the modification illustrated in FIG. 31, the first contact surface 70A of the first contact part 70 faces in the second rotational direction D42. The first additional contact surface 72A of the first additional contact part 72 faces in the first rotational direction D41. The second contact surface 74A of the second contact part 74 faces in the first rotational direction D41. The second additional contact surface 76A of the second additional contact part 76 faces in the second rotational direction D42.

The modification of FIG. 31 can apply to the derailleur FD illustrated in FIG. 20, the derailleur RD2 illustrated in FIG. 25, and the derailleur FD2 illustrated in FIG. 30 if needed and/or desired.

In the derailleur RD of the first embodiment, the output member 64 and the saver member 68 are configured to be engaged with the second link 20 of the linkage 16. However, the output member 64 and the saver member 68 can be configured to be engaged with the first link 18 of the linkage 16 if needed and/or desired. The same modification can apply to the derailleur FD illustrated in FIG. 20, the derailleur RD2 illustrated in FIG. 25, and the derailleur FD2 illustrated in FIG. 30 if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A derailleur for a human-powered vehicle, the derailleur comprising:
   a base member configured to be attached to a vehicle body of the human-powered vehicle;
   a movable member configured to be movable relative to the base member in a first direction and a second direction different from the first direction;
   a linkage configured to movably connect the movable member to the base member;
   an electrical actuator configured to operatively move the movable member relative to the base member;
   a first biasing member configured to deform if first external force is applied to move the movable member in the first direction; and
   a second biasing member configured to deform if second external force is applied to move the movable member in the second direction, wherein
   the first biasing member is not mounted on the linkage.

2. The derailleur according to claim 1, wherein
   the electrical actuator includes an output part configured to be operatively coupled to the movable member to move the movable member relative to the base member,
   the first biasing member is configured to reduce the first external force transmitted to the output part, and
   the second biasing member is configured to reduce the second external force transmitted to the output part.

3. The derailleur according to claim 2, wherein
   the first biasing member is configured to allow the movable member to move relative to the base member in the first direction in response to the first external force, and
   the second biasing member is configured to allow the movable member to move relative to the base member in the second direction in response to the second external force.

4. The derailleur according to claim 2, wherein
   the first biasing member includes a first end and a first opposite end, and
   the first end of the first biasing member is operatively coupled to the output part of the electrical actuator.

5. The derailleur according to claim 4, further comprising
   an output member coupled to the output part of the electrical actuator to rotate along with the output part, wherein
   the first end of the first biasing member is coupled to the output member.

6. The derailleur according to claim 5, wherein
   the output member is secured to the output part of the electrical actuator.

7. A derailleur for a human-powered vehicle, the derailleur comprising:
   a base member configured to be attached to a vehicle body of the human-powered vehicle;
   a movable member configured to be movable relative to the base member in a first direction and a second direction different from the first direction;
   a linkage configured to movably connect the movable member to the base member;
   an electrical actuator configured to operatively move the movable member relative to the base member;
   a first biasing member configured to deform if first external force is applied to move the movable member in the first direction;
   a second biasing member configured to deform if second external force is applied to move the movable member in the second direction; and
   a saver member pivotally coupled to at least one of the base member, the movable member, the linkage, and the electrical actuator, wherein
   the electrical actuator includes an output part configured to be operatively coupled to the movable member to move the movable member relative to the base member,
   the first biasing member includes a first end and a first opposite end,
   the first end of the first biasing member is operatively coupled to the output part of the electrical actuator, and
   the first opposite end of the first biasing member is coupled to the saver member.

8. The derailleur according to claim 1, wherein
   the first biasing member is configured to deform in response to first force which is caused by the first external force and which is applied to the first biasing member against first biasing force of the first biasing member, and the second biasing member is configured to deform in response to second force which is caused by the second external force and which is applied to the second biasing member against second biasing force of the second biasing member.

9. The derailleur according to claim 1, wherein
the movable member is movable relative to the base member in an inward direction toward a transverse center plane of the vehicle body,
the movable member is movable relative to the base member in an outward direction away from the transverse center plane of the vehicle body, the outward direction being an opposite direction of the inward direction,
the first direction includes the inward direction, and
the second direction includes the outward direction.

10. The derailleur according to claim 1, wherein
at least one of the first biasing member and the second biasing member includes an extension spring.

11. A derailleur for a human-powered vehicle, the derailleur comprising:
a base member configured to be attached to a vehicle body of the human-powered vehicle;
a movable member configured to be movable relative to the base member in a first direction and a second direction different from the first direction;
a linkage configured to movably connect the movable member to the base member;
an electrical actuator configured to operatively move the movable member relative to the base member;
a first biasing member configured to deform if first external force is applied to move the movable member in the first direction; and
a second biasing member configured to deform if second external force is applied to move the movable member in the second direction, wherein
at least one of the first biasing member and the second biasing member includes a compression spring.

12. The derailleur according to claim 1, wherein
the linkage includes a first link,
the first link is pivotally coupled to the base member about a first pivot axis and is pivotally coupled to the movable member about a first additional pivot axis,
the second biasing member includes a second end and a second opposite end, and
the second end of the second biasing member is coupled to the first link.

13. The derailleur according to claim 12, further comprising
a saver member pivotally coupled to at least one of the base member, the movable member, the linkage, and the electrical actuator, wherein
the second opposite end of the second biasing member is coupled to the saver member.

14. A derailleur for a human-powered vehicle, the derailleur comprising:
a base member configured to be attached to a vehicle body of the human-powered vehicle;
a movable member configured to be movable relative to the base member in a first direction and a second direction different from the first direction;
a linkage configured to movably connect the movable member to the base member;
an electrical actuator configured to operatively move the moveable member relative to the base member, the electrical actuator including an output part;
a first biasing member; and
a second biasing member,
the electrical actuator being configured to move the movable member in the first direction via the second biasing member if the output part of the electrical actuator rotates in a first rotational direction, the electrical actuator being configured to move the movable member in the second direction via the first biasing member if the output part of the electrical actuator rotates in a second rotational direction which is an opposite direction of the first rotational direction, wherein
the first biasing member is not mounted on the linkage.

15. The derailleur according to claim 14, wherein
the movable member is movable relative to the base member in an inward direction toward a transverse center plane of the vehicle body,
the movable member is movable relative to the base member in an outward direction away from the transverse center plane of the vehicle body, the outward direction being an opposite direction of the inward direction,
the first direction includes the inward direction, and
the second direction includes the outward direction.

16. The derailleur according to claim 14, wherein
at least one of the first biasing member and the second biasing member includes an extension spring.

17. A derailleur for a human-powered vehicle, the derailleur comprising:
a base member configured to be attached to a vehicle body of the human-powered vehicle;
a movable member configured to be movable relative to the base member in a first direction and a second direction different from the first direction;
a linkage configured to movably connect the movable member to the base member:
an electrical actuator configured to operatively move the moveable member relative to the base member, the electrical actuator including an output part;
a first biasing member; and
a second biasing member,
the electrical actuator being configured to move the movable member in the first direction via the second biasing member if the output part of the electrical actuator rotates in a first rotational direction, the electrical actuator being configured to move the movable member in the second direction via the first biasing member if the output part of the electrical actuator rotates in a second rotational direction which is an opposite direction of the first rotational direction, wherein
at least one of the first biasing member and the second biasing member includes a compression spring.

18. The derailleur according to claim 14, wherein
The linkage includes a first link,
the first link is pivotally coupled to the base member about a first pivot axis and is pivotally coupled to the movable member about a first additional pivot axis,
the second biasing member includes a second end and a second opposite end, and
the second end of the second biasing member is coupled to the first link.

19. The derailleur according to claim 18, further comprising
a saver member pivotally coupled to at least one of the base member, the movable member, the linkage, and the electrical actuator, wherein the second opposite end of the second biasing member is coupled to the saver member.

20. The derailleur according to claim 14, wherein
the first biasing member includes a first end and a first opposite end, and
the first end of the first biasing member is operatively coupled to the output part of the electrical actuator.

21. The derailleur according to claim 20, further comprising
an output member coupled to the output part of the electrical actuator to rotate along with the output part.

22. The derailleur according to claim 21, wherein
the first end of the first biasing member is coupled to the output member.

23. The derailleur according to claim 21, wherein
the output member is secured to the output part of the electrical actuator.

24. The derailleur according to claim 20, further comprising
a saver member pivotally coupled to at least one of the base member, the movable member, the linkage, and the electrical actuator, wherein
the first opposite end of the first biasing member is coupled to the saver member.

25. The derailleur according to claim 14, wherein
the linkage includes a first link and a second link,
the first link is pivotally coupled to the base member about a first pivot axis and is pivotally coupled to the movable member about a first additional pivot axis, and
the second link is pivotally coupled to the base member about a second pivot axis and is pivotally coupled to the movable member about a second additional pivot axis.

26. The derailleur according to claim 14, further comprising
a saver member pivotally coupled to at least one of the base member, the movable member, the linkage, and the electrical actuator; and
an output member coupled to the output part of the electrical actuator to rotate along with the output part, wherein
the output member includes a first contact part contactable with the saver member.

27. The derailleur according to claim 26, wherein
the saver member includes a second contact part contactable with the second link.

28. The derailleur according to claim 25, wherein
the second biasing member is configured to transmit actuating force to the first link in response to a first rotation of the output part of the electrical actuator in the first rotational direction.

29. The derailleur according to claim 28, wherein
the movable member is configured to move relative to the base member in the first direction in response to the actuating force transmitted from the output part of the electrical actuator via the second biasing member.

30. The derailleur according to claim 28, further comprising
a saver member pivotally coupled to at least one of the base member, the movable member, the linkage, and the electrical actuator, wherein
the second biasing member, the output member, and the saver member are configured to transmit the actuating force to the first link in response to the first rotation of the output part of the electrical actuator.

31. The derailleur according to claim 25, wherein
the first biasing member is configured to transmit the actuating force to the second link in response to a second rotation of the output part of the electrical actuator in a second rotational direction.

32. The derailleur according to claim 31, further comprising
a saver member pivotally coupled to at least one of the base member, the movable member, the linkage, and the electrical actuator, wherein
the first biasing member, the output member, and the saver member are configured to transmit the actuating force to the second link in response to the second rotation of the output part of the electrical actuator.

33. The derailleur according to claim 1, wherein the second biasing member is configured to be at least partially disposed between the first link and the second link as viewed from the first pivot axis.

34. The derailleur according to claim 14, wherein
the second biasing member is configured to be at least partially disposed between the first link and the second link as viewed from the first pivot axis.

35. The derailleur according to claim 1, further comprising
a saver member pivotally coupled to at least one of the base member, the movable member, the linkage, and the electrical actuator, wherein
the first biasing member is mounted on the saver member.

36. The derailleur according to claim 14, further comprising
a saver member pivotally coupled to at least one of the base member, the movable member, the linkage, and the electrical actuator, wherein
the first biasing member is mounted on the saver member.

* * * * *